(12) United States Patent
Katsuyama

(10) Patent No.: US 10,021,270 B2
(45) Date of Patent: Jul. 10, 2018

(54) DITHER MASK GENERATION METHOD AND DEVICE

(71) Applicant: FUJIFILM Corporation, Tokyo (JP)

(72) Inventor: Kimito Katsuyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/267,653

(22) Filed: Sep. 16, 2016

(65) Prior Publication Data

US 2017/0085750 A1   Mar. 23, 2017

(30) Foreign Application Priority Data

Sep. 18, 2015   (JP) .................................. 2015-185381

(51) Int. Cl.
*H04N 1/60* (2006.01)
*H04N 1/46* (2006.01)
*H04N 1/52* (2006.01)
*H04N 1/405* (2006.01)

(52) U.S. Cl.
CPC ............. *H04N 1/4051* (2013.01); *H04N 1/52* (2013.01)

(58) Field of Classification Search
None
See application file for complete search history.

(56) References Cited

U.S. PATENT DOCUMENTS

| | | | | |
|---|---|---|---|---|
| 7,585,040 B2* | 9/2009 | Ochiai | ................. | B41J 2/04541 347/15 |
| 9,682,550 B2* | 6/2017 | Katsuyama | .......... | B41J 2/04586 |
| 9,836,675 B2* | 12/2017 | Fukazawa | .......... | G06K 15/1878 |
| 9,849,668 B2* | 12/2017 | Katsuyama | .......... | B41J 2/04508 |
| 2010/0118077 A1* | 5/2010 | Kakutani | ............... | B41J 2/2107 347/12 |
| 2010/0177137 A1* | 7/2010 | Kakutani | ............... | B41J 2/2132 347/15 |

(Continued)

FOREIGN PATENT DOCUMENTS

| JP | 2010-162770 A | 7/2010 |
|---|---|---|
| JP | 2010-162772 A | 7/2010 |
| JP | 2012-186714 A | 9/2012 |

OTHER PUBLICATIONS

An Office Action; "Notification of Reasons for Refusal" issued by the Japanese Patent Office dated Apr. 26, 2018, which corresponds to Japanese Patent Application No. 2015-185381 and is related to U.S. Appl. No. 15/267,653; with English translation.

*Primary Examiner* — Madelein Nguyen
(74) *Attorney, Agent, or Firm* — Studebaker & Brackett PC

(57) ABSTRACT

The dither mask generation method includes: a process of setting a nozzle relative ejection rate which is a control target of the nozzle ejection rate and stipulates a relative using ratio of the individual nozzles; a process of setting a nozzle pattern indicating correspondence relation between individual pixels of the dither mask and the nozzles in charge of recording at respective pixel positions; a process of setting an upper limit to the nozzle ejection rates of the individual nozzles for each raster in a main scanning direction, regarding at least some thresholds; and a process of setting the thresholds to the pixels of the dither mask based on the nozzle relative ejection rate, the nozzle pattern and a limitation by the upper limit.

14 Claims, 44 Drawing Sheets

(56) References Cited

U.S. PATENT DOCUMENTS

| | | | |
|---|---|---|---|
| 2011/0063641 A1* | 3/2011 | Fukuda | H04N 1/52 358/1.9 |
| 2012/0206525 A1* | 8/2012 | Tanase | B41J 2/155 347/14 |
| 2012/0229549 A1 | 9/2012 | Shibata | |
| 2014/0139853 A1* | 5/2014 | Goto | H04N 1/52 358/1.9 |
| 2014/0139855 A1* | 5/2014 | Iguchi | H04N 1/4015 358/1.9 |
| 2015/0054866 A1* | 2/2015 | Hayashi | H04N 1/4051 347/9 |
| 2015/0254538 A1* | 9/2015 | Fukazawa | G06K 15/1878 358/1.9 |
| 2015/0283805 A1* | 10/2015 | Yuda | B41J 2/04586 347/9 |
| 2015/0343764 A1* | 12/2015 | Kobayashi | B41J 2/04535 347/12 |
| 2016/0167376 A1* | 6/2016 | Katsuyama | B41J 2/04586 347/15 |
| 2016/0191747 A1* | 6/2016 | Katsuyama | H04N 1/52 358/3.13 |
| 2017/0085749 A1* | 3/2017 | Katsuyama | H04N 1/52 |

\* cited by examiner

FIG.14

| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
|---|---|---|---|---|---|---|---|---|---|---|---|---|---|---|---|---|---|
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |
| 0.2 | 0.8 | 0.4 | 0.6 | 0.6 | 0.4 | 0.8 | 0.2 | 1 | 0.2 | 0.8 | 0.4 | 0.6 | 0.6 | 0.4 | 0.8 | 0.2 | 1 |

FIG.15

| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
|---|---|---|---|---|---|---|---|---|---|---|---|---|---|---|---|---|
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |
| 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 | 0.56 |

| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
|---|---|---|---|---|---|---|---|---|---|---|---|---|---|---|---|---|---|
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |

| NOZZLE NUMBER | NOZZLE RELATIVE EJECTION RATE | DOT PRIORITY PIXEL NUMBER |
|---|---|---|
| 0 | 0.2 | 3.6 |
| 5 | 0.8 | 14.4 |
| 1 | 0.4 | 7.2 |
| 6 | 0.6 | 10.8 |
| 2 | 0.6 | 10.8 |
| 7 | 0.4 | 7.2 |
| 3 | 0.8 | 14.4 |
| 8 | 0.2 | 3.6 |
| 4 | 1 | 18 |
| 0 | 0.2 | 3.6 |
| 5 | 0.8 | 14.4 |
| 1 | 0.4 | 7.2 |
| 6 | 0.6 | 10.8 |
| 2 | 0.6 | 10.8 |
| 7 | 0.4 | 7.2 |
| 3 | 0.8 | 14.4 |
| 8 | 0.2 | 3.6 |
| 4 | 1 | 18 |

| LEFT NOZZLE RELATIVE EJECTION RATE | RIGHT NOZZLE RELATIVE EJECTION RATE | LEFT NOZZLE PRIORITY PIXEL NUMBER | RIGHT NOZZLE PRIORITY PIXEL NUMBER |
|---|---|---|---|
| 1 | 0.2 | 10 | 2 |
| 0.4 | 0.8 | 4 | 8 |
| 0.8 | 0.4 | 8 | 4 |
| 0.2 | 1 | 2 | 10 |
| 0.6 | 0.6 | 6 | 6 |
| 0.2 | 1 | 2 | 10 |
| 0.4 | 0.8 | 4 | 8 |
| 0.4 | 0.8 | 4 | 8 |
| 0.2 | 1 | 2 | 10 |
| 0.6 | 0.6 | 6 | 6 |
| 0.2 | 1 | 2 | 10 |
| 0.8 | 0.4 | 8 | 4 |
| 0.4 | 0.8 | 4 | 8 |
| 1 | 0.2 | 10 | 2 |
| 0.6 | 0.6 | 6 | 6 |
| 1 | 0.2 | 10 | 2 |
| 0.8 | 0.4 | 8 | 4 |
| 0.8 | 0.4 | 8 | 4 |
| 1 | 0.2 | 10 | 2 |
| 0.6 | 0.6 | 6 | 6 |

FIG.28

DITHER MASK GENERATION METHOD AND DEVICE

CROSS-REFERENCE TO RELATED APPLICATIONS

The present application claims priority under 35 U.S.C. § 119 to Japanese Patent Application No. 2015-185381, filed on Sep. 18, 2015. The above application is hereby expressly incorporated by reference, in its entirety, into the present application.

BACKGROUND OF THE INVENTION

Field of the Invention

The present invention relates to a dither mask generation method and device, and in particular relates to a technology of generating a dither mask used in halftone processing utilized in ink ejection control of an inkjet printer.

Description of the Related Art

Japanese Patent Application Laid-Open No. 2010-162770 gazette discloses a serial type inkjet printer that controls ejection of each nozzle of a print head by performing halftone processing by an ordered dither method using a dither mask. The serial type inkjet printer records images on a recording medium by repeating a scan operation of ejecting ink from a nozzle of a print head while moving the print head along a main scanning direction and a medium conveying operation which is sub scanning feed of intermittently conveying the recording medium in a sub scanning direction.

In such a recording method, behavior of impacted droplets on a recording medium, that is, dot behavior, is changed by recording position errors of individual dots to the recording medium by individual nozzles of a print head, ejection amount errors of the individual nozzles, a recording order or recording timing of dots or the like. Due to the change of the dot behavior on the recording medium, density irregularity called "banding" in which a recording density changes in a repetition cycle of individual print paths, a boundary of the individual print paths is conspicuous or the like is generated. When banding is generated, a problem that print image quality declines arises.

For such a problem, in the printer described in Japanese Patent Application Laid-Open No. 2010-162770 gazette, banding is suppressed by setting a threshold of the dither mask such that a nozzle using rate of at least one of nozzle groups (including most distal end nozzles arranged at both individual ends) arranged at each of both ends of a nozzle array of the print head becomes lower than a nozzle using rate of an intermediate nozzle group arranged between the nozzle groups at both ends. Japanese Patent Application Laid-Open No. 2010-162770 gazette discloses a method of generating a dither mask that makes a dot density of pixels recorded by the nozzle groups at both ends of the nozzle array lower than a dot density of pixels recorded by the intermediate nozzle group to suppress banding.

It is understood that "print head" in Japanese Patent Application Laid-Open No. 2010-162770 gazette is a term corresponding to "recording head" in the present specification. Also, it is understood that "nozzle using rate" in Japanese Patent Application Laid-Open No. 2010-162770 gazette is a term corresponding to "nozzle ejection rate" in the present specification.

SUMMARY OF THE INVENTION

In Japanese Patent Application Laid-Open No. 2010-162770 gazette, a dither mask that makes a using rate (nozzle ejection rate) of nozzle groups at ends of a nozzle array lower than the using rate of an intermediate nozzle group is generated. That is, the dither mask generated by a method described in Japanese Patent Application Laid-Open No. 2010-162770 gazette generates a dot pattern in which the using rate (nozzle ejection rate) becomes nonuniform between the nozzle groups at the ends of the nozzle array and the intermediate nozzle group.

The dither mask generated by the method described in Japanese Patent Application Laid-Open No. 2010-162770 gazette has a problem that stripes are easily generated in a halftone image compared to a dither mask for which the nozzle ejection rates of individual nozzles are uniform.

This problem is a problem in common not only to the dither mask generated by the method described in Japanese Patent Application Laid-Open No. 2010-162770 gazette but also the dither mask for which the nozzle ejection rates of the individual nozzles are biased (that is, the nozzle ejection rates of the individual nozzles are nonuniform).

While specific description of the problem and a study of causes are described later (see FIG. 9 to FIG. 19), it is found that a factor of the problem is due to the fact that, at an intermediate duty at which stripes tend to be visually recognized, a difference in the nozzle ejection rates between adjacent rasters or a difference in the nozzle ejection rates between path groups within the same raster is large.

The present invention is implemented in consideration of such a situation, and an object is to provide a dither mask generation method and device capable of solving the above-described problem and generating a dither mask for which the nozzle ejection rates of the individual nozzles are biased and which does not easily generate stripes.

To achieve the object, the following invention aspects are provided.

A dither mask generation method relating to a first aspect is a method of generating a dither mask used in halftone processing, and the dither mask generation method includes: a nozzle relative ejection rate setting process of setting a nozzle relative ejection rate which is a control target of a nozzle ejection rate of each nozzle indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording, and which stipulates relative using ratio of the individual nozzles; a nozzle pattern setting process of setting a nozzle pattern indicating correspondence relation between the individual pixels of the dither mask and the nozzles in charge of recording at respective pixel positions; a nozzle ejection rate limiting process of setting an upper limit lower than the highest nozzle ejection rate to the nozzle ejection rates of the individual nozzles for each raster for the individual rasters in a main scanning direction, regarding at least some thresholds set to the individual pixels of the dither mask; and a threshold setting process of setting the thresholds to the pixels of the dither mask based on the nozzle relative ejection rate, the nozzle pattern and a limitation by the upper limit.

The highest nozzle ejection rate means a largest value of the nozzle ejection rate. The highest nozzle ejection rate in the case of defining the nozzle ejection rate by a ratio of "recording pixels/recording attending pixels" is 1. The highest nozzle ejection rate in the case of defining the nozzle ejection rate by a percentage is 100%. The upper limit of the nozzle ejection rate set by the nozzle ejection rate limiting process is a value lower (smaller) than the highest nozzle ejection rate.

According to the first aspect, when generating the dither mask for which the nozzle ejection rates of the individual nozzles are biased, the nozzle ejection rates of the individual nozzles are provided with the upper limit for each raster, and the number of generating dots (that is, the number of setting thresholds) is limited raster by raster. Thus, increase of a difference in the nozzle ejection rates between the adjacent rasters and/or a difference in the nozzle ejection rates between path groups within the same raster is suppressed. According to the first aspect, resistance to stripes that are the problem is imparted, and the dither mask that does not easily generate the stripes can be obtained.

As a second aspect, in the dither mask generation method of the first aspect, a configuration can be such that the nozzle ejection rate limiting process includes a process of setting dot allowing pixels that allow setting of the threshold in the dither mask, and the upper limit is set by setting the dot allowing pixels.

As a third aspect, in the dither mask generation method of the second aspect, the configuration can be such that in the process of setting the dot allowing pixels, a pixel array of the dot allowing pixels for the number of pixels calculated by multiplying the nozzle ejection rate indicating the upper limit by the number of pixels of the dither mask is set.

As a fourth aspect, in the dither mask generation method of the second aspect or the third aspect, the configuration can be such that the pixel array of the dot allowing pixels has a blue noise characteristic.

As a fifth aspect, in the dither mask generation method of any one aspect of the second aspect to the fourth aspect, the configuration can be such that the method includes a dot priority pixel setting process of setting dot priority pixels to be candidates of pixels to set the threshold among the pixels of the dither mask, based on the nozzle relative ejection rate and the nozzle pattern, and in the threshold setting process, the threshold is set to the pixel which is the dot priority pixel and is also the dot allowing pixel.

As a sixth aspect, in the dither mask generation method of the fifth aspect, the configuration can be such that information of a pixel array obtained by a logical AND operation of the dot allowing pixels and the dot priority pixels is held.

As a seventh aspect, in the dither mask generation method of the fifth aspect or the sixth aspect, the configuration can be such that in the dot priority pixel setting process, the dot priority pixels are set using a random number, based on the nozzle relative ejection rate.

As an eighth aspect, in the dither mask generation method of the first aspect, the configuration can be such that in the nozzle ejection rate limiting process, a number of setting thresholds is managed for each raster of the dither mask and the number of the thresholds set to the individual rasters is limited.

As a ninth aspect, in the dither mask generation method of the eighth aspect, the number of setting thresholds is managed for each path group in a main scanning direction in the individual rasters of the dither mask, and the number of the thresholds is limited for each path group.

As a tenth aspect, in the dither mask generation method of any one aspect of the first aspect to the fourth aspect, the eighth aspect, and the ninth aspect, the method includes a nozzle relative ejection rate reflection processing process of performing processing of reflecting the nozzle relative ejection rate on an evaluation index when setting the individual thresholds of the dither mask, and the threshold setting process includes a process of setting the thresholds of the dither mask based on the evaluation index.

As an eleventh aspect, in the dither mask generation method of any one aspect of the first aspect to the tenth aspect, the configuration can be such that the recording head has a nozzle array formed by arraying the nozzles in a sub scanning direction that is parallel to a conveying direction of a recording medium, and is a serial type recording head that records an image on the recording medium while moving in a main scanning direction that is a width direction of the recording medium which intersects with the sub scanning direction.

As a twelfth aspect, in the dither mask generation method of the eleventh aspect, the nozzle relative ejection rate of the nozzle arranged at an end of the nozzle array is set to a value smaller than the nozzle relative ejection rate of the nozzle arranged at a center part of the nozzle array.

A dither mask generation device relating to a thirteenth aspect is a device that generates a dither mask used in halftone processing, and the dither mask generation device includes: a nozzle relative ejection rate setting unit that sets a nozzle relative ejection rate which is a control target of a nozzle ejection rate of each nozzle indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording, and which stipulates relative using ratio of the individual nozzles; a nozzle pattern setting unit that sets a nozzle pattern indicating correspondence relation between the individual pixels of the dither mask and the nozzles in charge of recording at respective pixel positions; a nozzle ejection rate limiting unit that sets an upper limit lower than the highest nozzle ejection rate to the nozzle ejection rates of the individual nozzles for each raster for the individual rasters in a main scanning direction, regarding at least some thresholds set to the individual pixels of the dither mask; and a threshold setting unit that sets the thresholds to the pixels of the dither mask based on the nozzle relative ejection rate, the nozzle pattern and a limitation by the upper limit.

In the dither mask generation device of the thirteenth aspect, matters similar to specific matters of the dither mask generation method specified in the second aspect to the twelfth aspect can be appropriately combined. In that case, a process (step) of processing or an operation specified in the dither mask generation method can be recognized as an element of a processing unit or a functional unit as a device in charge of the processing or the operation corresponding thereto.

A fourteenth aspect is a non-transitory and tangible computer-readable recording medium which stores a program for making a computer achieve a function of generating a dither mask used in halftone processing, such that when the program is read and executed by the computer, the computer is configured to perform: a nozzle relative ejection rate setting function of setting a nozzle relative ejection rate which is a control target of a nozzle ejection rate of each nozzle indicating a ratio of recording pixels for which each nozzle ejects ink to record a dot, in recording attending pixels allocated to each nozzle as pixels for which each of a plurality of nozzles in a recording head having the plurality of nozzles that eject ink is in charge of recording, and which stipulates relative using ratio of the individual nozzles; a nozzle pattern setting function of setting a nozzle pattern indicating correspondence relation between the individual pixels of the dither mask and the nozzles in charge of recording at respective pixel positions; a nozzle ejection rate limiting function of setting an upper limit lower than the highest nozzle ejection rate to the nozzle ejection rates of the individual nozzles for each raster for the individual rasters in a main scanning direction, regarding at least some thresholds set to the individual pixels of the dither mask; and a threshold setting function of setting the thresholds to the pixels of the dither mask based on the nozzle relative ejection rate, the nozzle pattern and a limitation by the upper limit.

In the program of the fourteenth aspect, matters similar to specific matters of the dither mask generation method specified in the second aspect to the twelfth aspect can be appropriately combined. In that case, a process (step) of processing or an operation specified in the dither mask generation method can be recognized as an element of "function" of the program that performs the processing or the operation corresponding thereto.

According to the present invention, it is possible to generate a dither mask capable of forming a halftone image in which stripes are not easily generated.

BRIEF DESCRIPTION OF THE DRAWINGS

FIG. 14 is a diagram illustrating an ejection rate pattern obtained from the nozzle relative ejection rate in FIG. 10 and the nozzle pattern in FIG. 11;

FIG. 15 is a diagram illustrating a uniform ejection rate pattern to be the same duty as the ejection rate pattern illustrated in FIG. 14;

FIG. 17 is a diagram illustrating one example of the nozzle pattern;

FIG. 18 is a diagram illustrating an ejection rate pattern obtained from the nozzle relative ejection rate in FIG. 16 and the nozzle pattern in FIG. 17;

FIG. 19 is a diagram illustrating a uniform ejection rate pattern to be the same duty as the ejection rate pattern illustrated in FIG. 18;

FIG. 22 is a diagram illustrating a setting example of dot allowing pixels in an example in which the number of paths in a main scanning direction is one path;

FIG. 25 is a diagram illustrating a setting example of dot priority pixels in an example in which the number of paths in the main scanning direction is one path;

FIG. 26 is a diagram illustrating a pixel array obtained by an AND operation of the dot priority pixels illustrated in FIG. 25 and the dot allowing pixels illustrated in FIG. 22;

FIG. 27 is a diagram illustrating an example of arrangement of the dot priority pixels set based on the nozzle relative ejection rates of the individual nozzles illustrated in FIG. 16 and the nozzle pattern illustrated in FIG. 17;

FIG. 28 is a diagram illustrating a pixel array obtained by an AND operation of the dot priority pixels illustrated in FIG. 27 and the dot allowing pixels illustrated in FIG. 23;

DETAILED DESCRIPTION OF THE EMBODIMENTS

Hereinafter, embodiments of the present invention are described in detail according to the accompanying drawings.

[Configuration Example of Inkjet Recording Device]

Figure 1:
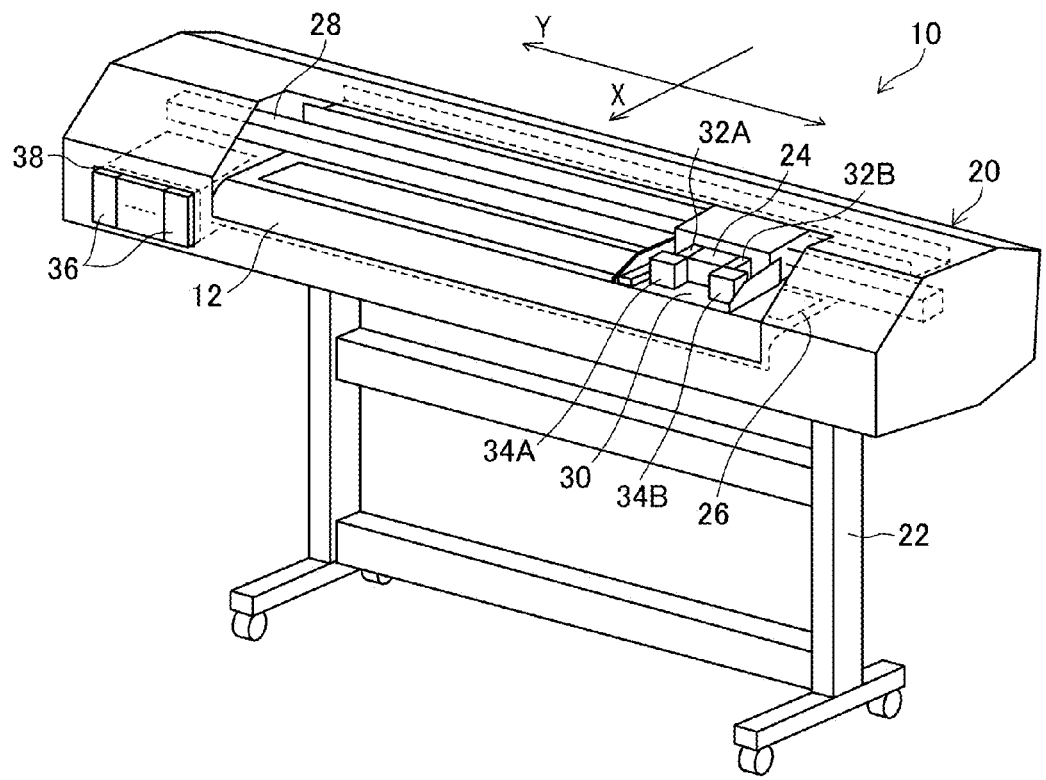
FIG. 1 is an external perspective view illustrating a configuration example of an inkjet recording device.

FIG. 1 is an external perspective view illustrating a configuration example of an inkjet recording device. An inkjet recording device 10 is one example of a serial type inkjet printer, and is a wide format printer that records a color image onto a recording medium 12 using ultraviolet curing type ink. However, in application of the invention, a form of the inkjet recording device is not limited to this example.

The inkjet recording device 10 includes a device body 20, and a support leg 22 that supports the device body 20. The device body 20 is provided with a recording head 24, a platen 26, a guide mechanism 28, and a carriage 30.

The recording head 24 is a drop-on-demand type inkjet head that ejects ink toward the recording medium 12. The term "recording head" has the same meaning as terms such as a print head, a printing head, a drawing head, an ink ejecting head, a liquid ejecting head, a droplet ejecting head, or a droplet jetting head or the like. Also, the term "inkjet recording device" has the same meaning as terms such as an inkjet printing device, an inkjet printing machine, an inkjet printer, or an inkjet type image forming apparatus or the like. "Recording" is used as a term that includes the meaning of print, printing, drawing or image formation.

For the recording medium 12, various media can be used regardless of a material such as paper, nonwoven fabric, vinyl chloride, synthetic chemical fibers, polyethylene, polyester, or tarpaulin. The recording medium 12 may be a permeable medium or may be an impermeable medium. The term "recording medium" is a general term of a medium to which ink is deposited, and includes the ones called by various terms such as a printing medium, a recording target medium, an image formation target medium, an image receiving medium, an ejection target medium, a print medium, recording paper or print paper. The term "paper" in the present specification is used for the same meaning as "recording medium".

The platen 26 is a member that supports the recording medium 12. The guide mechanism 28 and the carriage 30 function as a head moving device that movably supports the recording head 24. The guide mechanism 28 is arranged extending along a head scanning direction which is a direction that intersects with a conveyance direction of the recording medium 12 and is a direction parallel to a medium support surface of the platen 26 at an upper part of the platen 26. The upper part of the platen 26 means a high position on an upper side of the platen 26 with a gravity direction as "lower part". The conveyance direction of the recording medium 12 is sometimes called "paper feed direction". Also, a direction which is orthogonal to the paper feed direction and the direction parallel to a recording surface of the recording medium 12 is sometimes called "paper width direction".

The carriage 30 is supported movably back and forth in the paper width direction along the guide mechanism 28. The direction parallel to the reciprocating moving direction of the carriage 30 corresponds to "main scanning direction". Also, the direction parallel to the conveyance direction of the recording medium 12 corresponds to "sub scanning direction". That is, the paper width direction is the main scanning direction, and the paper feed direction is the sub scanning direction. In FIG. 1, the sub scanning direction is noted as an X direction, and the main scanning direction is noted as a Y direction.

The carriage 30 is loaded with the recording head 24, temporarily curing light sources 32A and 32B, and full curing light sources 34A and 34B. The recording head 24, the temporarily curing light sources 32A and 32B, and the full curing light sources 34A and 34B are integrally moved together with the carriage 30 along the guide mechanism 28. By moving the carriage 30 back and forth in the main scanning direction along the guide mechanism 28, the recording head 24 can be relatively moved in the main scanning direction to the recording medium 12.

The temporarily curing light sources 32A and 32B emit ultraviolet rays for temporarily curing ink impacted onto the recording medium 12. Temporary curing means partial curing of the ink so as to prevent movement and deformation of ink droplets immediately after deposition. A process of the temporary curing is sometimes called "partial curing", "semi-curing", "pinning" or "set" or the like. In the present specification, the term "temporary curing" is used.

On the other hand, a process of further emitting ultraviolet rays and sufficiently curing the ink after the temporary curing is called "full curing" or "curing". In the present specification, the term "full curing" is used. The full curing light sources 34A and 34B are light sources that perform additional exposure after the temporary curing and emit ultraviolet rays for completely curing (that is, fully curing) the ink finally.

The device body 20 is provided with an attaching unit 38 for attaching an ink cartridge 36. The ink cartridge 36 is a freely exchangeable ink tank that stores the ultraviolet curing type ink. The ink cartridge 36 is provided corresponding to the ink of each color used in the inkjet recording device 10. The inkjet recording device 10 of this example is configured to use the ink of four colors that are cyan (C), magenta (M), yellow (Y), and black (K). The individual ink cartridges 36 for the respective colors are connected to the recording head 24 by respectively independently formed ink supply routes not shown in the figure. When an ink residual amount of each color becomes small, the ink cartridge 36 is exchanged.

Though omitted in the figure, on a right side facing the front of the device body 20, a maintenance unit of the recording head 24 is provided. The maintenance unit includes a cap for moisture retention and nozzle suction of the recording head 24 when printing is not performed, and a wiping member for cleaning a nozzle surface which is an ink ejection surface of the recording head 24. For the wiping member, a blade and/or a web can be used.

[Configuration of Recording Medium Conveyance Path]

Figure 2:
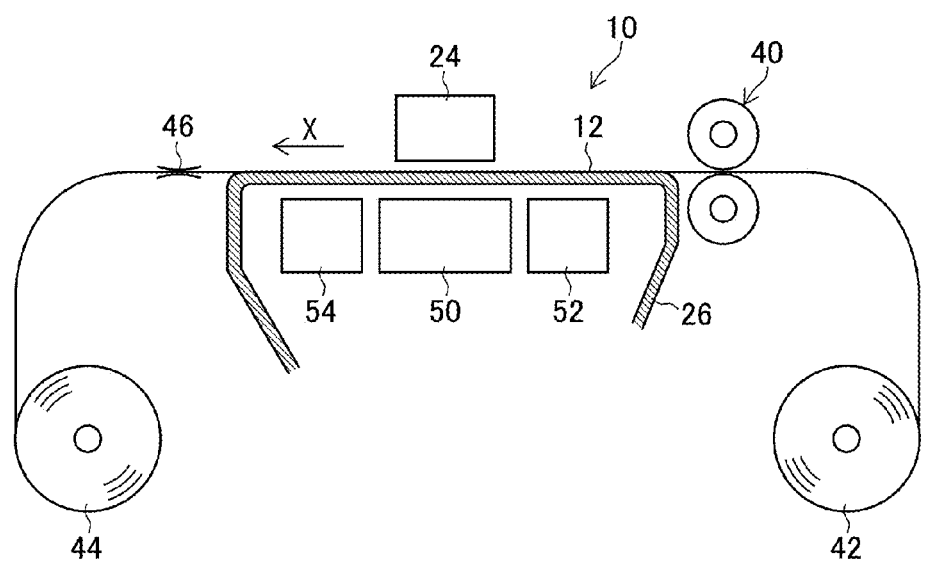
FIG. 2 is a schematic diagram schematically illustrating a recording medium conveyance path of the inkjet recording device.

FIG. 2 is a schematic diagram schematically illustrating a recording medium conveyance path of the inkjet recording device 10. As illustrated in FIG. 2, an upper surface of the platen 26 becomes a support surface of the recording medium 12. A nip roller 40 is disposed on an upstream side of the paper feed direction relative to a position of the platen 26.

The recording medium 12 of this example is supplied in a form of continuous paper (also called web paper) wound in a roll shape. The recording medium 12 sent out from a roll 42 on a supply side is conveyed by the nip roller 40. To the recording medium 12 which arrives at a part right below the recording head 24, an image is recorded by the recording head 24. On a downstream side of the paper feed direction relative to the position of the recording head 24, a winding roll 44 that winds the recording medium 12 after the image is recorded is provided. Also, in the conveyance path of the recording medium 12 between the platen 26 and the winding roll 44, a guide 46 is provided.

In the inkjet recording device 10 of the present embodiment, a roll-to-roll type paper conveyance device by which the recording medium 12 sent out from the roll 42 on the supply side is wound to the winding roll 44 through the platen 26 is adopted. However, in implementing the invention, the configuration of the paper conveyance device is not limited to this example. For example, a form that the winding roll 44 is omitted and a form that has a cutter which cuts the recording medium 12 into a desired size or the like are also possible. Also, the recording medium 12 is not limited to the continuous paper, and may be a form of cut paper that is separated sheet by sheet (that is, sheet paper).

On a back surface side of the platen 26, that is, on an opposite side of the medium support surface that supports the recording medium 12 on the platen 26, a temperature control unit 50 that adjusts a temperature of the recording medium 12 while recording images is provided. By temperature adjustment by the temperature control unit 50, a physical property value such as viscosity or surface tension of the ink impacted on the recording medium 12 is turned to a desired value, and a desired dot diameter can be obtained. Also, a pre-temperature-control unit 52 is provided on the upstream side in the paper feed direction of the temperature control unit 50, and an after-temperature-control unit 54 is provided on the downstream side in the paper feed direction of the temperature control unit 50. The configuration of omitting the pre-temperature-control unit 52 and/or the after-temperature-control unit 54 is also possible.

[Configuration Example of Recording Head]

Figure 3:
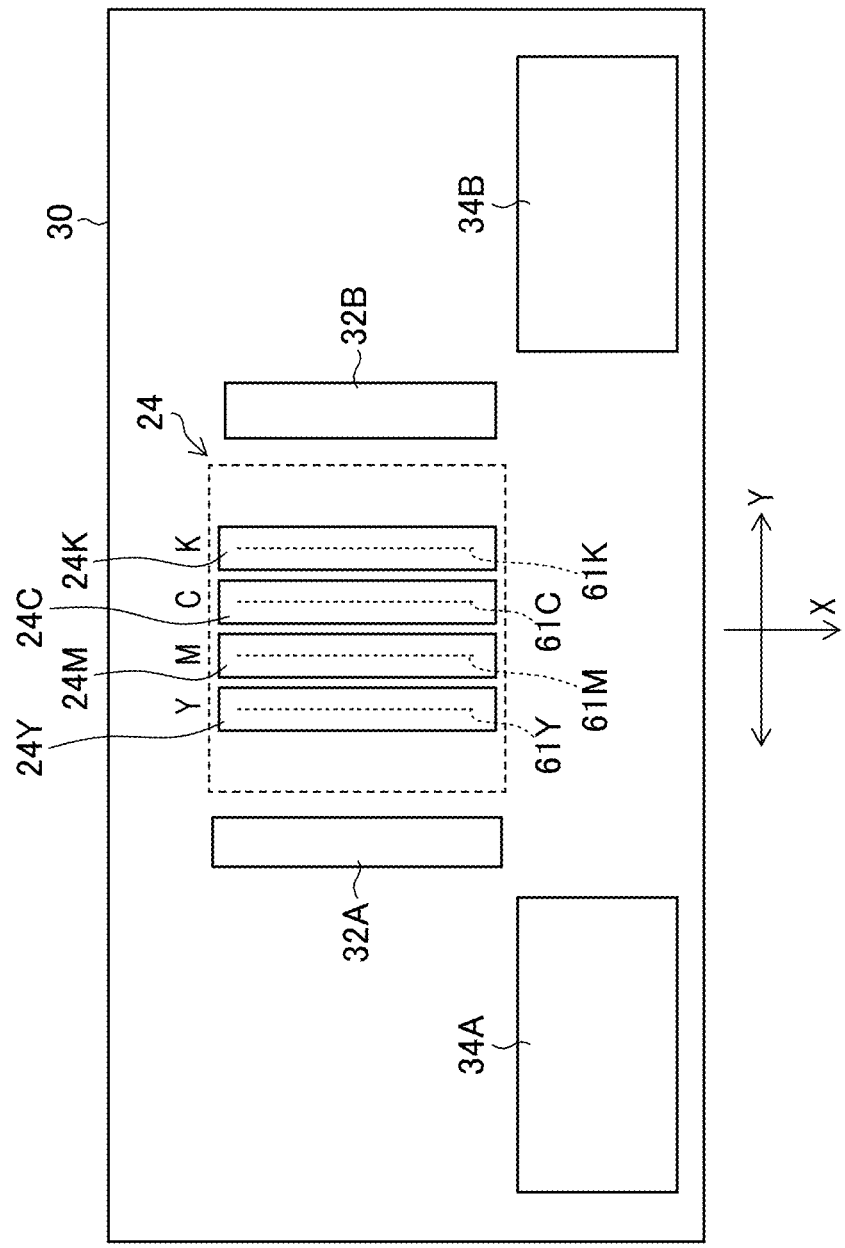
FIG. 3 is a plane transparent view illustrating an example of an arrangement form of a recording head arranged on a carriage.
Figure 4:
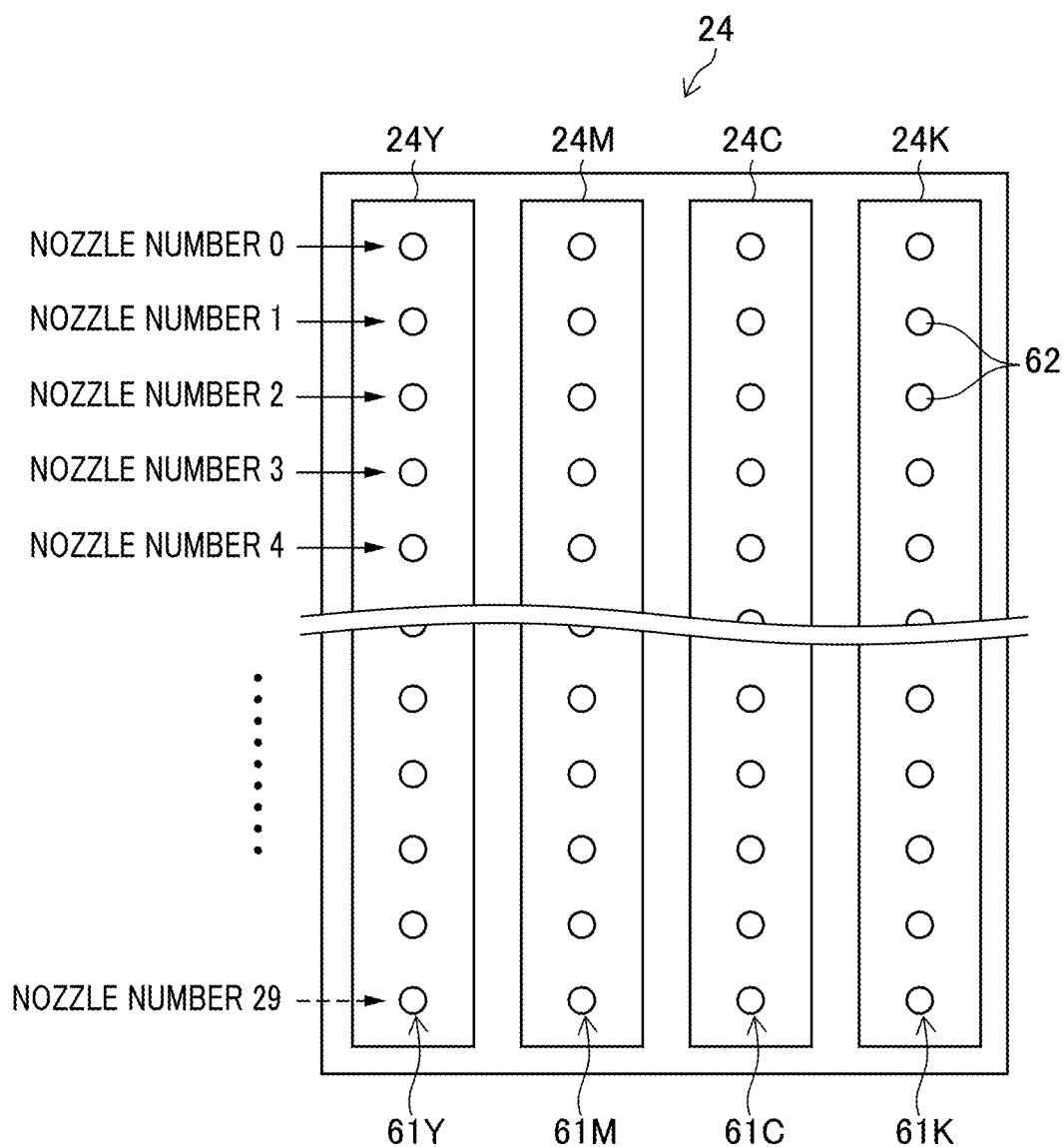
FIG. 4 is an enlarged view of the recording head in FIG. 3.

FIG. 3 is a plane transparent view illustrating an example of an arrangement form of the recording head 24, the temporarily curing light sources 32A and 32B and the full curing light sources 34A and 34B arranged on the carriage 30. FIG. 4 is an enlarged view of the recording head 24 in FIG. 3.

As illustrated in FIG. 3 and FIG. 4, the recording head 24 is provided with nozzle arrays 61C, 61M, 61Y and 61K formed by arraying nozzles 62 (see FIG. 4) for ejecting the ink of the respective colors in the sub scanning direction, for each of the ink of the respective colors that are cyan (C), magenta (M), yellow (Y) and black (K).

In FIG. 3, the nozzle arrays are illustrated by dotted lines, and individual illustrations of the nozzles are omitted. In the recording head 24 illustrated in FIG. 3 and FIG. 4, an example that the individual nozzle arrays are arranged in an order of the nozzle array 61Y for yellow, the nozzle array 61M for magenta, the nozzle array 61C for cyan, and the nozzle array 61K for black from the left of the figure is illustrated, however, kinds (the number of the colors) of the ink colors and color combinations are not limited by the present embodiment.

For example, in addition to four colors of CMYK, the configuration of using light shade ink such as light cyan or light magenta, or the configuration of using the ink of other special colors further instead of the light shade ink or in combination with the light shade ink is also possible. A form of adding a nozzle array that ejects pertinent ink corresponding to the kind of the ink color to be used is possible. Also, an arranging order of the nozzle arrays for the respective colors is not limited in particular. However, it is preferable to arrange the nozzle array of the ink whose curing sensitivity to ultraviolet rays is relatively low among a plurality of ink kinds on a side close to the temporarily curing light source 32A or 32B.

In the present embodiment, a head module is configured for each of the nozzle arrays 61C, 61M, 61Y and 61K for the respective colors, and the recording head 24 is configured by lining the head modules. Specifically, a head module 24Y having the nozzle array 61Y that ejects yellow ink, a head module 24M having the nozzle array 61M that ejects magenta ink, a head module 24C having the nozzle array 61C that ejects cyan ink, and a head module 24K having the nozzle array 61K that ejects black ink are arranged at equal intervals so as to be lined along the reciprocating moving direction (that is, the main scanning direction) of the carriage 30.

The entire module group of the head modules 24Y, 24M, 24C and 24K for the respective colors may be interpreted as "recording head", or it is also possible to interpret each head module as "recording head" respectively. Also, instead of the configuration of combining the head modules 24Y, 24M, 24C and 24K for the respective colors, the configuration of forming ink flow paths separately for the respective colors inside one recording head and having the nozzle array that ejects the ink of the plurality of colors by one head is also possible.

As illustrated in FIG. 4, for each of the nozzle arrays 61C, 61M, 61Y and 61K, the plurality of nozzles 62 are lined and arrayed at fixed intervals in the sub scanning direction. FIG. 4 illustrates an example that 30 pieces of the nozzles 62 are arrayed respectively in the nozzle arrays 61C, 61M, 61Y and 61K for the respective colors. To the individual nozzles 62, nozzle numbers 0-29 are imparted.

The nozzle numbers in this example are imparted to the individual nozzles 62 by consecutive numbers in an order from one end side to the other end side in the sub scanning direction in the nozzle array. In this example, the nozzle numbers start from the number 0, however, a leading number of the nozzle numbers may be the number 1. The leading number can be an arbitrary integer equal to or larger than 0. The nozzle numbers can be used as identification numbers indicating positions of the individual nozzles 62.

Also, the nozzle array in which 30 pieces of the nozzles 62 are arranged in one line along the sub scanning direction is illustrated, however, the number of the nozzles configuring the nozzle array and an arrangement form of the nozzles are not limited to this example. For example, it is possible to form the nozzle array in which the nozzles are lined at equal intervals in the sub scanning direction by a two-dimensional nozzle array for which the plurality of nozzle arrays are combined.

As an ink ejection system of the recording head 24, a piezojet system of jetting the ink by deformation of a piezoelectric element is adopted. The configuration of using an electrostatic actuator instead of the piezoelectric element as an ejection energy generating element is also possible. Also, it is possible to adopt a thermal jet system of generating air bubbles by using a heat generating body (heating element) such as a heater and heating the ink, and jetting ink droplets by the pressure. However, since generally the ultraviolet curing type ink is highly viscous compared to solvent ink, in the case of using the ultraviolet curing type ink, it is preferable to adopt the piezojet system of relatively great ejection power.

The recording head 24 ejects the ink to the recording medium 12 while moving in the main scanning direction, and performs image recording in an area having a fixed length in the sub scanning direction of the recording medium 12. Then, when the recording medium 12 is moved by a fixed amount in the sub scanning direction after the image recording, the recording head 24 performs the similar image recording in the next area, and thereafter, repeatedly performs the similar image recording every time the recording medium 12 is moved by the fixed amount in the sub scanning direction, and can perform the image recording over the entire surface of a recording area of the recording medium 12.

In this way, the recording head 24 is a serial type recording head. The inkjet recording device 10 (see FIG. 1) of the present embodiment adopts a multipath system that achieves a predetermined recording resolution by a plurality of times of scanning by the recording head 24 in the main scanning direction.

[Configuration of Control System of Inkjet Recording Device]

Figure 5:
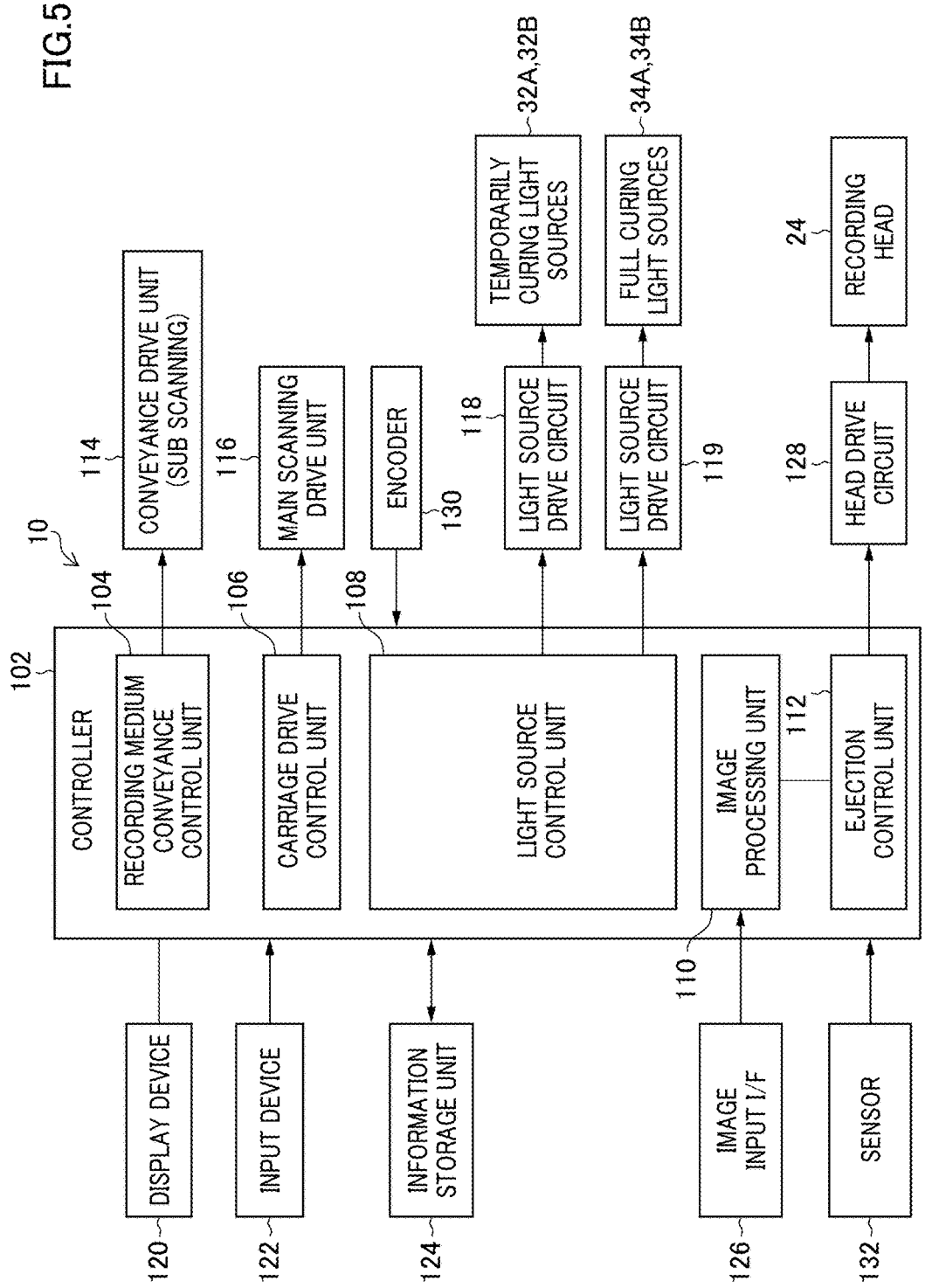
FIG. 5 is a block diagram illustrating a configuration of the inkjet recording device.

FIG. 5 is a block diagram illustrating the configuration of the inkjet recording device 10. As illustrated in FIG. 5, the inkjet recording device 10 includes a controller 102. As the controller 102, for example, a computer including a central processing unit (CPU) can be used. The controller 102 generally controls the entire inkjet recording device 10 by executing various kinds of programs read from an information storage unit 124.

The controller 102 includes a recording medium conveyance control unit 104, a carriage drive control unit 106, a light source control unit 108, an image processing unit 110, and an ejection control unit 112. These respective units can be realized by hardware or software, or the combination thereof. "Software" has the same meaning as "program" or "application".

The recording medium conveyance control unit 104 controls a conveyance drive unit 114 that conveys the recording medium 12. The conveyance drive unit 114 includes a drive motor that drives the nip roller 40 (see FIG. 2), and a drive circuit thereof. The recording medium 12 conveyed onto the platen 26 is intermittently fed in the sub scanning direction by a swath width unit, matched with scanning (movement of a print path) in the main scanning direction by the recording head 24. A swath width is a length in the sub scanning direction determined by a repetition cycle of a scan by the reciprocating movement of the carriage 30, and is obtained by dividing a nozzle array length which is the length in the sub scanning direction of the nozzle array by the number of paths which is the number of times of repeating the scan. The number of the paths which is the number of times of repeating the scan is the number of times of the scanning required for completing drawing by a set recording resolution, and is determined by an image drawing mode. Details of the image drawing mode are described later.

The carriage drive control unit 106 controls a main scanning drive unit 116 that moves the carriage 30 in the main scanning direction. The main scanning drive unit 116 includes a drive motor connected to a moving mechanism of the carriage 30, and a control circuit thereof.

To the drive motor of the main scanning drive unit 116 and the drive motor of the conveyance drive unit conveyance drive unit 114 described above, an encoder 130 is attached. The encoder 130 inputs pulse signals according to a rotation amount and a rotation speed of each drive motor to the controller 102. Thus, the controller 102 can recognize a position of the carriage 30 and a position of the recording medium 12 on the basis of the pulse signals inputted from the encoder 130.

The light source control unit 108 controls light emission of the temporarily curing light sources 32A and 32B through a light source drive circuit 118, and controls light emission of the full curing light sources 34A and 34B through a light source drive circuit 119.

The image processing unit 110 executes image processing to image data inputted through an image input interface 126, and converts the image data to dot data for print. In FIG. 5, for simplification of notation, a notation "IF" is used as a substituting notation substituting a description of an interface. IF is an abbreviation notation of "interface".

The image processing unit 110 functions as a halftone processing unit that executes halftone processing by a dither method. That is, the image processing unit 110 performs quantization processing of a pixel value using a dither mask to a continuous gradation image which is the inputted image data, and generates a halftone image corresponding to the dot data for print. The dither mask used in the halftone processing in the image processing unit 110 is generated by applying the present invention. A method of generating the dither mask is described later.

The ejection control unit 112 controls ejection of the ink from the individual nozzles 62 of the recording head 24, by controlling a head drive circuit 128 that drives the recording head 24 on the basis of the dot data generated in the image processing unit 110.

For the information storage unit 124, a nonvolatile memory is used for example, and various kinds of programs required for control of the controller 102 and various kinds of data are stored. For example, the information storage unit 124 stores, as the programs, a control program to be executed by the individual units of the controller 102, and a scanning pattern program, or the like. The scanning pattern program is a program for multipath type image recording, and defines reciprocating scanning (the movement of the print path) in the main scanning direction by the recording head 24 to the recording medium 12 intermittently conveyed in the sub scanning direction, and the number of the paths (the number of times of repeating the scan). The movement of the print path accompanied by the movement of the recording head 24 in the main scanning direction includes at least one of a moving direction of the recording head 24 when forming dots, selection of the nozzle to eject the ink, and an ejection timing. A pattern of the scanning determined by a combination of the movement of the print path and the number of the paths is called "scanning pattern".

To the controller 102, an input device 122 and a display device 120 are connected. For the input device 122, for example, various kinds of devices such as a keyboard, a mouse, a touch panel or an operation button can be adopted, and it may be an appropriate combination thereof. The input device 122 inputs external operation signals by a manual operation of an operator who is a user to the controller 102.

For the display device 120, a liquid crystal display or the like is used. An operator can input various kinds of information using the input device 122. Also, an operator can confirm various kinds of information such as input contents and a state of a system or the like through display at the display device 120.

A sensor 132 is attached to the carriage 30. The controller 102 can recognize a width of the recording medium 12 on the basis of sensor signals inputted from the sensor 132.

[Explanation of Multipath Type Image Recording Method]

Figure 6:
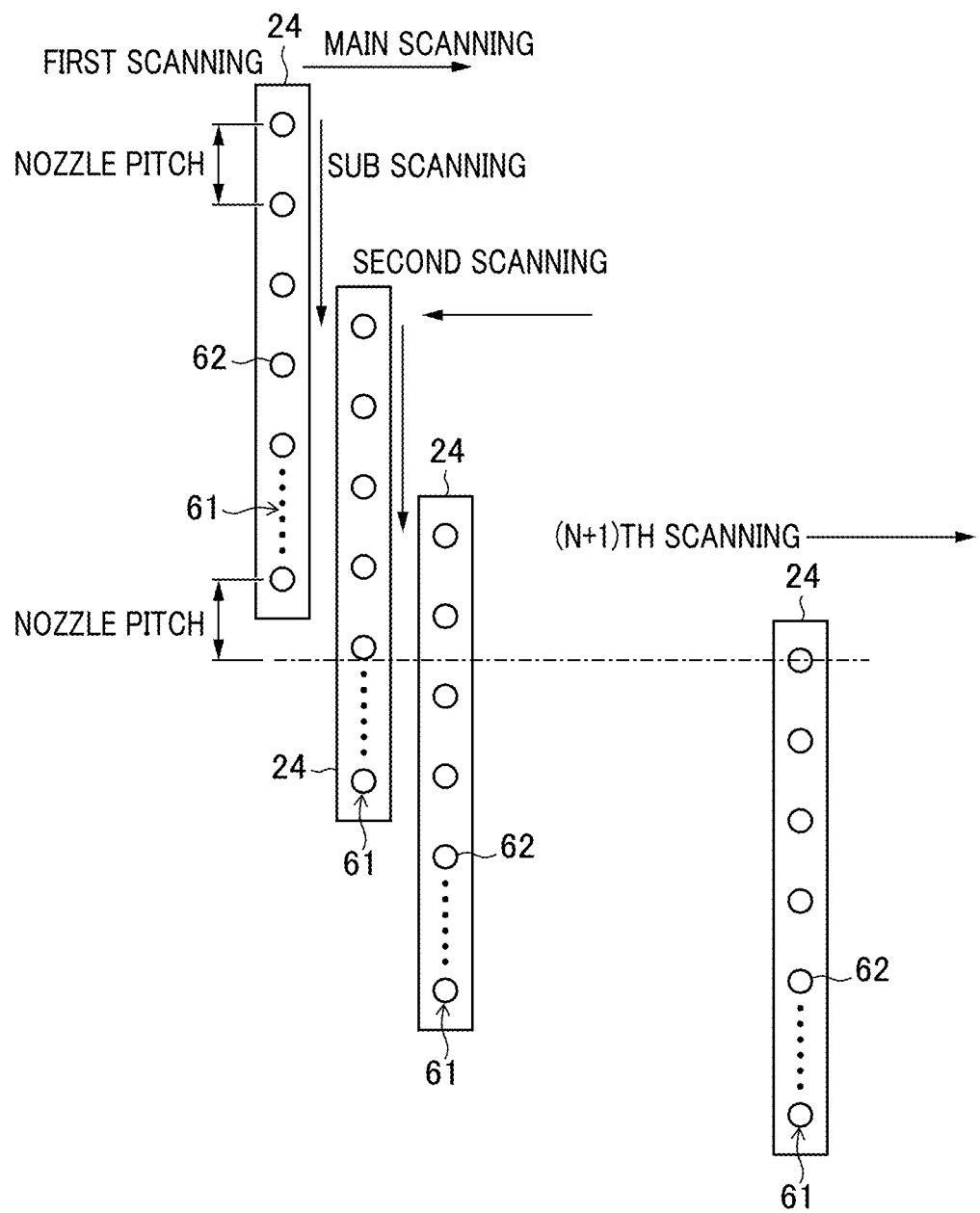
FIG. 6 is an explanatory diagram for explaining one example of a multipath type image recording method.

FIG. 6 is an explanatory diagram for explaining one example of a multipath type image recording method. Here, in order to simplify an explanation, the configuration of the recording head 24 is simplified, and the case that there is only one nozzle array of the recording head 24 and recording is performed by one nozzle array 61 is described as an example. It can be understood that the nozzle array 61 is indicated representing any one array of the nozzle arrays 61C, 61M, 61Y and 61K described in FIG. 4.

Also, for the configuration of intermittently feeding the recording medium in the sub scanning direction, for convenience of the illustration, in FIG. 6, the illustration is such that the recording medium is stopped and the recording head 24 is intermittently moved in the sub scanning direction. In FIG. 6, the illustration of the recording medium is omitted, and only the movement of the recording head 24 is illustrated.

As illustrated in FIG. 6, the ink is ejected from the nozzles 62 when the recording head 24 is moved in the main scanning direction (a crosswise direction in FIG. 6). By the combination of the reciprocating movement of the recording head 24 along the main scanning direction and intermittent feed of the recording medium in the sub scanning direction (a longitudinal direction in FIG. 6), two-dimensional image recording is performed on the recording medium. The term "image recording" may be replaced with the term of drawing, image drawing, print or image formation.

An operation that the recording head 24 ejects the ink from the nozzles 62 and records dots while moving in the main scanning direction is called "scan" or "scanning". For the scan, there may be the scan performed in an outward path in the main scanning direction and the scan performed in a homeward path. The image may be recorded by the scan in both directions of the outward path and the homeward path, and the image may be recorded by the scan in only one direction of the outward path or the homeward path. In the case of performing the scan in both directions of the outward path and the homeward path, the scan of reciprocating once is counted as execution of two times of the scan for the outward path scan and the homeward path scan.

In the case of defining N as a natural number and completing the image of a desired recording resolution by N times of the scan, relative positional relation (here, the positional relation in the sub scanning direction) between the recording medium of the (N+1)th scanning and the recording head 24 becomes the relation illustrated in FIG. 6. That is, in order to perform the image recording of the desired recording resolution by N times of writing, the positional relation is such that the recording medium is intermittently fed in the sub scanning direction for the first time, the second time, the third time, . . . and is connected to a position corresponding to the length of the nozzle array just at the (N+1)th time. In order to seamlessly connect the operation of writing N times, movement is made in the sub scanning direction by a portion of "the nozzle array length+one nozzle pitch" from the sub scanning direction position of the first scanning and the (N+1)th scanning is performed. "Nozzle array length" is the length in the sub scanning direction of the nozzle array 61 in which the nozzles 62 are lined and arrayed in the sub scanning direction, and corresponds to an inter-nozzle distance of the nozzles positioned at both ends of the nozzle array. "Nozzle pitch" is a nozzle interval in the sub scanning direction in the nozzle array.

As one example, the case of using the recording head 24 having the nozzle array 61 in which the nozzles 62 are lined at a nozzle array density 100 npi, and achieving the recording resolution of main scanning 600 dpi×sub scanning 400 dpi by eight paths (eight times of writing) of two paths in the main scanning direction and four paths in the sub scanning direction (main 2×sub 4) is considered. A unit npi (nozzle per inch) is a unit indicating the number of nozzles per inch. A unit dpi (dot per inch) is a unit indicating the number of dots per inch. One inch is about 25.4 millimeters.

Here, an interval of deposition points determined from the recording resolution is called "deposition point interval", and a lattice indicating positions of recordable deposition points is called "deposition point lattice". "Deposition point" has the same meaning as "pixel" for which recording or non-recording of the dot can be controlled. "Deposition point interval" has the same meaning as "pixel interval", and corresponds to the minimum dot interval at the recording resolution. "Deposition point lattice" has the same meaning as "pixel lattice". "Lattice" has the same meaning as cells of a matrix expressed by rows and columns.

In the case of the recording resolution of main scanning 600 dpi×sub scanning 400 dpi, the deposition point interval in the main scanning direction is 25.4 (millimeters)/600=42.3 micrometers, and the deposition point interval in the sub scanning direction is 25.4 (millimeters)/400=63.5 micrometers. This indicates a size "42.3 micrometers×63.5 micrometers" of one cell (corresponding to one pixel) of the deposition point lattice. For feed control of the recording medium 12 and control of a deposition position (that is, a deposition timing) from the recording head 24, a feed amount and the position are controlled with the deposition point interval determined from the recording resolution as a unit. The deposition point interval determined from the recording resolution is sometimes called "resolution pitch" or "pixel pitch". Also, while the nozzle pitch can be indicated by a unit of the length, instead, it can be indicated with the deposition point interval (pixel pitch) in the sub scanning direction as a unit. For example, in the case that the nozzle array density is 100 npi for the recording resolution of sub scanning 400 dpi, since the nozzle pitch is four times the pixel pitch in the sub scanning direction, with the pixel pitch in the sub scanning direction as the unit, the nozzle pitch can be expressed as "4".

In the case of N=8 by two paths in the main scanning direction and four paths in the sub scanning direction, to fill a deposition point line in the main scanning direction by two times of the scanning and to fill a deposition point line in the sub scanning direction by four times of the scanning, recording of 2×4 pieces of deposition point lattices is performed by eight times of the scanning (that is, eight paths). "Deposition point line" means a scanning line and has the same meaning as a raster line.

Figure 7:
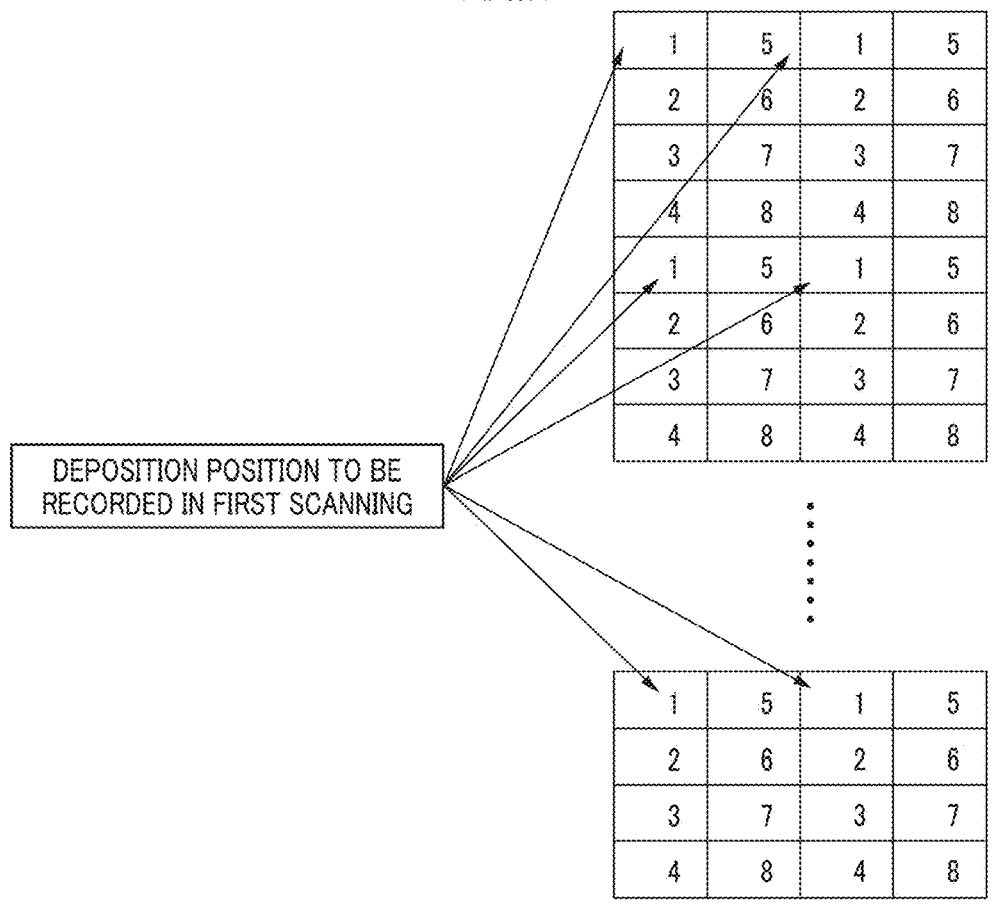
FIG. 7 is a schematic diagram schematically illustrating relation between a number of each scanning by a drawing operation of writing eight times and a deposition position recorded by the scanning.

FIG. 7 is a schematic diagram schematically illustrating relation between a number (1 to 8) of each scanning by a drawing operation of writing eight times and a deposition position recorded by the scanning. In FIG. 7, the individual cells to which numbers of 1 to 8 are attached indicate the deposition positions (pixel positions) to be recorded by the nozzles 62, and the numbers 1-8 indicate the number of the scanning indicating in the scanning of what order the pixel position is to be recorded. For example, the cell (pixel) to which the number "1" is attached indicates the deposition position to be recorded in the first scanning.

As is clear from FIG. 7, for an arrangement distribution of the numbers 1 to 8 indicating a scanning order to record the individual deposition positions, the lattice of "2×4" of main 2×sub 4 is a basic unit of repetition. The lattice of 2×4 is called "basic unit lattice" or "2×4 lattice". A method of filling the 2×4 lattice (a deposition order) can be variously assumed without being limited to the example illustrated in FIG. 7.

According to the image drawing mode, the recording resolution and the scanning pattern are determined, and the number of the cells of the basic unit lattice, an array form of the cells, and the numbers (scanning orders) of the scanning of the individual cells are determined.

[Example of Image Drawing Mode]

As already described, for the inkjet recording device 10, multipath type drawing control is applied, and the recording resolution can be changed by changing the number of the print paths. For example, three kinds of modes that are a high production mode, a standard mode, and a high image quality mode are prepared, and the recording resolution is different respectively in the individual modes. The recording resolution has the same meaning as "printing resolution". The image drawing mode can be selected according to print purposes or uses. The term "image drawing mode" may be replaced with "print mode".

A specific description is given with a simple numerical example. It is assumed that the nozzle array density in the sub scanning direction of the nozzle array 61 in the recording head 24 is 100 npi.

In the case of the high production mode, recording is performed by the recording resolution of main scanning 600 dpi×sub scanning 400 dpi, and the recording by the recording resolution of 600 dpi is achieved by two paths (two times of the scanning) in the main scanning direction. That is, dots are formed by the resolution of 300 dpi in the first scanning (outward path of the carriage 30). In the second scanning (homeward path), dots are formed so as to complement the middle of the dots formed by the first scanning (outward path) by 300 dpi, and the resolution of 600 dpi is obtained for the main scanning direction.

On the other hand, for the sub scanning direction, the nozzle pitch is 100 npi, and dots are formed by the resolution of 100 dpi in the sub scanning direction by one time of main scanning (one path). Therefore, the recording resolution of 400 dpi is achieved by performing complementary printing by four-path printing (four times of the scanning).

In the standard mode, recording is executed by the recording resolution of 600 dpi×800 dpi, and the resolution of 600 dpi×800 dpi is obtained by two-path printing in the main scanning direction, and eight-path printing in the sub scanning direction.

In the high image quality mode, printing is executed by the resolution of 1200 dpi×1200 dpi, and the recording resolution of 1200 dpi×1200 dpi is obtained by four paths in the main scanning direction and 12 paths in the sub scanning direction.

[About Nozzle Ejection Rate]

Here, the nozzle ejection rate is described. The nozzle ejection rate is a value indicating a ratio of recording pixels for which each nozzle 62 ejects ink to record a dot in recording attending pixels allocated to each nozzle as pixels for which each of the plurality of nozzles 62 in the recording head 24 is in charge of recording.

The nozzle ejection rate is determined for each nozzle. The nozzle ejection rate is indicated by the quotient of division, whose denominator is the number of the recording attending pixels allocated to each nozzle, and whose numerator is the number of the recording pixels for which each nozzle ejects ink to record a dot, and can be indicated by a numerical value equal to or larger than 0 and equal to or smaller than 1. Also, the nozzle ejection rate can be also indicated by a percentage. The nozzle ejection rate increases as a duty increases, and becomes "1.0" or "100%" which is a maximum value at the duty 100%.

In short, the nozzle ejection rate indicates a ratio of ejecting ink for each nozzle 62. The ratio of ejecting ink for each nozzle 62 is equal to the ratio of the recording pixels for each nozzle 62. The nozzle ejection rate can be understood as the ratio of using the nozzles, and can be considered as a nozzle using rate or a nozzle operation rate.

Specifically, the nozzle ejection rate indicates a using rate for each nozzle 62, in the case that the using rate for each nozzle 62 when recording of a solid pattern which is a uniform gradation image of the maximum density is performed is defined as "1.0" or "100%" which is a reference value. The using rate for each nozzle 62 may be replaced with an ink ejection amount for each nozzle 62 or may be replaced with the number of pixels of the recording pixels for each nozzle 62.

In contrast, a relative using ratio of the individual nozzles is called a nozzle relative ejection rate. The nozzle relative ejection rate is a control target of the nozzle ejection rate, and indicates a relative ratio of the nozzle ejection rates of the individual nozzles.

The nozzle relative ejection rate has a meaning in a relative ratio between the nozzles of the nozzle ejection rates of the individual nozzles, and an absolute value and the maximum value of the numerical value itself of the nozzle relative ejection rate do not have a meaning as a physical quantity in particular. For the absolute value of the nozzle relative ejection rates of the individual nozzles, a total sum of the nozzle relative ejection rates of all the nozzles may be standardized to 1, the maximum value may be standardized to 1, or it may be the ratio of the recording pixels to the recording attending pixel number for each nozzle. In the present embodiment, for convenience, the nozzle ejection rate of maximum ejection (maximum using rate) is defined as "1.0", and the nozzle relative ejection rate is indicated by the ratio to the maximum value.

When generating a dither mask, the nozzle relative ejection rate as the control target is determined, and the thresholds of the individual pixels are set so as to increase the nozzle ejection rate while roughly keeping the nozzle relative ejection rate (the relative ratio of the nozzle ejection rates of the individual nozzles) together with increase of the duty.

Figure 8:
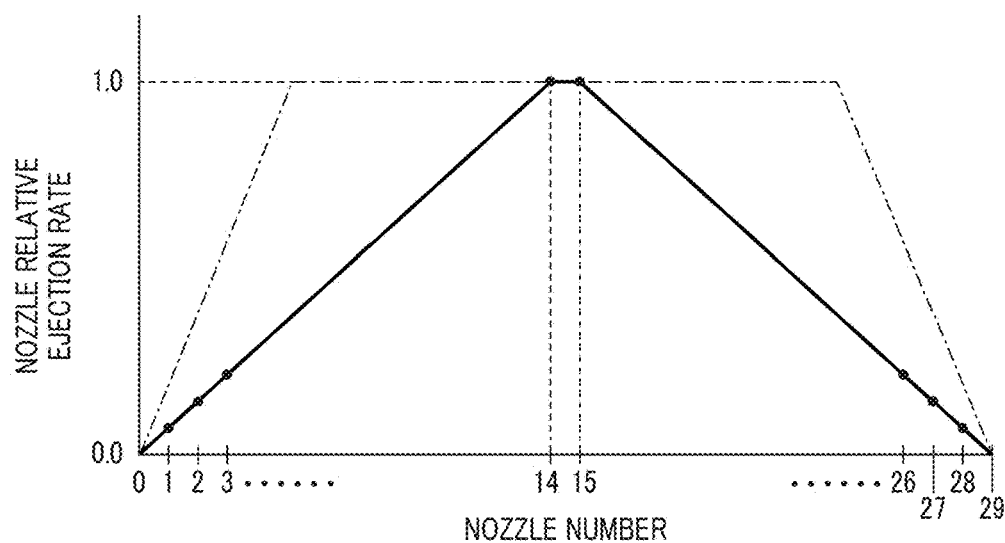
FIG. 8 is a diagram illustrating one example of data of a nozzle relative ejection rate determined for each nozzle.

FIG. 8 is a diagram illustrating one example of data of the nozzle relative ejection rate determined for each nozzle. In FIG. 8, a horizontal axis indicates the nozzle number, and a vertical axis indicates the nozzle relative ejection rate corresponding to each nozzle number. In FIG. 8, the nozzle relative ejection rate of the nozzle of the maximum ejection is defined as "1.0", and the nozzle relative ejection rates of the individual nozzles with respect to it are indicated.

Also, in the example illustrated in FIG. 8, to suppress banding, the nozzle relative ejection rate of the nozzle arranged at the end of the nozzle array is set to be lower than the nozzle relative ejection rate of the nozzle arranged at the center part of the nozzle array. For example, as illustrated by a solid line in FIG. 8, the nozzle relative ejection rate is set to be gradually high from the individual nozzles at both ends of the nozzle number 0 and the nozzle number 29 positioned at both ends of the nozzle array to the nozzles of the nozzle number 14 and the nozzle number 15 positioned at the center part of the nozzle array respectively.

Or, as illustrated by a dashed line in FIG. 8, the nozzle relative ejection rate of the nozzle groups positioned at both ends of the nozzle array (for example, the nozzle group of the nozzle numbers 0 to 5 and the nozzle group of the nozzle numbers 24 to 29) may be set relatively low, and the nozzle relative ejection rate of the nozzles positioned between both ends may be set at "1.0", and regarding setting of the nozzle relative ejection rate, not only the example illustrated in FIG. 8 but also various setting forms can be assumed.

The nozzle relative ejection rate for each nozzle can be arbitrarily set by a user in addition to the configuration programed beforehand. For example, a user can input the nozzle relative ejection rate for each nozzle by utilizing an appropriate user interface, or select a desired pattern from two or more kinds of prepared nozzle relative ejection rate data candidate patterns.

[Explanation of Problem]

Here, the problem to be solved by the present invention is described specifically with the case that the number of paths in the main scanning direction is one path and the case that the number of paths is two paths as examples.

<Case that the Number of Paths in Main Scanning Direction is One Path>

Figure 9:
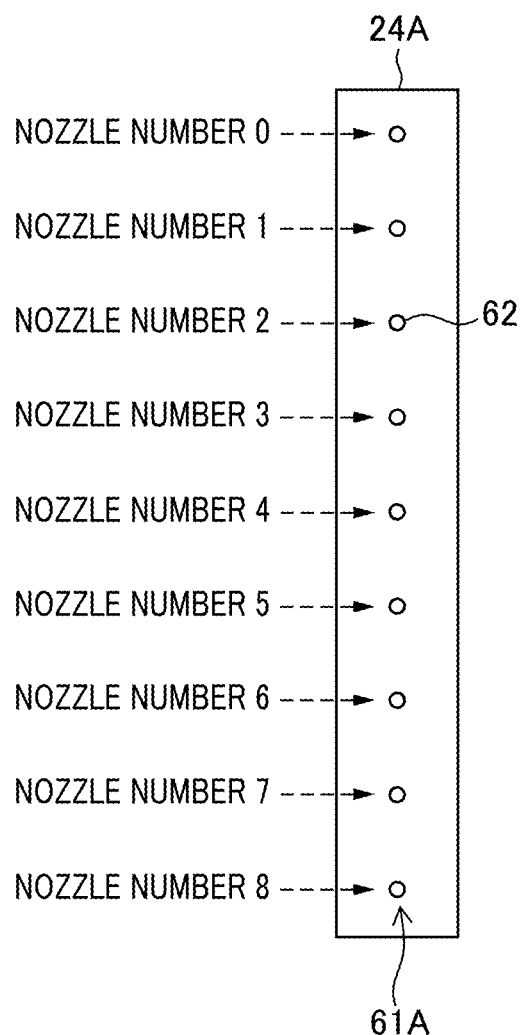
FIG. 9 is a schematic diagram of the recording head for which the number of the nozzles is nine.

In order to simplify the description, an example of using a recording head for which the number of the nozzles is nine is described. FIG. 9 is a schematic diagram of the recording head for which the number of the nozzles is nine. As illustrated in FIG. 9, a recording head 24A has a nozzle array 61A in which nine nozzles 62 are arranged in one line at equal intervals in the sub scanning direction. From the nozzle 62 at an upper end in FIG. 9 which is one end of the nozzle array 61A to a lower end in FIG. 9 which is the other end, respectively intrinsic nozzle numbers 0, 1, 2 . . . 8 are imparted in an order to the individual nozzles 62. The nozzle array density of the nozzle array 61A can be variously designed, and is assumed to be 300 npi in the sub scanning direction for example.

Figures 10, 11:
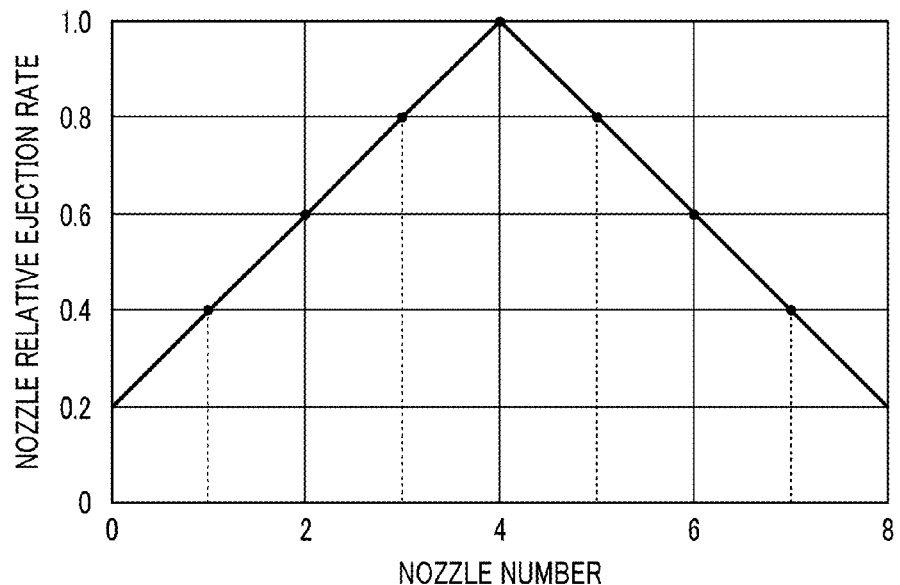
FIG. 10 is a graph illustrating a setting example of a nozzle relative ejection rate.
FIG. 11 is a diagram illustrating one example of the nozzle pattern.

FIG. 10 is a graph illustrating a setting example of the nozzle relative ejection rate. The horizontal axis indicates the nozzle number, and the vertical axis indicates the nozzle relative ejection rate. The maximum value of the nozzle relative ejection rate is defined as 1.0. The nozzle relative ejection rate of the individual nozzles 62 in the nozzle array 61A of the recording head 24A illustrated in FIG. 9 can be set as in FIG. 10.

FIG. 11 is a diagram illustrating one example of the nozzle pattern. In FIG. 11, an example of the mask size of 18 rows×18 columns is illustrated, and to the individual pixels, the respectively corresponding nozzle numbers are written. The nozzle numbers corresponding to the individual pixels mean the nozzle numbers of the nozzles in charge of the recording of the individual pixels.

In the case that m and n are natural numbers respectively and the dither mask which is a generation target is a matrix of m rows×n columns, the respectively corresponding nozzle numbers are determined for the individual pixels of the image area formed by a two-dimensional pixel array of m rows×n columns. A pattern of the nozzle numbers in which the corresponding nozzle numbers are determined for the individual pixels of the dither mask is called "nozzle pattern".

The nozzle pattern illustrated in FIG. 11 is an example of the nozzle pattern corresponding to the dither mask of 18×18 pixels in the case that the recording resolution is 600 dpi×600 dpi, the nozzle array density is 300 npi, the number of the nozzles is nine, a paper feed amount is 9/600 dpi, and the number of paths in the main scanning direction is 1. That is, the nozzle pattern illustrated in FIG. 11 illustrates the nozzle numbers corresponding to the individual pixels of the dither mask of 18×18 pixels in the scanning pattern in the case of performing intermittent feed of relatively moving, by nine pixels each in the sub scanning direction, the nozzle array 61A (see FIG. 9) for which the nozzle pitch in the sub scanning direction is two pixels and the number of the nozzles is nine, and scanning a scanning line of one line in the main scanning direction by the single (the same one) nozzle. For example, the pixel to which the nozzle number 0 is entered in FIG. 11 is the pixel for which the nozzle of the nozzle number 0 is in charge of the recording, and indicates the recording attending pixel of the nozzle of the nozzle number 0. That is, the nozzle pattern indicates the recording attending pixel for each nozzle number.

The nozzle pitch being two pixels means that the nozzle pitch corresponds to a distance for two pixels in the sub scanning direction, with the size of one pixel determined from the recording resolution during printing as a unit. For example, the nozzle array density 300 npi of the recording head 24A described in FIG. 9 corresponds to 300 dpi in terms of a dot recording density (resolution). That is, in this example, the recording resolution assumed during printing is 600 dpi in the main scanning direction and 600 dpi in the sub scanning direction, and the nozzle pitch of the nozzle array 61A of 300 npi corresponds to two pixels with the size of the pixel of 600 dpi as a unit.

Figure 12:
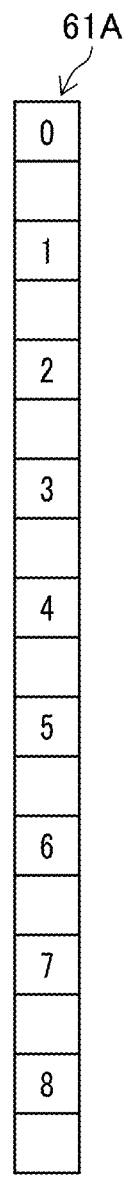
FIG. 12 is an explanatory diagram for explaining a description method of a nozzle array.

Here, in order to easily understandably illustrate the relation between the positions of the individual nozzles 62 configuring the nozzle array 61A and the positions of the individual pixels of the dither mask, a describing method as illustrated in FIG. 12 is introduced regarding the description of the nozzle array. In FIG. 12, the nozzle array 61A is sectioned into cells of a pixel unit, and numbers 0-8 indicating the nozzle numbers are described inside the cells. The positions of the cells to which the nozzle numbers are attached indicate the positions of the nozzles. That is, the description of the nozzle array 61A illustrated in FIG. 12 is replaced the description of the recording head 24A illustrated in FIG. 9.

Figure 13:
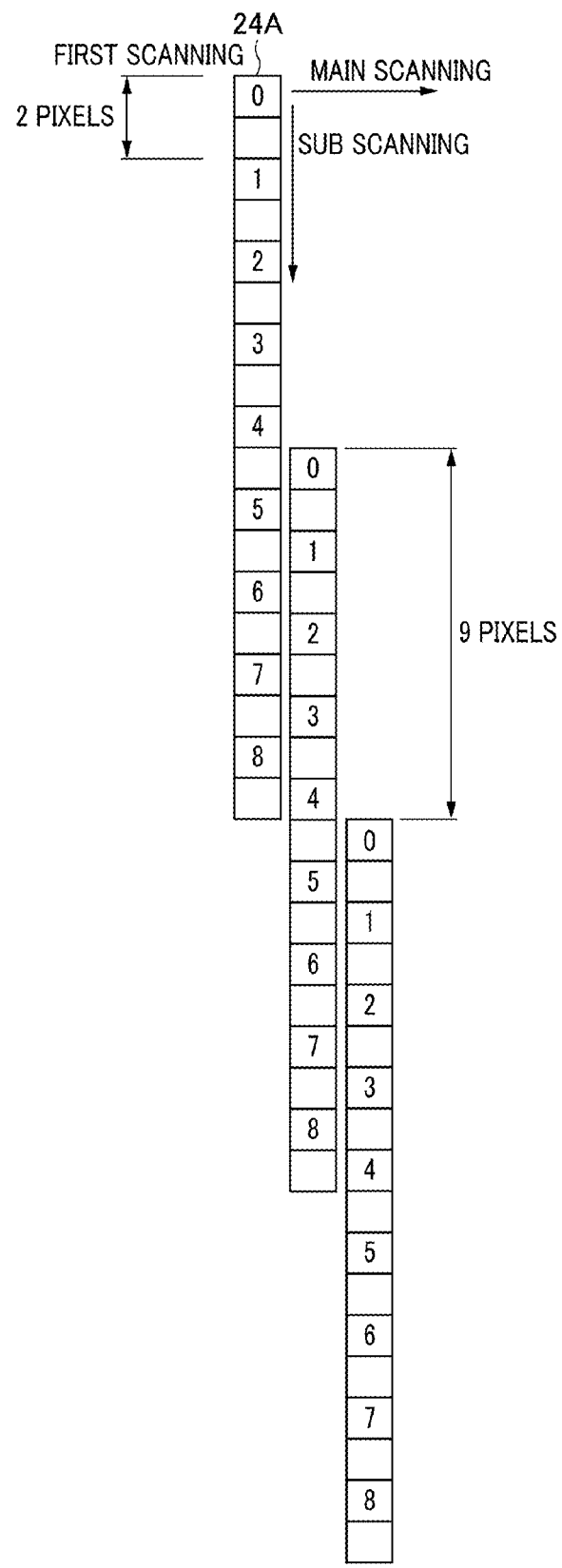
FIG. 13 is an explanatory diagram illustrating a specific example of a multipath type drawing method.

FIG. 13 illustrates a situation of the intermittent feed of relative movement by nine pixels each in the sub scanning direction every time the print path in the main scanning direction is executed once. For the convenience of the illustration, similarly to FIG. 6, FIG. 13 is illustrated assuming that the recording head 24A is moved in the sub scanning direction to the stopped recording medium.

In an image drawing method illustrated in FIG. 13, the recording of 600 dpi is completed by one path for a main scanning line which is a deposition point line in the main scanning direction, and the recording of 600 dpi is completed by two paths for a sub scanning line which is a deposition point line in the sub scanning direction. A paper feed amount in the sub scanning direction is nine pixels. The nozzle pattern of the image drawing method of repeating such scanning is illustrated in FIG. 11. On a left side of the nozzle pattern of 18×18 pixels in FIG. 11, the image drawing method (scanning pattern) by the nozzle array 61A with nine nozzles of the nozzle numbers 0 to 8 is schematically illustrated.

FIG. 14 is a diagram illustrating an ejection rate pattern obtained from the nozzle relative ejection rate in FIG. 10 and the nozzle pattern in FIG. 11. The ejection rate pattern is a pattern indicating a relation between the individual pixels of the dither mask and the nozzle relative ejection rates of the nozzle numbers corresponding to the individual pixels. The individual cells to which numbers are attached in the ejection rate pattern illustrated in FIG. 14 indicate the individual pixels of the dither mask, and the number in the cell indicates the nozzle relative ejection rate of the nozzle number in charge of the recording of the pertinent pixel.

FIG. 15 illustrates a uniform ejection rate pattern to be the same duty as the ejection rate pattern illustrated in FIG. 14. As already described, the ejection rate pattern illustrated in FIG. 14 reflects the nozzle relative ejection rate in FIG. 10, and the duty of the ejection rate pattern illustrated in FIG. 14 is roughly 56%. Therefore, in the uniform ejection rate pattern in which the duty is 56%, as illustrated in FIG. 15, the nozzle relative ejection rates of the individual pixels become 0.56.

The duty is a ratio of the pixels to be dot-on in the individual pixels of an image to be recorded on a recording medium. The duty is sometimes called by a term such as a printing duty, a recording duty, an ink duty, a printing rate or a recording rate.

The following can be said from comparison between FIG. 14 and FIG. 15. That is, in the case of forming dots so that the duty becomes 56%, the nozzle relative ejection rates of the individual nozzles that record the individual rasters are equally 0.56 in the dither mask to be the uniform nozzle ejection rate (see FIG. 15). On the other hand, in the case of following the nozzle relative ejection rate in FIG. 10, as illustrated in FIG. 14, the nozzle relative ejection rate is "1" for the fourth nozzle of the nozzle number 4 that records the raster of the ninth row and the raster of the 18th row, and the nozzle relative ejection rate is "0.2" for the eighth nozzle that records the raster of the eighth row and the 0-th nozzle that records the raster of the tenth row holding the raster of the ninth row therebetween. Also, the nozzle relative ejection rate is "0.2" for the eighth nozzle that records the raster of the 17th row and the 0-th nozzle that records the raster of the 19th row not shown in the figure holding the raster of the 18th row therebetween.

Thus, around the duty 56% which is a halftone where stripes tend to be visually recognized, stripes tend to appear near the raster of the ninth row and the raster of the 18th row that the fourth nozzle records at the nozzle relative ejection rate of 1.0. Stripes do not tend to appear in an area of a low duty where dots are coarse and in an area of a high duty where dots are densely packed.

<Case that the Number of Paths in Main Scanning Direction is Two Paths>

Next, an example of a case that the number of paths in the main scanning direction is two paths is described. For the convenience of the description, an example of using a recording head for which the number of the nozzles is ten is described.

Figure 16:
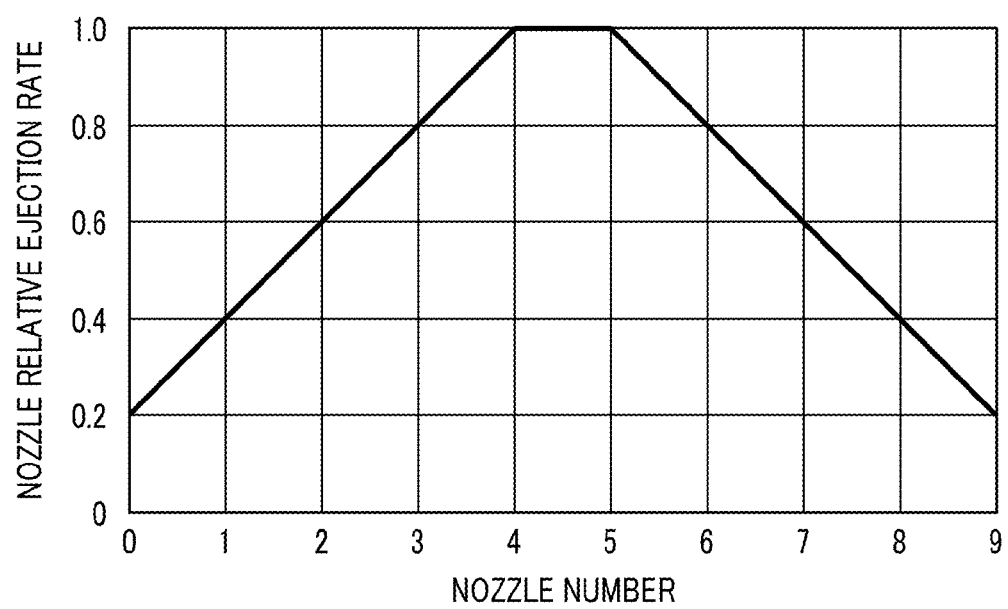
FIG. 16 is a graph illustrating another setting example of the nozzle relative ejection rate.

FIG. 16 is a graph illustrating a setting example of the nozzle relative ejection rate. The horizontal axis indicates the nozzle number, and the vertical axis indicates the nozzle relative ejection rate.

Figure 17:
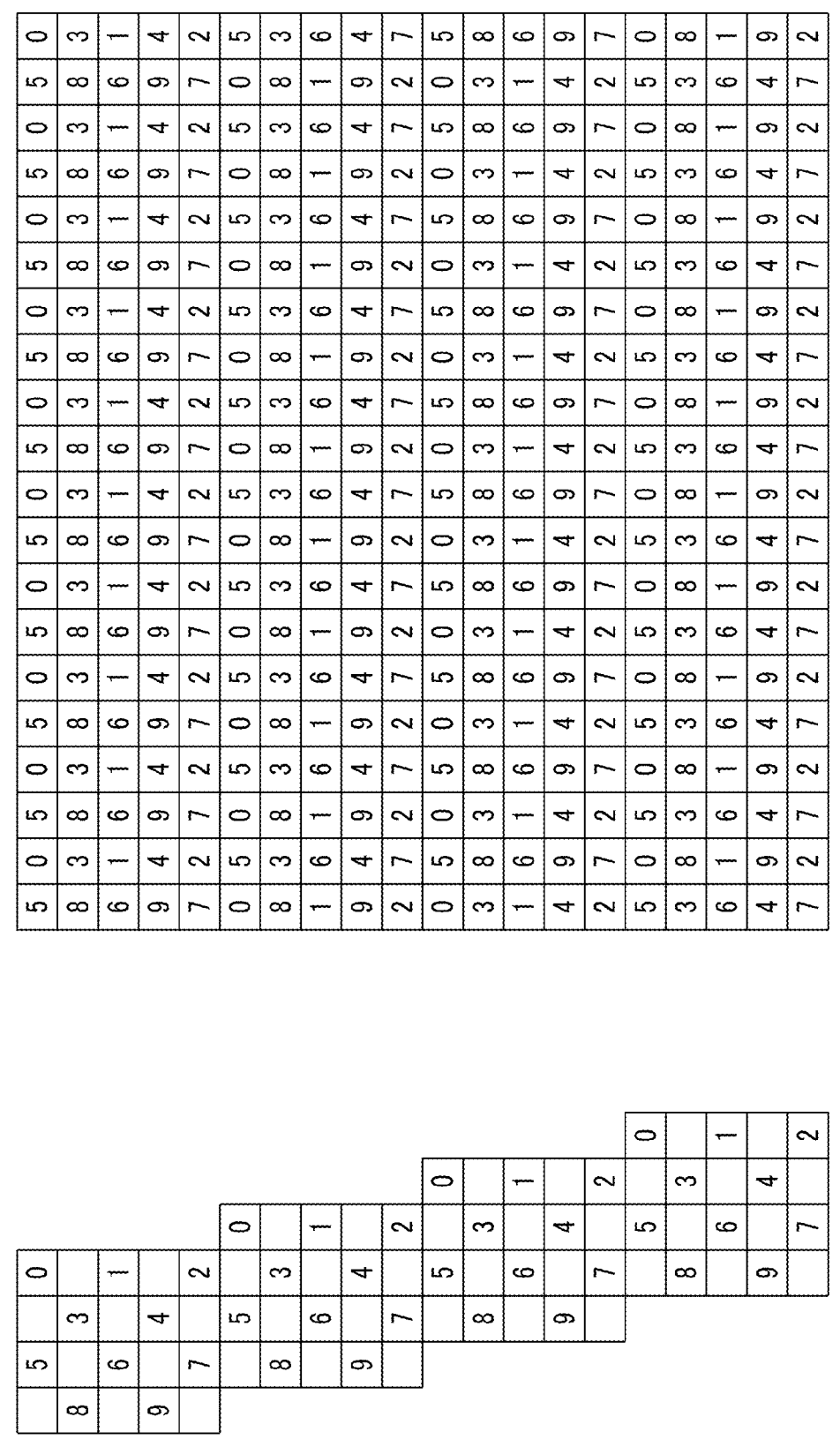

FIG. 17 is a diagram illustrating one example of the nozzle pattern. FIG. 17 illustrates an example of the nozzle pattern corresponding to the dither mask of 20×20 pixels for which the recording resolution is 600×600 dpi, the nozzle array density is 300 npi, the number of nozzles is 10, and the paper feed amount is 5/600 dpi.

On a left side of the nozzle pattern in FIG. 17, the scanning pattern is schematically illustrated. Description rules are similar to FIG. 11. As illustrated in FIG. 17, in the case that the number of paths in the main scanning direction is 2, in the nozzle pattern corresponding to the dither mask of 20×20 pixels, the nozzles to be used are different in odd-numbered columns and even-numbered columns. Hereinafter, for the convenience of the description, the nozzles used for the recording of the odd-numbered columns (the first column, the third column, the fifth column . . . the 19th column from the left in FIG. 17) are referred to as "left nozzles", and the nozzles used for the recording of the even-numbered columns (the second column, the fourth column, the sixth column . . . the 20th column from the left in FIG. 17) are referred to as "right nozzles".

Figure 18:
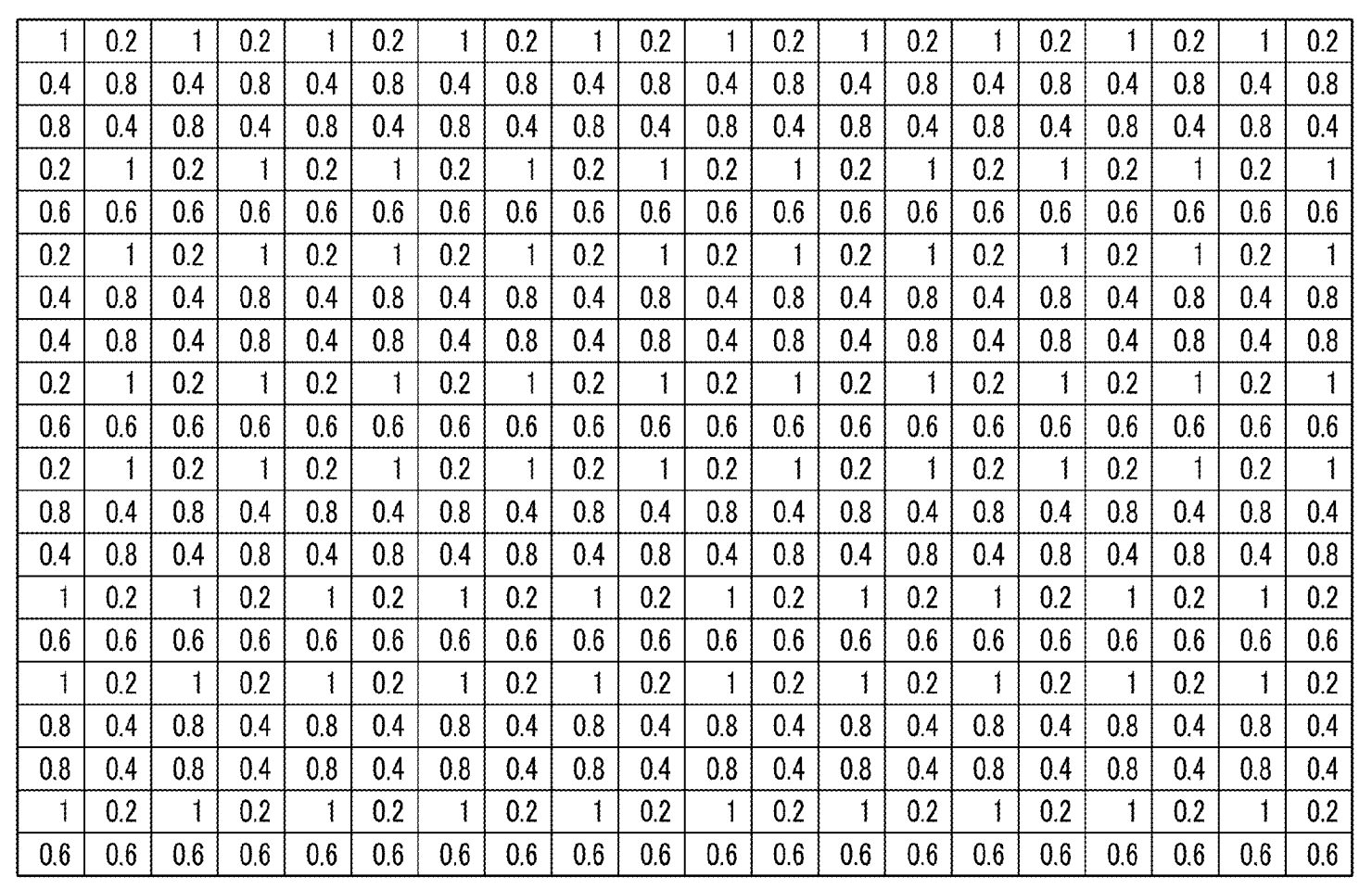

FIG. 18 illustrates an ejection rate pattern obtained from the nozzle relative ejection rate illustrated in FIG. 16 and the nozzle pattern illustrated in FIG. 17.

FIG. 19 illustrates a uniform ejection rate pattern to be the same duty as the ejection rate pattern in FIG. 18.

The following can be said from comparison between FIG. 18 and FIG. 19. In the case of forming dots so that the duty becomes 60%, the nozzle relative ejection rates at which the individual nozzles record individual main scanning positions of the individual rasters are equally 0.6 in the dither mask of the uniform nozzle ejection rate (see FIG. 19). The individual main scanning positions of the individual rasters mean main scanning direction positions of the main scanning direction path in a repetition unit indicating in how many paths the raster in the main scanning direction is completed. That is, the individual main scanning positions of the individual rasters indicate a path group in the main scanning direction.

In the case that the number of paths in the main scanning direction is 2, a position recorded by the path of the first time is noted as "main scanning position 1", and a position recorded by the path of the second time is noted as "main scanning position 2". In the case of the dither mask of 20×20 pixels in this example, the odd-numbered column is the main scanning position 1 and the even-numbered column is the main scanning position 2. The main scanning position 1 is recorded by the left nozzle and the main scanning position 2 is recorded by the right nozzle.

On the other hand, in the case of following the nozzle relative ejection rate in FIG. 16, as illustrated in FIG. 18, the nozzle relative ejection rate is "1.0" for the nozzle number 4 and the nozzle number 5 that record each main scanning position 1 of the raster of the first row, the raster of the 14th row, the raster of the 16th row and the raster of the 19th row, and each main scanning position 2 of the raster of the fourth row, the raster of the sixth row, the raster of the ninth row and the raster of the 11th row. Then, the nozzle relative ejection rate is "0.2" for the nozzle number 0 and the nozzle number 9 that record each main scanning position 2 of the raster of the first row, the raster of the 14th row, the raster of the 16th row and the raster of the 19th row, and each main scanning position 1 of the raster of the fourth row, the raster of the sixth row, the raster of the ninth row and the raster of the 11th row.

Therefore, the stripes tend to appear when there is an error in an ejection position (deposition position) or an ejection droplet amount of the nozzles of the nozzle number 4 and/or the nozzle number 5 in the individual rasters recorded by the respective nozzles of the nozzle number 4 and the nozzle number 5 near the duty 60% which is the halftone where stripes tend to be visually recognized.

In the dither mask in which the nozzle ejection rates of the individual nozzles are uniform, by multipath of performing recording by a plurality of paths in the main scanning direction, even when there is an error in the ejection position or the ejection droplet amount of the individual nozzles, the error can be dispersed and stripes can be made inconspicuous, however, in the case of the dither mask for which the nozzle ejection rates of the individual nozzles are biased, even when the multipath is adopted, the error is not dispersed since the nozzle ejection rates of the individual nozzles are biased, and stripes tend to appear.

In order to solve such a problem, in the embodiment of the present invention, stripe resistance is imparted by providing the nozzle ejection rates of the individual nozzles in the individual raster with the upper limit when generating the dither mask for which the nozzle ejection rates of the individual nozzles are biased. Hereinafter, the description is given with a specific example.

[Explanation of Dither Mask Generation Method Relating to First Embodiment]

Figure 20:
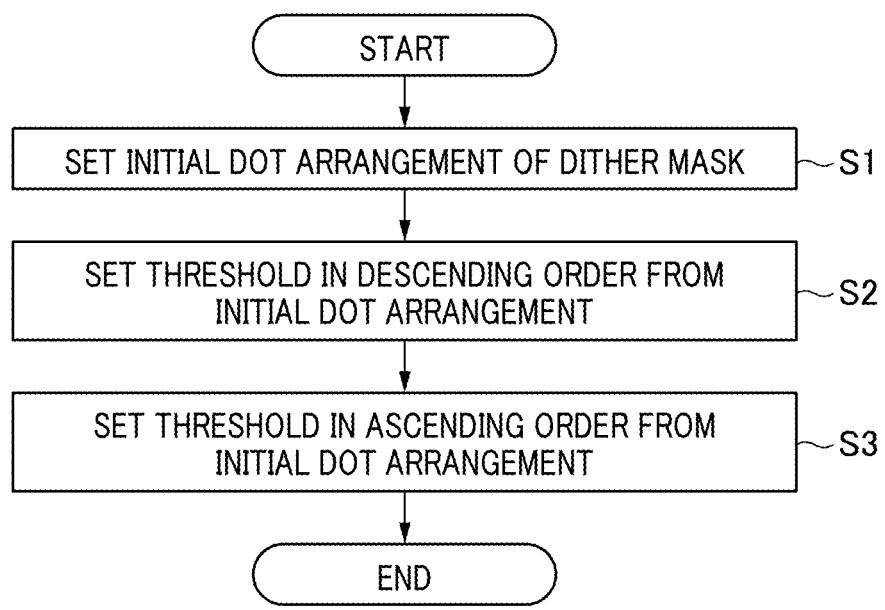
FIG. 20 is a flowchart illustrating a procedure of a dither mask generation method relating to a first embodiment.

FIG. 20 is a flowchart illustrating a procedure of the dither mask generation method relating to the first embodiment. The dither mask generation method of the first embodiment includes a process (step S1) of setting an initial dot arrangement of a dither mask, a process (step S2) of setting thresholds in a descending order from the initial dot arrangement, and a process (step S3) of setting the thresholds in an ascending order from the initial dot arrangement.

Here, in order to simplify the dither mask generation method, the initial dot arrangement is a dot arrangement of an extremely low duty, and does not reflect the nozzle relative ejection rate. An initial duty of "extremely low duty" corresponding to the initial dot arrangement can be a value larger than 0% and equal to or smaller than 1% for example, and is a value equal to or larger than 0.1% and equal to or smaller than 0.5% more preferably. At the duty about this low, influence of the setting of the nozzle relative ejection rate can be almost neglected. The duty (initial duty) of the initial dot arrangement is not limited to the numerical value exemplified above and may be a value small enough to neglect the influence of the setting of the nozzle relative ejection rate.

In the initial dot arrangement setting process in step S1, dots for a dot number corresponding to the predetermined initial duty are arranged in a mask area which is an area of a pixel array equal to a mask size of the dither mask.

The descending order threshold setting process illustrated in step S2 is a process of performing processing of setting the thresholds of individual gradations without reflecting the nozzle relative ejection rate using a known threshold setting method. "Descending order" is a procedure of setting the threshold from a threshold of a large value and successively setting the threshold of a small value. "Descending order" in step S2 means the processing of successively setting the threshold of the small value from the threshold of the gradation corresponding to the initial dot arrangement.

That is, in step S2, the processing of successively setting smaller thresholds to threshold non-set pixels in the descending order while gradually removing dots from the initial dot arrangement is performed. "Threshold non-set pixel" in the descending order is a pixel with a dot. "With a dot" means the same as "dot-on".

The ascending order threshold setting process illustrated in step S3 is a process of performing the processing of setting the thresholds to the threshold non-set pixels in the ascending order reflecting the nozzle relative ejection rate. "Ascending order" is a procedure of setting the threshold from a threshold of a small value and successively setting the threshold of a large value. "Ascending order" in step S3 means the processing of successively setting the threshold of the large value from the threshold of the gradation corresponding to the initial dot arrangement.

An order of the threshold setting process (step S2) by the descending order and the threshold setting process (step S3) by the ascending order can be switched around.

Figure 21:
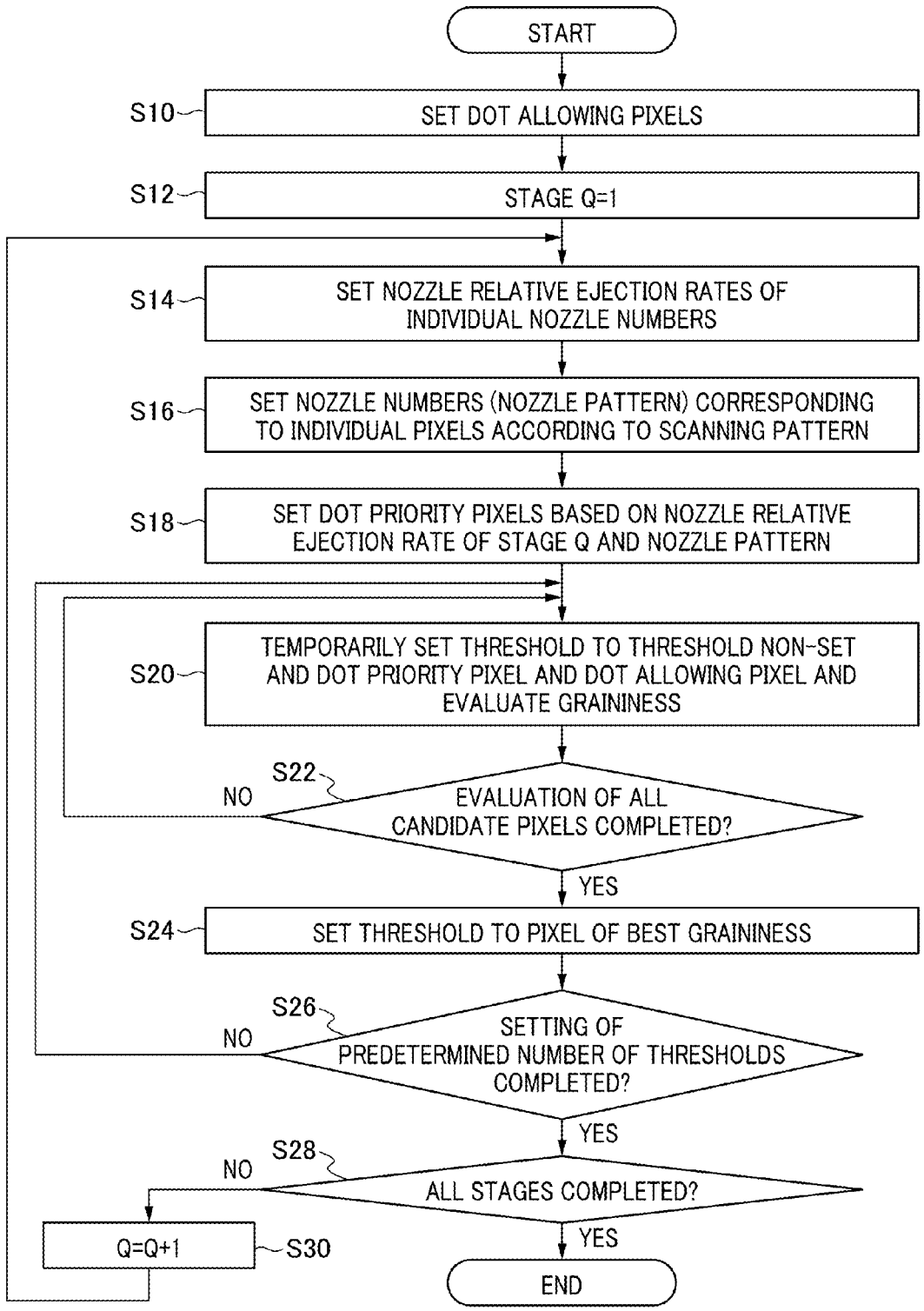
FIG. 21 is a flowchart illustrating an example of ascending order threshold setting processing by the first embodiment.

FIG. 21 is a flowchart illustrating an example of ascending order threshold setting processing applied to the ascending order threshold setting process (step S3 in FIG. 9).

In the ascending order threshold setting processing according to the first embodiment illustrated in FIG. 21, first, dot allowing pixels are set (step S10).

The dot allowing pixels indicate pixels that allow formation of dots so as to provide the nozzle ejection rates of the nozzles that record the individual main scanning positions of the individual rasters with a desired upper limited.

"Individual main scanning positions of individual rasters" are positions of the main scanning direction paths in the repetition unit by the number of paths to record the individual rasters, and correspond to the path groups of the individual rasters. In the example of one path (see FIG. 11), all the pixels within the raster are "main scanning position 1", and in the case of the example of two paths (see FIG. 17), the odd-numbered pixels within the raster are "main scanning position 1" and the even-numbered pixels are "main scanning position 2".

For example, when the upper limit of the nozzle ejection rates of the individual nozzles that record the individual main scanning positions of the individual rasters is 0.8, in the example of one path (see FIG. 11), regarding the individual main scanning positions of the individual rasters, dot formation of 0.8×18 pixels=14.4 pixels, that is, 14 pixels or 15 pixels when rounded into an integer value, is allowed.

Also, for example, when the upper limit of the nozzle ejection rates at which the individual nozzles record the individual main scanning positions of the individual rasters is 0.8, in the example of two paths (see FIG. 17), regarding the individual main scanning positions of the individual rasters, the dot formation of 0.8×10 pixels=8 pixel is allowed.

In the present embodiment, in the example of one path, 0.8×18×18 pixels=259.2 pixels, that is, 259 pixels or 260 pixels when rounded into the integer value, of the equal dot allowing pixels are set in the entire dither mask.

Also, in the example of two paths, 0.8×20×20 pixels=320 pixels of the equal dot allowing pixels are set in the entire dither mask. By setting the equal dot allowing pixels in the entire dither mask, a target number of the dot allowing pixels are roughly set also regarding the individual main scanning positions of the individual rasters as a result.

As the arrangement of "equal dot allowing pixel", the dot allowing pixels may be regularly arranged, or the dot allowing pixels may be irregularly arranged. The irregular dot allowing pixel arrangement can be generated based on a known dither mask such as a blue noise mask for example. The pixel array of the dot allowing pixels generated by using the blue noise mask has a blue noise characteristic.

Figure 22:
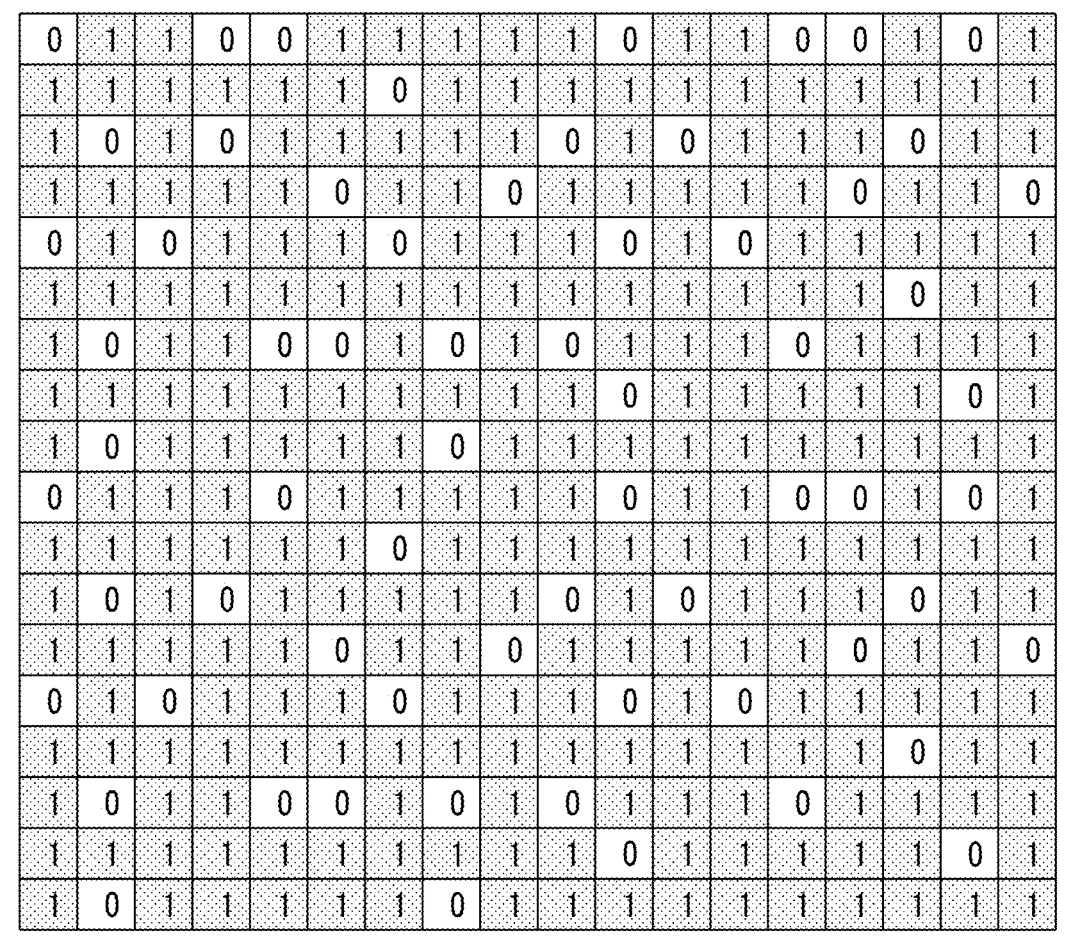
Figures 23, 24:
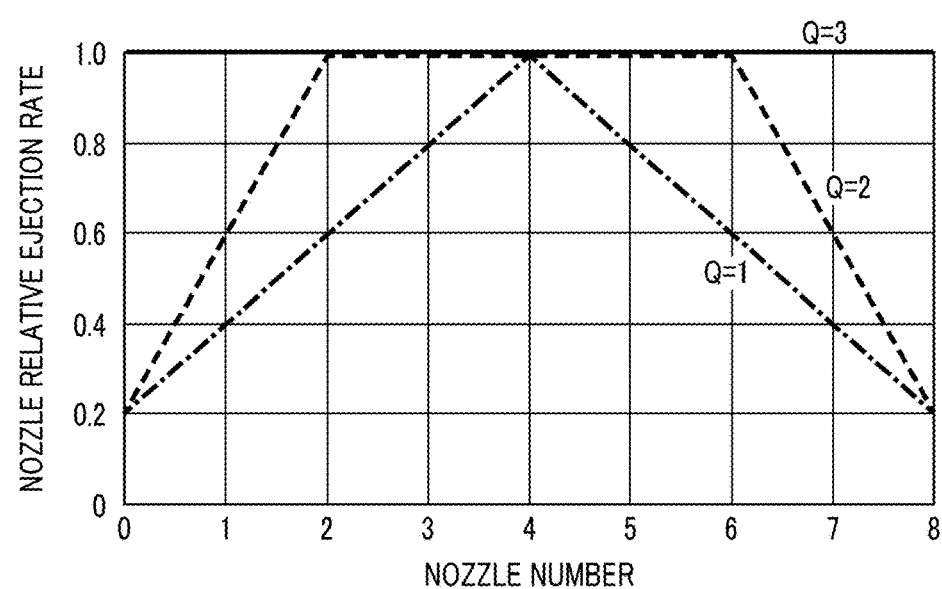
FIG. 23 is a diagram illustrating a setting example of the dot allowing pixels in an example in which the number of paths in the main scanning direction is two paths.
FIG. 24 is a diagram illustrating an example of nozzle relative ejection rates of individual stages when the number of stages is three stages.

An example of the dot allowing pixels generated based on the known blue noise mask is illustrated in FIG. 22 and FIG. 23. FIG. 22 illustrates an arrangement example of the dot allowing pixels in the case that the number of the dot allowing pixels is 259 pixels in the example of one path. FIG. 23 illustrates an arrangement example of the dot allowing pixels in the case that the number of the dot allowing pixels is 320 pixels in the example of two paths.

As exemplified in FIG. 22 and FIG. 23, by setting the dot allowing pixels, the dot formation is controlled in a range of the dot allowing pixels for the individual rasters in the main scanning direction, and the nozzle ejection rates of the individual nozzles in a raster unit can be limited to the ejection rate lower than the highest nozzle ejection rate.

The process of setting the dot allowing pixels in step S10 in FIG. 21 corresponds to one form of "nozzle ejection rate limiting process".

A value to be the upper limit of the nozzle ejection rate is not limited to "0.8" exemplified above, and can be determined as an appropriate value smaller than the highest nozzle ejection rate.

After setting the dot allowing pixels in step S10 in FIG. 21, in step S12, a stage Q of the setting of the nozzle relative ejection rates of the individual nozzles is set to "stage Q=1" which is an initial value (step S12). In the present embodiment, since the nozzle relative ejection rate for each nozzle is switched and set stepwise according to an area of the duty, the nozzle relative ejection rate is provided with the stage. The stage Q is a variable indicating the stage of the nozzle relative ejection rate. The nozzle relative ejection rate is a control target of the nozzle ejection rates of the individual nozzles in the nozzle array of the recording head, and also stipulates a relative using ratio of the individual nozzles. The nozzle relative ejection rate is determined according to the duty. The actual nozzle ejection rates of the individual nozzles are determined according to the duty so as to roughly maintain the stipulated nozzle relative ejection rate in the area of the specific duty.

FIG. 24 illustrates an example of the nozzle relative ejection rates of the individual stages in the case that the number of the stages is three stages. The horizontal axis in FIG. 24 indicates the nozzle number, and the vertical axis indicates the nozzle relative ejection rate. In FIG. 24, a graph of Q=1 illustrates the nozzle relative ejection rate of a stage 1, a graph of Q=2 illustrates the nozzle relative ejection rate of a stage 2, and a graph of Q=3 illustrates the nozzle relative ejection rate of a stage 3 respectively. Here, an example of the recording head for which the number of the nozzles is nine is described.

"Q" indicating the stage can take an integer value from Q=1 to the maximum value of the stage, in the ascending order of the nozzle relative ejection rate. The ascending order of the nozzle relative ejection rate means that the area of the duty to be applied (stage) is in the ascending order.

In the case that j is an integer equal to or larger than 1, the duty to be applied is larger for the nozzle relative ejection rate of a stage j+1 compared to the nozzle relative ejection rate of a stage j. The nozzle relative ejection rate set in the stage 1 is the lowest, and the nozzle relative ejection rate set in the final stage (the stage 3 in FIG. 24) is all "1.0" which is the maximum nozzle ejection rate for the individual nozzles.

Under the setting of the nozzle relative ejection rate of the stage 1, the individual nozzles can record dots only in a range of the nozzle relative ejection rate illustrated in the graph of the stage 1. That is, when the nozzle relative ejection rates of the individual nozzles are set as in the graph of the stage 1, the upper limit of the duty recordable under the setting is determined. In the case of the stage 1 in FIG. 24, the upper limit of the recordable duty is roughly 56%. Therefore, in order to set the threshold of the dither mask to the maximum duty of 100%, the nozzle relative ejection rate needs to be increased further from the stage 1 and the nozzle relative ejection rates of all the nozzles need to be all "1.0" in the final stage. That is, according to increase of the value of the threshold to be set to the threshold non-set pixel of the dither mask, the setting of the nozzle relative ejection rate needs to be changed in the plurality of stages that are at least two stages.

That is, the nozzle relative ejection rates of the individual stages illustrated in FIG. 24 indicate the relative using ratios among the individual nozzles. The relative using ratios stipulated in the individual stages are roughly maintained and the actual nozzle ejection rates of the individual nozzles are determined according to the duty.

While a setting form of the nozzle relative ejection rates in three stages (Q=1, 2, 3) is exemplified in FIG. 24, the minimum number of the stages is two stages. It can be the arbitrary number of the stages equal to or more than two stages.

The nozzle relative ejection rates of the individual nozzles 62 in the nozzle array 61A of the recording head 24A illustrated in FIG. 9 can be switched and set to the nozzle relative ejection rates of the individual stages that are the stages 1 to 3 as illustrated in FIG. 24, for example.

In step S12 in FIG. 21, after setting the stage Q=1, the process advances to step S14. In step S14, the nozzle relative ejection rates of the individual nozzles 62 in the recording head 24A are set. Step S14 corresponds to one form of "nozzle relative ejection rate setting process". In the case that the stage Q=1 is set, the nozzle relative ejection rates of the individual nozzles 62 in the nozzle array 61A of the recording head 24A illustrated in FIG. 9 are set as in the graph illustrated in the stage Q=1 in FIG. 24.

Next, in step S16 in FIG. 21, the nozzle numbers (that is, the nozzle pattern) corresponding to the individual pixels are set according to the scanning pattern. The process of step S16 is a process of performing the processing of setting the nozzle numbers corresponding to the individual pixels of the dither mask according to the scanning pattern when the image recording by the inkjet recording device 10 is performed, for an image area (that is, the mask area) having the pixel array with the number of pixels equal to the mask size of the dither mask.

The nozzle numbers corresponding to the individual pixels mean the nozzle numbers of the nozzles in charge of the recording of the individual pixels. The process of step S16 corresponds to determining the respectively corresponding nozzle numbers for the individual pixels of the dither mask.

In the case that m and n are natural numbers respectively and the dither mask which is a generation target is a matrix of m rows×n columns, the respectively corresponding nozzle numbers are determined for the individual pixels of the image area formed by a two-dimensional pixel array of m rows×n columns. A pattern of the nozzle numbers in which the corresponding nozzle numbers are determined for the individual pixels of the dither mask is called "nozzle pattern".

The process of step S16 corresponds to the process of setting the nozzle pattern indicating correspondence relation between the individual pixels of the dither mask and the numbers of the nozzles in charge of the recording of the respective pixel positions, and corresponds to one form of "nozzle pattern setting process". One example of the nozzle pattern in the example of one path is illustrated in FIG. 11.

After setting the nozzle pattern in step S16 in FIG. 21, the process advances to step S18 in FIG. 21 next. In step S18, dot priority pixels are set based on the nozzle relative ejection rates of the stage Q set in step S14 and the nozzle pattern set in step S16. Step S18 corresponds to one form of "dot priority pixel setting process". The dot priority pixels are a set of the pixels to be candidates of the pixel to set the threshold among the pixels of the dither mask.

FIG. 25 is a diagram illustrating an example of the arrangement of the dot priority pixels in the case of one path. FIG. 25 illustrates an arrangement example of the dot priority pixels set based on the nozzle relative ejection rates of the stage Q=1 described in FIG. 24 and the nozzle pattern described in FIG. 11. In FIG. 25, for the dot priority pixels, a graph of a numeral "1" is attached and cells indicating the pixels are painted with a gray tone. Also, a numeral "0" is attached to dot non-priority pixels. That is, it is indicated that the pixels to which "1" is attached in a matrix area of 18×18 pixels are dot priority pixel ON, and pixels to which "0" is attached are dot priority pixel OFF.

Also, in FIG. 25, together with the arrangement example of the dot priority pixels, the nozzle numbers of the nozzles that record the individual rasters, the nozzle relative ejection rates, and the number of dot priority pixels of the individual rasters are indicated together. "Raster" here is a main scanning direction raster in which the pixels are arranged in the main scanning direction which is a horizontal direction (row direction) of FIG. 25.

The number of dot priority pixels of the individual rasters are obtained by multiplying the nozzle relative ejection rate of the nozzle that records the pertinent raster by "number of main scanning pixels of dither mask/main scanning direction path number". The number of main scanning pixels of the dither mask is the number of the pixels in the main scanning direction of the dither mask. In the case of the example in FIG. 25, since the number of main scanning pixels of the dither mask is 18 pixels and the main scanning direction path number is "1", "number of main scanning pixels of dither mask/main scanning direction path number" is 18 pixels. The raster of the first row illustrated in FIG. 25 is recorded by the main scanning direction path number "1" by the nozzle of the nozzle number 0, and the nozzle relative ejection rate of the nozzle number 0 is 0.2. Therefore, the number of dot priority pixels of the raster of the first row is calculated as 0.2×18/1=3.6.

The number of dot priority pixels of the whole in the mask size of the dither mask is a total sum of the number of dot priority pixels of the individual nozzles of the individual rasters obtained by multiplying the nozzle relative ejection rates of the individual nozzles that record the individual rasters by "number of main scanning pixels/main scanning direction path number" of the dither mask. The dot priority pixels of the individual nozzles of the individual rasters are set so that a generation probability of the dot priority pixels is proportional to the nozzle relative ejection rate.

<First Example of Setting Method of Dot Priority Pixels>

The dot priority pixels in the individual rasters are set according to the following conditional expression, for example.

rand( )≤nozzle relative ejection rate [Conditional expression 1]

The dot priority pixel is ON only when the conditional expression is satisfied.

Note that "rand( )" in the conditional expression 1 is a random number in a range equal to or larger than 0 and smaller than 1.

At individual pixel positions, the random number in the range equal to or larger than 0 and smaller than 1 is generated with the equal probability by a rand( ) function, rand( ) which is a generated random number value and the nozzle relative ejection rate are compared, and in the case that rand( ) is equal to or smaller than the nozzle relative ejection rate, the pixel is defined as the dot priority pixel.

By determining the dot priority pixel according to the conditional expression 1, in the individual rasters to be recorded by the individual nozzles, the number of "nozzle relative ejection rate×number of main scanning pixels/main scanning direction path number" is turned to a target number, and the dot priority pixels are set randomly.

The number of dot priority pixels calculated by "nozzle relative ejection rate×main scanning pixel number/main scanning direction path number" and the number of the dot priority pixels actually set according to the conditional expression 1 do not necessarily coincide.

That is, the number of dot priority pixels of the individual rasters illustrated in FIG. 25 are the target number of the dot priority pixels in the individual rasters, and can be obtained beforehand by calculation as described above. However, the number of the dot priority pixels to be actually set may vary depending on the value of the random number.

<Second Example of Setting Method of Dot Priority Pixels>

Other than using the conditional expression 1, there are various methods as a method of randomly setting the dot priority pixels. For example, the priority pixel number to be set in the individual rasters to be recorded by the individual nozzles is obtained by an integer value first, and then the first dot priority pixel is set to the pixel of a number corresponding to an integer obtained by "randORAND_MAX % recording pixel number". Here, "recording pixel number" is the number of the pixels for which the individual nozzles are in charge of the recording in the individual rasters, and is equal to "number of main scanning pixels/main scanning direction path number". "rand( )RAND_MAX" is a random number of an integer in a range equal to or larger than 0 and smaller than RAND_MAX. "RAND_MAX" is an integer at least larger than the recording pixel number. For example, it can be RAND_MAX=65536. "%" is a modulus operator. "a % b" indicates a remainder of dividing a by b. That is, randORAND_MAX % recording pixel number is the number of the remainder of dividing the random number of the integer in the range equal to or larger than 0 and smaller than RAND_MAX by "recording pixel number". By this operation, the integer in the range equal to or larger than 0 and equal to or smaller than "recording pixel number−1" can be obtained with the equal probability. In the example in FIG. 25, it is "number of main scanning pixels=18".

The integers of 0 to 17 are made to correspond to pixel numbers of 18 pixels, and the pixel number corresponding to the integer obtained by "randORAND_MAX % recording pixel number" is defined as the first dot priority pixel.

Next, excluding the first dot priority pixel, the second dot priority pixel is set to the pixel of the number corresponding to the integer obtained by randORAND_MAX % (recording pixel number−1). In the example in FIG. 25, it is "recording pixel number=18", the integers of 0 to 16 are made to correspond to the pixel numbers of 17 pixels excluding the first dot priority pixel, and the pixel number corresponding to the integer obtained by randORAND_MAX % (recording pixel number−1) is defined as the second dot priority pixel. Similarly hereinafter, excluding the first and second dot priority pixels, the third dot priority pixel is set to the pixel of the number corresponding to the integer obtained by randORAND_MAX % (recording pixel number−2). The fourth and succeeding dot priority pixels can be also set successively by the similar procedure for the number of the dot priority pixels.

When setting the dot priority pixels, the pixels of the thresholds set by the previous stage may be considered or may not be considered. In the setting of the dot priority pixels, in the case of considering the pixels of the thresholds set by the previous stage, in the already-described setting method by the second example, the pixels of the thresholds set by the previous stage are excluded from the pixels to be the candidates of the dot priority pixels in the pertinent stage, and the number of the thresholds is excluded from the dot priority pixel number.

Regarding the setting method of the dot priority pixels, examples of using the rand( ) function are illustrated in the first example and the second example, however, there are various methods as the method of randomly setting the dot priority pixels, and it is not limited to the form of using the rand( ) function.

<Third Example of Setting Method of Dot Priority Pixels>

Also, the setting method of the dot priority pixels is not limited to the method of randomly setting them, and a method of setting them at regular intervals is also possible. An example of a method of setting the dot priority pixels at regular intervals is described hereinafter.

For example, ejection pixel intervals of the individual nozzles in the individual rasters are defined as 1, "1/nozzle relative ejection rate" is determined as the regular interval, and the dot priority pixel may be set to the pixel of the number for which a value of an integral multiple of "1/nozzle relative ejection rate" is rounded to an integer value. The ejection pixel interval is an interval of ejection of the individual nozzles in the individual rasters, and corresponds to one pixel when the main scanning direction path number is 1, and 2 pixels when the main scanning direction path number is 2.

For example, since the nozzle relative ejection rate is 0.8 for the raster of the second row in FIG. 25, the dot priority pixel is to be set to the pixel of the number for which the value of the integral multiple of 1/nozzle relative ejection rate=1/0.8=1.25 is rounded to the integer value. Here, since the main scanning direction path number is 1 in FIG. 25, "1" of the ejection pixel interval corresponds to one pixel. Therefore, for example, in the case that a method of rounding the integer value is not rounding-down or rounding-up but rounding-off, with the pixel at a left end as the first, the dot priority pixels are to be set to the first, third, fourth, fifth, sixth, eighth, ninth, 10th, 11th, 13th, 14th, 15th, 16th and 18th pixels (the pixels of the numbers for which 1.25, 2.5, 3.75, 5, 6.25, 7.5, 8.75, 10, 11.25, 12.5, 13.75, 15, 16.25 and 17.5 are rounded to the integer values by rounding-off).

In this case, the dot priority pixel may be set to the 19th pixel for which 18.75 is rounded to the integer value by rounding-off further. However, since the 19th pixel exceeds "18" which is the number of main scanning pixels of the dither mask, it is to be set to the first pixel, returning to the left end again, but the dot priority pixel is already set to the first pixel here so that the dot priority pixel is to be set to the second pixel on the side, the right side for example.

After the dot priority pixels are set in step S18 in FIG. 21 using the methods described in the first example to the third example above or the like, the process advances to step S20.

In step S20, the thresholds are temporarily set to the pixels that are the threshold non-set and dot priority pixels and belong to the dot allowing pixels among the entire pixels of the dither mask, and graininess is evaluated. For an index of graininess evaluation, for example, a known index such as RMS (Root Mean Square) graininess can be used. The RMS graininess is a standard deviation calculated by applying a blur filter for which a human visual characteristic such as VTF (Visual Transfer Function) is taken into consideration to the dot arrangement.

Figure 26:
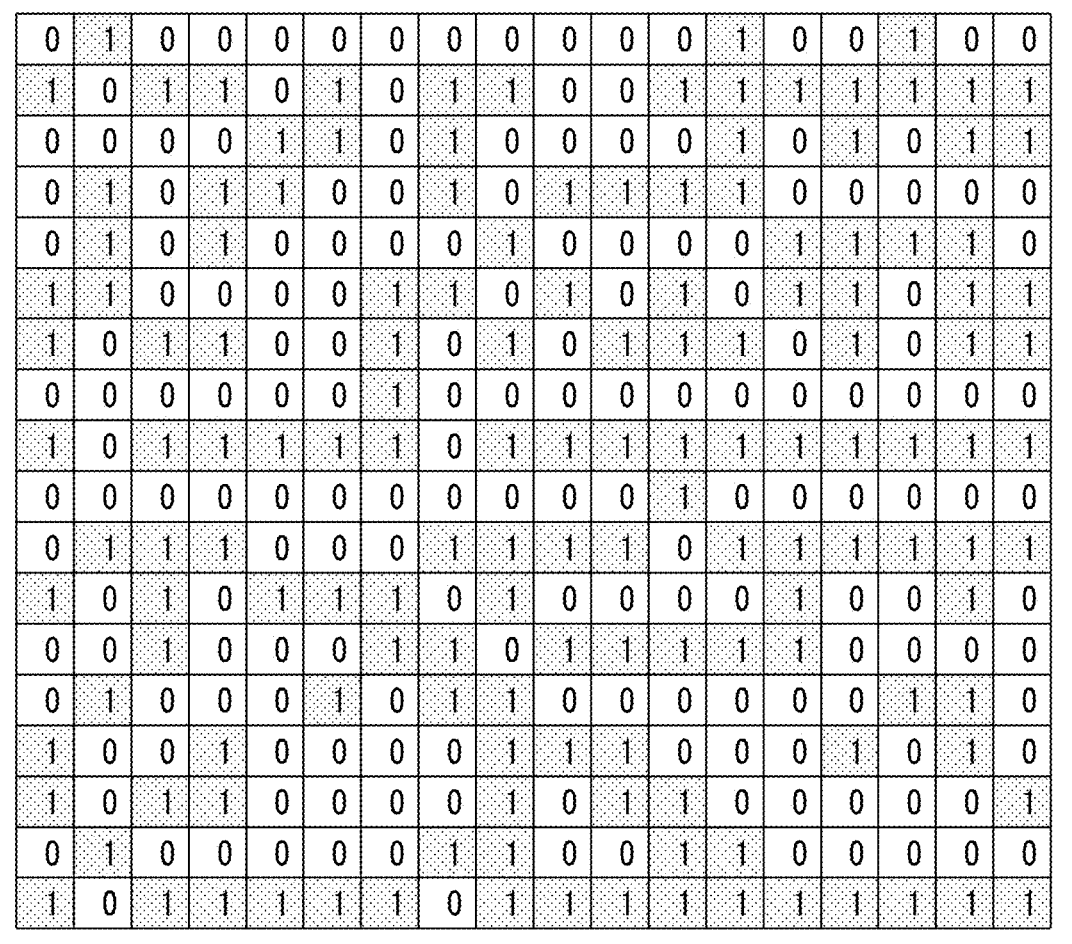

FIG. 26 is a diagram illustrating a pixel array obtained by an AND operation of the dot priority pixels illustrated in FIG. 25 and the dot allowing pixels illustrated in FIG. 22. For the pixel array of a logical product that is the dot priority pixels and the dot allowing pixels, a restriction of the dot allowing pixels set based on the stipulation of the upper limit of the nozzle ejection rate is applied further to the dot priority pixels set based on the nozzle relative ejection rates of the individual nozzles set according to the nozzle relative ejection rate. The dot priority pixels and also the dot allowing pixels are called "dot priority pixels with upper limit". The dot priority pixels with the upper limit correspond to one form of "pixel array obtained by AND operation of dot allowing pixels and the dot priority pixels".

A configuration may be such that, after the dot priority pixels are set in step S18 in FIG. 21, the dot priority pixels with the upper limit as illustrated in FIG. 26 are immediately generated and information of the dot priority pixels with the upper limit is held in a memory or the like. By holding the information of such dot priority pixels with the upper limit, processing of determining propriety of threshold temporary setting in step S20 can be lightened.

An evaluation result of the graininess in step S20 is stored in a memory or the like, and the process advances to step S22. In step S22, whether or not the evaluation of the graininess in step S20 is completed for the entire candidate pixels which are the candidates of the pixels to set the threshold is determined. The entire candidate pixels are a set of the threshold non-set and dot priority pixels and the dot allowing pixels to which the threshold can be temporarily set in step S20.

In step S22, in the case that there is the candidate pixel for which the graininess is not evaluated, determination in step S22 becomes No determination and the process returns to step S20. That is, the pixel to temporarily set the threshold is changed in the range of the candidate pixels which are the threshold non-set and dot priority pixels and the dot allowing pixels, and the processing of step S20 is repeated.

When the processing of the graininess evaluation in step S20 is completed for the entire candidate pixels, the determination in step S22 becomes Yes determination, and the process advances to step S24.

In step S24, based on a result of evaluating the graininess respectively for the entire candidate pixels, the threshold is set to the pixel with the best graininess. The process in step S24 corresponds to one form of "threshold setting process".

Next, in step S26, whether or not the setting of the predetermined number of the thresholds is completed is determined. "Predetermined number" here is a specific value determined beforehand as the number of the thresholds to be set under the setting of the nozzle relative ejection rate of the same stage. "Predetermined number" in the flowchart illustrated in FIG. 21 is a number equal to or smaller than the number of the dot priority pixels set in step S18 and the dot allowing pixels set in step S10 (that is, the number of the dot priority pixels with the upper limit). For example, in the example of one path illustrated in FIG. 26, since the number of the dot priority pixels with the upper limit is 147 pixels, "predetermined number" in step S26 can be 147 equal to the number of the dot priority pixels with the upper limit.

However, as the number of the thresholds approaches the number of the dot priority pixels with the upper limit, the candidates of the pixels to which the threshold can be set is limited, and the arrangement of the pixels to which the threshold can be set approaches the arrangement of the dot priority pixels with the upper limit with poor graininess. Therefore, in order to prevent such graininess deterioration, "predetermined number" may be the number smaller than the number of the dot priority pixels with the upper limit, for example the number of the dot priority pixels with the upper limit×0.8. However, when the predetermined number is set to be excessively small, a performance of suppressing the ejection rate of the end part nozzle in the nozzle array is lowered. Therefore, when setting the predetermined number, it is preferable to set it at an appropriate value from a viewpoint of compatibly achieving reduction of the graininess deterioration and the performance of suppressing the ejection rate of the end part nozzle. For example, the predetermined number is in the range equal to or larger than 0.6 times and equal to or smaller than 0.9 times of the number of the dot priority pixels with the upper limit, and more preferably in the range equal to or larger than 0.7 times and equal to or smaller than 0.8 times.

In the case that the setting of the predetermined number of the thresholds is not completed in step S26 in FIG. 21, the process returns to step S20. On the other hand, when the setting of the predetermined number of the thresholds is completed in step S26, the process advances to step S28.

In step S28, whether or not the processing of the entire stages is completed is determined. For the stage Q of the nozzle relative ejection rate, when the processing of the entire stages is not completed, 1 is added to the value of the stage Q, the value of the stage Q is changed to "Q+1" (step S30), and the process returns to step S14.

The setting is changed to the nozzle relative ejection rates of the next stage changed in step S30, and the above-described processing loop (step S14 to step S28) is repeated. For the nozzle pattern described in step S16, since the same setting as the previous time can be utilized, the processing of step S16 can be omitted.

Through step S30, under the setting of the nozzle relative ejection rates the stage different from the previous time, the dot priority pixels are newly set in step S18.

By repetition of the loop from step S14 to step S28 through step S30, the setting of the nozzle relative ejection rate for each nozzle set by the nozzle relative ejection rate setting process of step S14 is changed in a plurality of stages, at least two stages, according to a threshold area that corresponds to the number of the thresholds corresponding to the predetermined number of the thresholds in step S26 (that is, by a value of the threshold set in step S24).

Also, before the thresholds are set to all the dot priority pixels tentatively set in step S18, that is, when the setting of the thresholds for the predetermined number smaller than the number of dot priority pixels is completed, the setting is changed to the different setting of the dot priority pixel in step S18 newly through step S30.

In such a manner, the similar processing is performed for all the stages, and the individual thresholds are set. When the processing is completed in all the stages in step S28, the flowchart in FIG. 21 is ended.

Regarding step S28, the propriety of threshold temporary setting may be determined excluding the determination of the dot allowing pixels in step S20 (eliminating the restriction of the dot allowing pixels) in order to set the threshold to all the pixels in the final stage. Or, only the dot allowing pixels may be turned to the threshold setting candidates and the threshold may be set only to the dot allowing pixels even in the final stage.

In the final stage, the nozzle relative ejection rates of all the nozzles are set to "1.0", the dot priority pixels are set to all the pixels, and the entire pixel number or the entire dot allowing pixel number is set to "predetermined number" in step S26.

Instead of the flowchart illustrated in FIG. 21, the threshold setting may be turned to a different loop and the setting and determination of the dot priority pixels may be omitted only for the final stage. Further, by also excluding the determination of the dot allowing pixels in the final stage, the threshold can be set to all the pixels.

That is, in the case of setting all the nozzle relative ejection rates of all the nozzles to "1.0" in the final stage, without executing the processing of intentionally setting the nozzle relative ejection rates of the individual nozzles to "1.0" and setting all the pixels to the dot priority pixels, the configuration may be adopted in which the setting of the nozzle relative ejection rates and the setting of the dot priority pixels are excluded, and simply a different processing loop of not even determining the dot priority pixels is executed.

Even in the case of adopting such a different processing loop, it is practically equal to perform the processing of setting the nozzle relative ejection rates of all the nozzles to "1.0" and setting all the pixels to the dot priority pixels, and shift to the different processing loop corresponds to one form of the setting of "final stage" in "plurality of stages".

The flowchart described in FIG. 21 is applied regarding the setting of some thresholds among all the thresholds to be set to the dither mask. That is, the processing of providing the nozzle ejection rate with the upper limit by the dot allowing pixels and setting the threshold is applied regarding the setting of at least some thresholds among all the thresholds.

According to the flowchart in FIG. 21, the nozzle ejection rates of the individual nozzles can be increased while roughly keeping the relative ratio of ejection of the individual nozzles according to the nozzle relative ejection rate together with the increase of the thresholds to be set. "Relative ratio of ejection of individual nozzles" here corresponds to the nozzle relative ejection rate but cannot be completely equal.

The example of one path is described in FIG. 24 to FIG. 26, however, the flowchart in FIG. 21 is similarly applicable even in the case of two or more paths.

FIG. 27 is a diagram illustrating an example of the dot priority pixels set in step S18 in FIG. 21 according to the example of two paths described in FIG. 16 and FIG. 17. FIG. 27 illustrates an example of the arrangement of the dot priority pixels set based on the nozzle relative ejection rates of the individual nozzles illustrated in FIG. 16 and the nozzle pattern illustrated in FIG. 17. The description rules in FIG. 27 are similar to FIG. 25.

Also, in FIG. 27, together with the arrangement example of the dot priority pixels, a left nozzle relative ejection rates for recording the individual rasters, right nozzle relative ejection rates, a left nozzle priority pixel number and a right nozzle priority pixel number are indicated together. "Left nozzle relative ejection rate" in FIG. 27 means the nozzle relative ejection rates of the individual nozzles that record the pixels belonging to the odd-numbered columns (main scanning position 1) in the nozzle pattern corresponding to the dither mask of 20×20 pixels illustrated in FIG. 17. Also, "right nozzle relative ejection rate" in FIG. 27 means the nozzle relative ejection rates of the individual nozzles that record the pixels belonging to the even-numbered columns (main scanning position 2) in the same nozzle pattern.

"Left nozzle priority pixel number" means the number of dot priority pixels within the main scanning direction raster including the pixels belonging to the odd-numbered columns (main scanning position 1) in the nozzle pattern corresponding to the dither mask of 20×20 pixels illustrated in FIG. 17. "Right nozzle priority pixel number" means the number of dot priority pixels within the main scanning direction raster including the pixels belonging to the even-numbered columns (main scanning position 2) in the nozzle pattern illustrated in FIG. 17.

For example, the left nozzle priority pixel number of the raster of the first row is calculated as left nozzle relative ejection rate×number of main scanning pixels/main scanning direction path number=1×20/2=10. Also, the right nozzle priority pixel number of the raster of the first row is calculated as right nozzle relative ejection rate×number of main scanning pixels/main scanning direction path number=0.2×20/2=2.

The dot priority pixels illustrated in FIG. 27 are the example set according to the first example of the setting method of the dot priority pixels using "conditional expression 1" described above. Of course, the dot priority pixels may be set not only by the first example but also the methods of the second example and the third example or the like.

<Specific Example in the Case of Regularly Setting Dot Priority Pixels>

Here, the method described in "third example of setting method of dot priority pixels" is applied to the example in FIG. 27 and described. In FIG. 27, since the nozzle relative ejection rate is 0.4 for the left nozzles of the raster of the second row for example, the dot priority pixels are to be set to the pixels of the numbers for which the value of the integral multiple of 1/0.4=2.5 is rounded to the integer value. Here in FIG. 27, since the main scanning direction path number is 2, "1" of the ejection pixel interval corresponds to two pixels. Therefore, in the case that the rounding method of the integer value is rounding-off, the dot priority pixels are to be set to the fifth, ninth, 15th and 19th pixels (the pixels of the numbers corresponding to 3, 5, 8 and 10 for which 2.5, 5, 7.5 and 10 are rounded to the integer value respectively) with the pixel at a left end as the first. Also, since the nozzle relative ejection rate is 0.8 for the right nozzles of the raster of the second row, the dot priority pixels are to be set to the pixels of the numbers for which the value of the integral multiple of 1/0.8=1.25 is rounded to the integer value. That is, in the case that the rounding method of the integer value is rounding-off, the dot priority pixels are to be set to the second, sixth, eighth, 10th, 12th, 16th, 18th and 20th pixels (the pixels of the numbers corresponding to 1, 3, 4, 5, 6, 8, 9 and 10 for which 1.25, 2.5, 3.75, 5, 6.25, 7.5, 8.75 and 10 are rounded to the integer value respectively).

<Example of Dot Priority Pixels with Upper Limit in Example of Two Paths>

Figure 28:
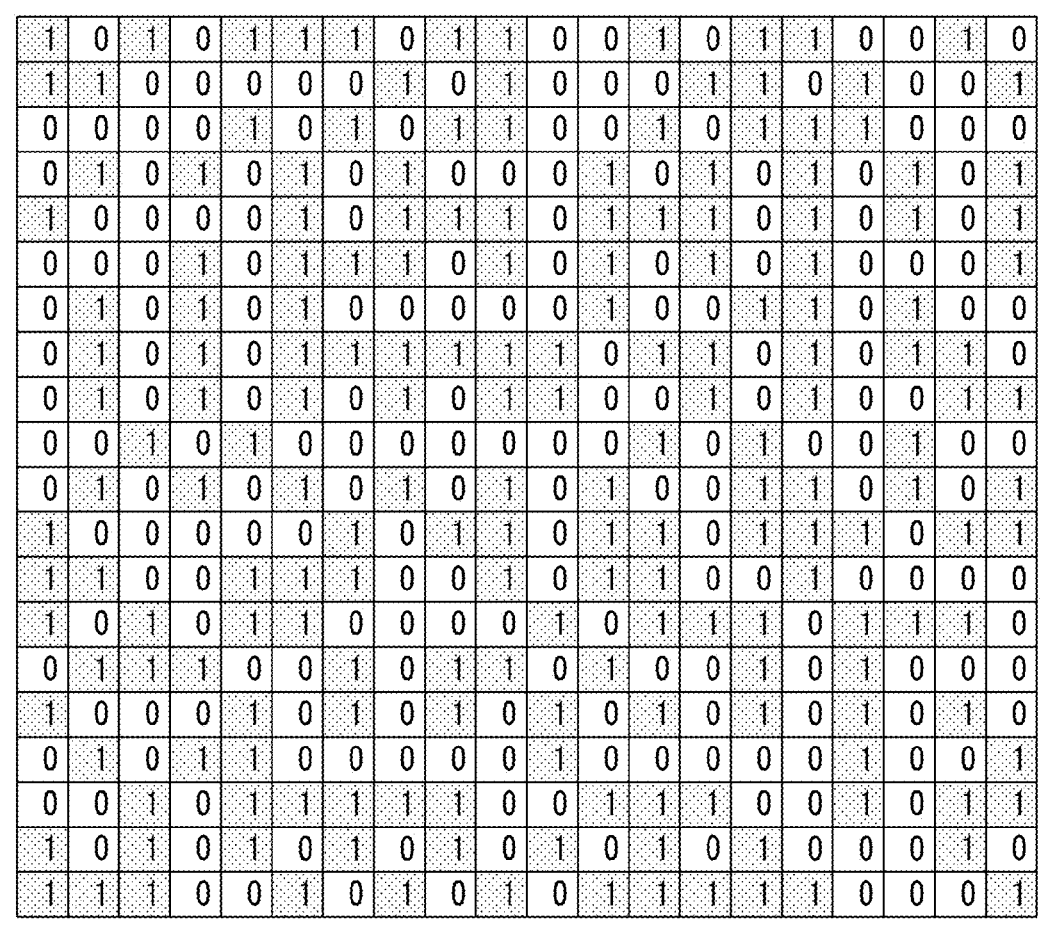

FIG. 28 is a diagram illustrating the arrangement of the dot priority pixels with the upper limit which is the pixel array of the logical product obtained by performing the AND operation of the dot priority pixels illustrated in FIG. 27 and the dot allowing pixels illustrated in FIG. 23.

In the example illustrated in FIG. 28, the number of the dot priority pixels with the upper limit is 189. Therefore, "predetermined number" in step S26 in FIG. 21 in this case is determined to be 189 or a value smaller than 189.

[Configuration of Dither Mask Generation Device]

Figure 29:
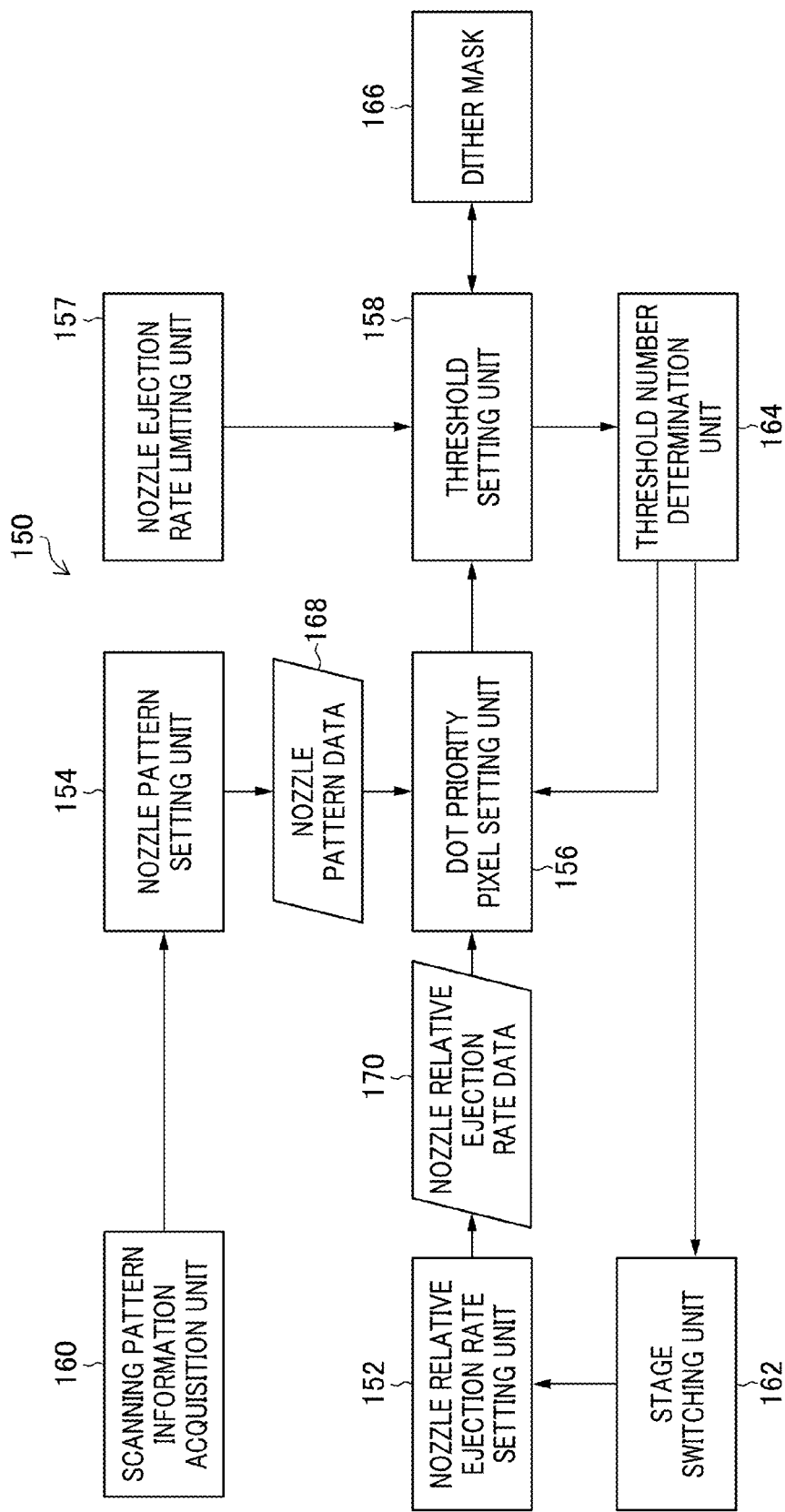
FIG. 29 is a block diagram of a dither mask generation device relating to the first embodiment.

FIG. 29 is a block diagram of a dither mask generation device relating to the first embodiment. A dither mask generation device 150 includes a nozzle relative ejection rate setting unit 152, a nozzle pattern setting unit 154, a dot priority pixel setting unit 156, a nozzle ejection rate limiting unit 157, and a threshold setting unit 158. Also, the dither mask generation device 150 has a scanning pattern information acquisition unit 160, a stage switching unit 162, and a threshold number determination unit 164. These individual units can be achieved by a hardware circuit such as an integrated circuit, or hardware and software of a computer, or an appropriate combination thereof. Also, a function of the dither mask generation device 150 may be loaded on the controller 102 described in FIG. 5.

The nozzle relative ejection rate setting unit 152 illustrated in FIG. 29 performs processing of setting the nozzle relative ejection rate indicating a ratio of the nozzle ejection rates to be the control target for the individual nozzles in the recording head 24 (see FIG. 4). The nozzle relative ejection rate setting unit 152 sets the nozzle relative ejection rate for each nozzle according to the prepared stage of the nozzle relative ejection rate as illustrated in FIG. 24. The nozzle relative ejection rate setting unit 152 performs the processing described in step S14 in FIG. 21.

The stage switching unit 162 illustrated in FIG. 29 specifies the stage of the nozzle relative ejection rate set in the nozzle relative ejection rate setting unit 152. The stage switching unit 162 performs the processing described in step S30 in FIG. 21. The nozzle relative ejection rate setting unit 152 sets the nozzle relative ejection rate of the stage specified by the stage switching unit 162.

The nozzle pattern setting unit 154 performs processing of specifying the nozzles corresponding to the individual pixels of a dither mask 166, based on the information of the scanning pattern obtained from the scanning pattern information acquisition unit 160. That is, the nozzle pattern setting unit 154 performs processing of making at least one nozzle in charge of the recording at the respective pixel positions correspond, for the individual pixels of the dither mask 166.

The scanning pattern information acquisition unit 160 acquires the information of the scanning pattern according to the image drawing mode from the scanning pattern program or the like. As described above, since the scanning pattern program defines the reciprocating scanning in the main scanning direction by the recording head 24 to the recording medium 12 intermittently conveyed in the sub scanning direction and the number of the paths, the scanning pattern of the recording head 24 can be discriminated from the scanning pattern program.

The nozzle pattern setting unit 154 discriminates the scanning pattern when the recording head 24 is relatively moved in the main scanning direction and the sub scanning direction to the recording medium 12. The nozzle pattern setting unit 154 performs processing of determining by which nozzle 62 of the recording head 24 the individual pixels of the dither mask 166 are to be recorded based on the scanning pattern. The nozzle pattern setting unit 154 generates nozzle pattern data 168 which is the data of the nozzle pattern indicating correspondence relation between the individual pixels of the dither mask 166 and the nozzles in charge of the recording of the respective pixels. The nozzle pattern data 168 is the data of the nozzle pattern described in FIG. 11 or FIG. 17, for example. The nozzle pattern setting unit 154 performs the processing described in step S16 in FIG. 21.

The method of generating the nozzle pattern data 168 is not limited to the method of determining it based on the scanning pattern program, and various kinds of methods can be used. Since the nozzle pattern data 168 can be determined by the image drawing mode and the size and arrangement method of the dither mask 166, the nozzle pattern data corresponding to each of the plurality of kinds of the image drawing modes can be held beforehand in the information storage unit such as a memory.

The dot priority pixel setting unit 156 performs processing of setting the dot priority pixels, based on nozzle relative ejection rate data 170 and the nozzle pattern data 168. The dot priority pixel setting unit 156 performs the processing described in step S18 in FIG. 21.

The nozzle ejection rate limiting unit 157 is a processing unit that performs processing of setting the upper limit to the nozzle ejection rate. The nozzle ejection rate limiting unit 157 in the present embodiment is a dot allowing pixel setting unit that performs the processing of setting the dot allowing pixels. The nozzle ejection rate limiting unit 157 performs the processing of setting the dot allowing pixels described in step S10 in FIG. 21. Also, the nozzle ejection rate limiting unit 157 may be configured to perform the processing of generating the dot priority pixels with the upper limit described in FIG. 26 and FIG. 28.

The threshold setting unit 158 prepares the dither mask 166 including the threshold non-set pixels, and performs processing of setting the thresholds to the threshold non-set pixels of the dither mask 166. The threshold setting unit 158 performs the processing described in step 20 to step S24 in FIG. 21. By setting the thresholds of all the pixels of the dither mask 166 by the threshold setting unit 158, the dither mask 166 which is a generation target is completed.

The threshold number determination unit 164 manages the number of the thresholds set by the threshold setting unit 158, and determines whether or not the setting of the predetermined number of the thresholds is completed. The threshold number determination unit 164 performs the processing described in step S26 in FIG. 21.

A determination result of the threshold number determination unit 164 is notified to the dot priority pixel setting unit 156. The dot priority pixel setting unit 156 performs the processing of changing the dot priority pixels, based on the information obtained from the threshold number determination unit 164.

Also, the determination result of the threshold number determination unit 164 is notified to the stage switching unit 162. The stage switching unit 162 performs the processing of changing the stage of the nozzle relative ejection rate, based on the information obtained from the threshold number determination unit 164.

The function of the nozzle relative ejection rate setting unit 152 corresponds to one form of "nozzle relative ejection rate setting function". The function of the nozzle pattern setting unit 154 corresponds to one form of "nozzle pattern setting function". The function of the dot priority pixel setting unit 156 corresponds to one form of "dot priority pixel setting function". The function of the nozzle ejection rate limiting unit 157 corresponds to one form of "nozzle ejection rate limiting function". The function of the threshold setting unit 158 corresponds to one form of "threshold setting function".

Using the dither mask generated by the present embodiment, the halftone processing of the image data for printing is performed. On the basis of the halftone image generated in this way, the ejection of the individual nozzles of the recording head 24 is controlled. Thus, generation of image defects such as banding, stripes or irregularity can be suppressed, and high-quality print images are obtained.

Second Embodiment

The second embodiment which is a modification of the first embodiment described above is described.

Figure 30:
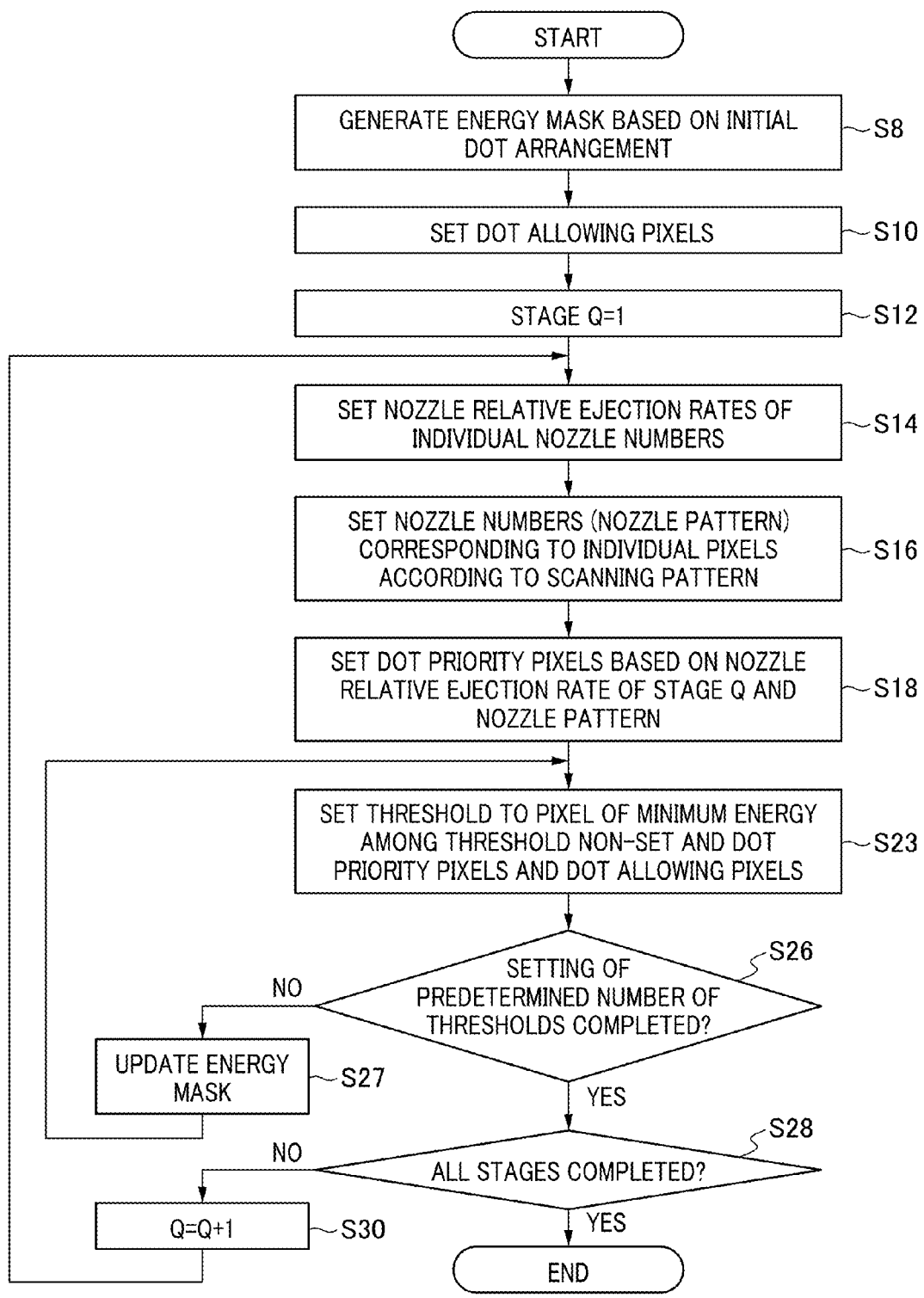
FIG. 30 is a flowchart illustrating ascending order threshold setting processing by a second embodiment.

FIG. 30 is a flowchart illustrating an example of ascending order threshold setting processing by the second embodiment. Instead of the flowchart described in FIG. 21, the flowchart illustrated in FIG. 30 can be applied. In FIG. 30, the same step numbers are attached to the processes that are the same as or similar to that in the flowchart described in FIG. 21, and the description is omitted.

In the example illustrated in FIG. 30, as a setting method of the thresholds after setting the dot priority pixels, a technique of a void-and-cluster method is used. The void-and-cluster method is described, for example, in Robert A. Ulichney "Void-and-cluster method for dither array generation", Proc. SPIE 1913, Human Vision, Visual Processing, and Digital Display IV, 332 (Sep. 8, 1993).

In the flowchart in FIG. 30, the setting of the dot priority pixels and the technique of the void-and-cluster method are combined, and processing of determining the pixels to set the thresholds from the threshold non-set pixels and setting the thresholds is performed.

That is, as illustrated in FIG. 30, an energy mask for which a blur filter such as a Gaussian filter is added around the pixels corresponding to the individual dots of the initial dot arrangement is generated first (step S8).

After the processing from step S10 to step S18, in step S23, the threshold is set to the pixel of the minimum energy among the threshold non-set and dot priority pixels and the dot allowing pixels.

After step S23, whether or not the setting of the predetermined number of the thresholds is completed is determined in step S26. In the case of No determination in step S26, the process advances to step S27, and the energy mask is updated.

That is, in step S27, the energy mask is updated by adding the blur filter around the pixel corresponding to the threshold accompanying the setting of the threshold. After the processing in step S27, the process returns to step S23.

The processing from step S23 to step S27 is looped until the setting of the predetermined number of the thresholds is completed. When the setting of the predetermined number of the thresholds is completed, it becomes Yes determination in step S26, and the process advances to step S28.

In the case of the flowchart in FIG. 30, the index of the graininess evaluation is individual pixel values themselves of the energy mask corresponding to the thresholds of the previous time. Therefore, it is not needed to temporarily set the threshold as described in step S20 in FIG. 21 or to calculate the index of the graininess evaluation every time the threshold is temporary set. In the case of the ascending order, the pixel of the minimum energy is determined as the pixel of the best graininess.

In the first embodiment and the second embodiment described above, the example of the method of setting the dot priority pixels reflecting the nozzle relative ejection rates of the individual nozzles and generating the dither mask for which the nozzle ejection rate is biased is described.

Next, an example of a method of generating the dither mask for which the nozzle ejection rate is biased by reflecting the nozzle relative ejection rates of the individual nozzles on an evaluation index when setting the thresholds (third embodiment) is described.

Third Embodiment

Figure 31:
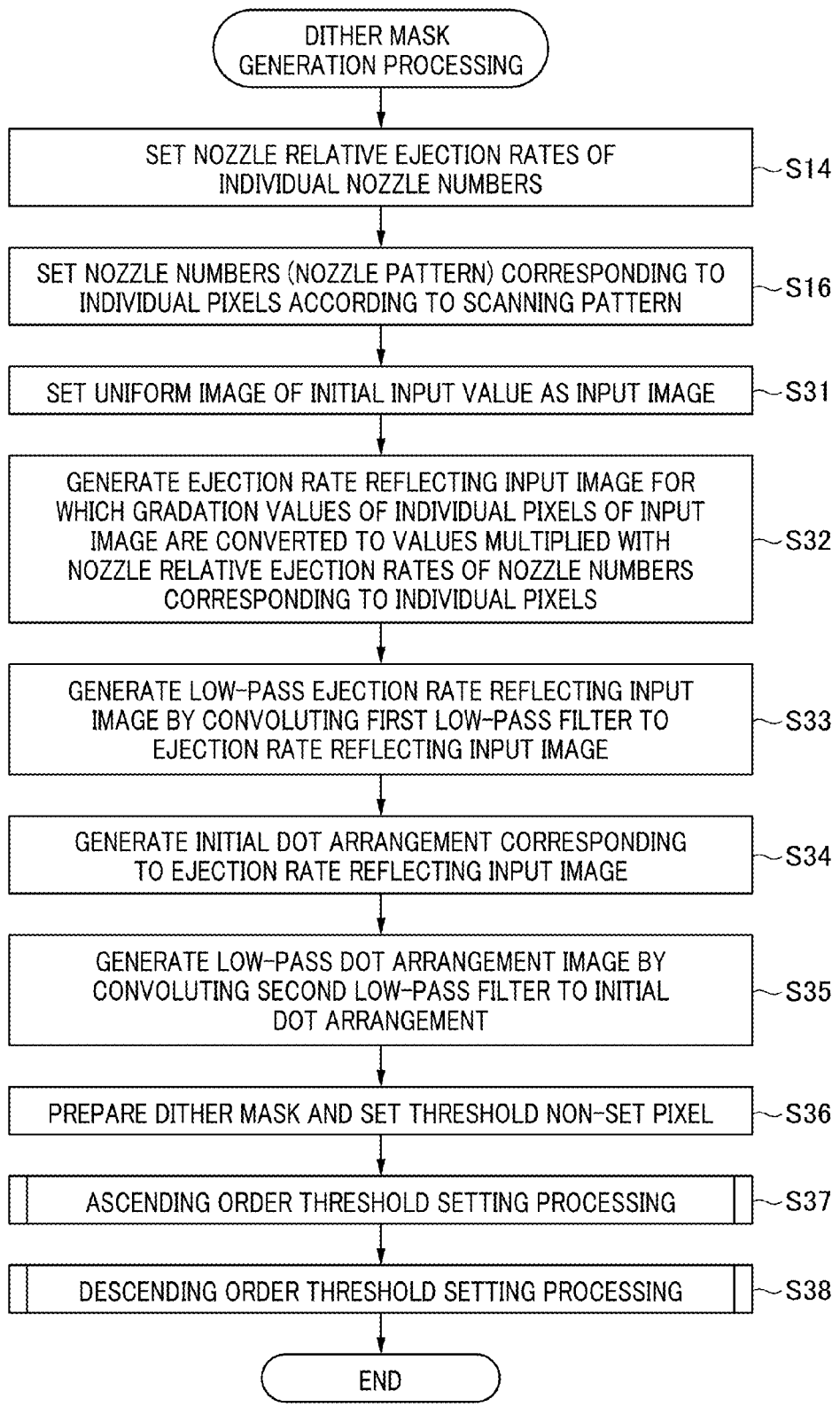
FIG. 31 is a flowchart illustrating a procedure of a dither mask generation method relating to a third embodiment.

FIG. 31 is a flowchart illustrating a procedure of a dither mask generation method relating to the third embodiment. In the flowchart in FIG. 31, the same step numbers are attached to the processes that are the same as or similar to that in the flowchart described in FIG. 21.

In the dither mask generation method illustrated in FIG. 31, the nozzle relative ejection rates of the individual nozzle numbers in the recording head are set first (step S14). The process in step S14 corresponds to one form of "nozzle relative ejection rate setting process".

Next, for the image area (that is, the mask area) having the pixel array with the number of pixels equal to the mask size of the dither mask, the nozzle numbers (that is the nozzle pattern) corresponding to the individual pixels of the dither mask are set according to the scanning pattern when the image recording by the inkjet recording device 10 is performed (step S16). The process in step S16 corresponds to one form of "nozzle pattern setting process".

After step S16, a uniform image of an initial input value is set as the input image next (step S31). The uniform image of the initial input value can be the uniform image of the extremely low duty similarly to the initial dot arrangement of the first embodiment, for which the gradation value of about 0.2% to 0.5% in the case that the maximum gradation is 100% is the initial input value, for example. Here, in order to simplify the description, a range of the gradation values is defined as 0 to 100. As an initial input value $I_0$ which is the gradation value of 0.5% to the maximum gradation 100, "0.5" is set. However, the range of the gradation values and a specific numerical value of the initial input value are not limited to the example. For example, in the case that the range of the gradation values is 0 to 4095, one example of the initial input value is an integer value such as "20".

Next, an ejection rate reflecting input image for which the gradation values of the individual pixels of the input image set in step S31 are converted to values multiplied with the nozzle relative ejection rates of the nozzle numbers corresponding to the individual pixels is generated (step S32). The process of step S32 is a gradation conversion process of converting the gradation values of the individual pixels in the uniform image of the input value. The ejection rate reflecting input image generated in step S32 is one form of "the input image reflecting the nozzle relative ejection rate". The input image reflecting the nozzle relative ejection rate is called "first image".

Figure 32:
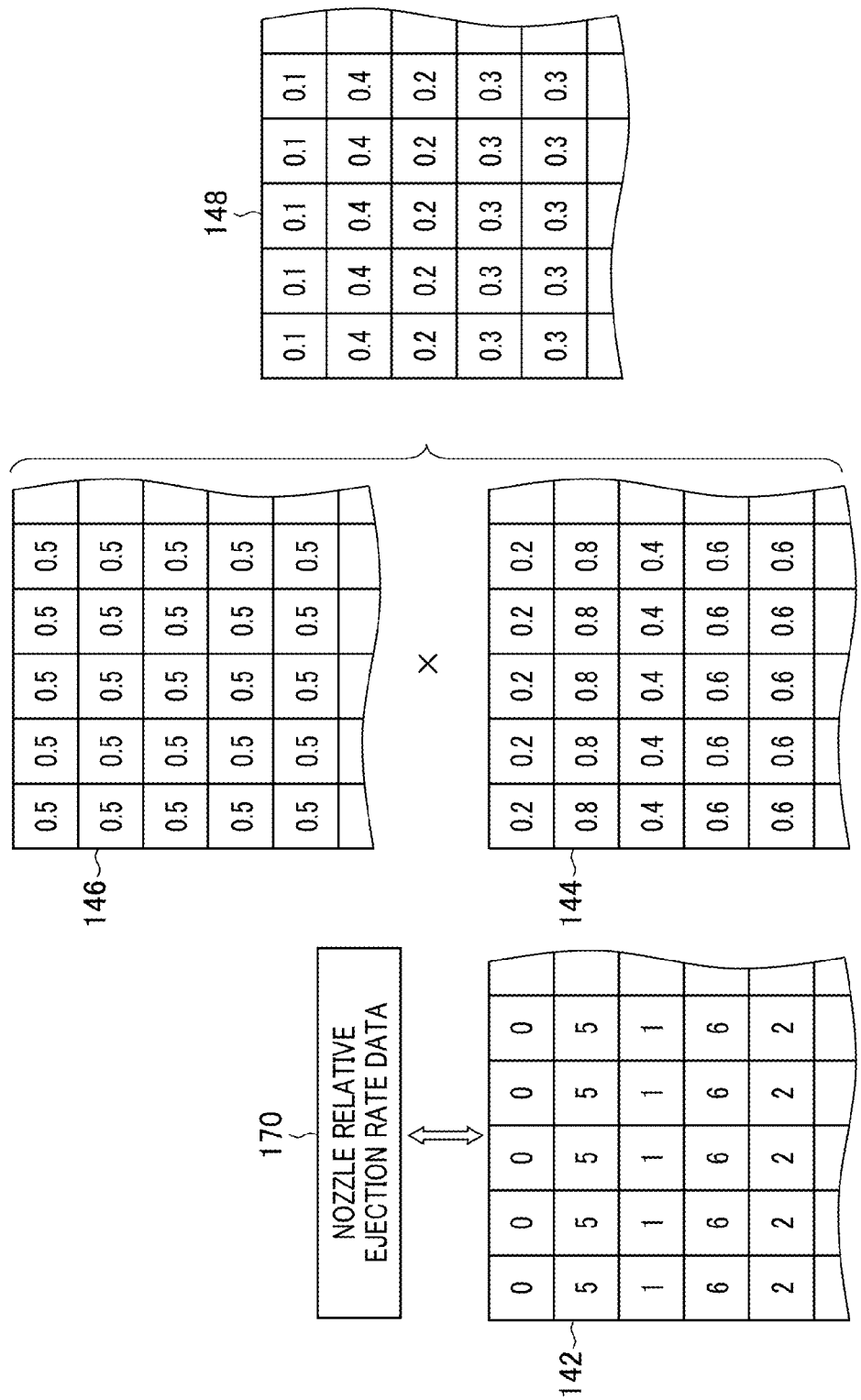
FIG. 32 is a conceptual diagram schematically illustrating content of generation processing of an ejection rate reflecting input image.

FIG. 32 is a conceptual diagram schematically illustrating content of the generation processing of the ejection rate reflecting input image. A nozzle relative ejection rate data 170 in FIG. 32 corresponds to the data of the nozzle relative ejection rate illustrated in stage Q=1 in FIG. 24.

A nozzle pattern 142 in FIG. 32 corresponds to the nozzle pattern described in FIG. 11. By referring to the nozzle relative ejection rate data 170 for the individual nozzle numbers in the nozzle pattern 142, an ejection rate pattern 144 indicating the relation between the individual pixels of the dither mask and the nozzle relative ejection rates of the nozzle numbers corresponding to the individual pixels is obtained.

The individual cells to which numbers are attached in the ejection rate pattern 144 indicate the individual pixels of the dither mask, and the numbers inside the cells indicate the nozzle relative ejection rates of the nozzle numbers in charge of the recording of the pertinent pixel. On the basis of the ejection rate pattern 144, the nozzle relative ejection rate for each pixel is determined.

An input image 146 of the uniform gradation illustrated in FIG. 32 is the uniform image whose initial input value is "0.5". By multiplying each of the gradation values of the individual pixels in the input image 146 with the nozzle relative ejection rates corresponding to the individual pixels and converting the pixel values of the input image 146, an ejection rate reflecting input image 148 is generated.

As one example, since the nozzle relative ejection rate of the nozzle number 0 is "0.2", the gradation value of the pixel corresponding to the nozzle of the nozzle number 0 is converted from "0.5" to "0.1" by the multiplication of 0.5×0.2. The pixel values are converted similarly for all the pixels.

A low-pass ejection rate reflecting input image is generated by convoluting a first low-pass filter to the ejection rate reflecting input image 148 obtained in this way (step S33 in FIG. 31). The process of step S33 corresponds to one form of "first low-pass filter processing process". The low-pass ejection rate reflecting input image corresponds to one form of "second image".

The first low-pass filter can be any low-pass filter, but a low-pass filter suited to a human visual characteristic is preferable. As the first low-pass filter, a visual transfer function (VTF) which is a function indicating a human visual characteristic is well known. Also, as the first low-pass filter, a filter of a Gaussian function can be also used.

For the visual transfer function, while a graph function for which a horizontal axis indicates a frequency and a vertical axis indicates a response is known, the frequency characteristic (that is, a filter in a frequency space) can be replaced with a spatial filter in a real space. An operation of multiplying f(fx, fy) of the visual transfer function in the frequency space is processing mathematically equivalent to convoluting a spatial filter F(x, y) on the real space. It is similar for the Gaussian function, and "multiplying" operation in one of the frequency space and the real space is equivalent to convolution in the other space, and an expression of "multiplying" is used including both meanings.

Next, an initial dot arrangement corresponding to the ejection rate reflecting input image is generated (step S34 in FIG. 31). The initial dot arrangement is obtained by executing the halftone processing such as a known dither method, an error diffusion method or a direct binary search (DBS) method to the ejection rate reflecting input image.

The process of step S34 corresponds to one form of "first dot arrangement generation process". Also, the dot arrangement generated in step S34 corresponds to one form of "first dot arrangement".

Next, a low-pass dot arrangement image is generated by convoluting a second low-pass filter to the initial dot arrangement (step S35). The process of step S35 corresponds to one form of "second low-pass filter processing process". The low-pass dot arrangement image is called "third image".

The second low-pass filter can be any low-pass filter, but a low-pass filter suited to the human visual characteristic is preferable. As the second low-pass filter, a filter of the visual transfer function or a filter of the Gaussian function can be used, similarly to the first low-pass filter.

The first low-pass filter and the second low-pass filter do not always coincide. While the first low-pass filter is a low-pass filter corresponding to the gradation value "1" of the input image, the second low-pass filter is a low-pass filter corresponding to one dot, and is a filter reflecting at least one characteristic among the density of the dot, the diameter of the dot and the shape of the dot or the like.

Next, the dither mask is prepared, and a threshold non-set pixel is set (step S36). The mask size of the dither mask is turned to an integer multiple of the repetition cycle in the main scanning direction and the sub scanning direction of the nozzle numbers by the scanning pattern. In the case of the scanning pattern described in FIG. 11, the repetition cycle of the nozzle numbers in the main scanning direction is one pixel, and the repetition cycle of the nozzle numbers in the sub scanning direction is "nine pixels". Therefore, the mask size of the dither mask is turned to the integer multiple of one pixel for the main scanning direction, and the integer multiple of nine pixels for the sub scanning direction. In this example, as one example of the mask size that satisfies such a condition, the dither mask of 18 rows×18 columns is illustrated.

The threshold non-set pixel of the dither mask is the pixel without a dot in the case that the threshold setting is in an ascending order, and is the pixel with a dot in the case that the threshold setting is in a descending order.

In the case of this example, ascending order threshold setting processing (step S37 in FIG. 31) of starting from the initial dot arrangement corresponding to the initial input value (for example, gradation corresponding to the duty of 0.5%) and setting a larger threshold gradually in the ascending order while gradually increasing the dots, and descending order threshold setting processing (step S38) of setting a smaller threshold gradually in the descending order from the initial dot arrangement while gradually removing the dots are included.

An order of the ascending order threshold determination processing (step S37) and the descending order threshold determination processing (step S38) can be switched around.

Figure 33:
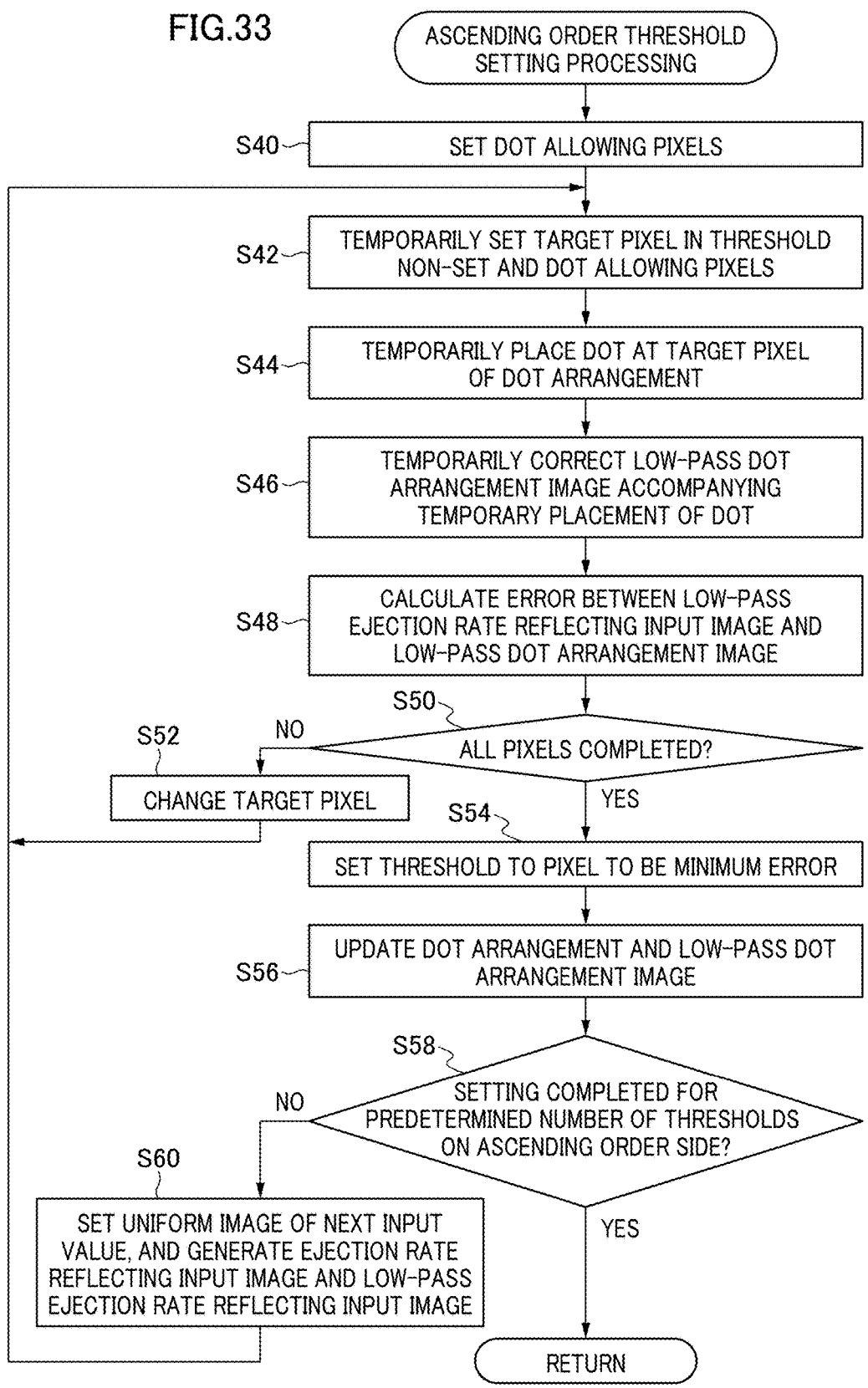
FIG. 33 is a flowchart of ascending order threshold setting processing in the third embodiment.

FIG. 33 is a flowchart of the ascending order threshold setting processing. First, the dot allowing pixels are set (step S40). A setting method of the dot allowing pixels is as described in the first embodiment. The process in step S40 is a process of performing the processing similar to the process described in step S10 in FIG. 21.

Then, a target pixel is temporarily set in the threshold non-set and dot allowing pixels (step S42). Then, a dot is temporarily placed at a pixel position corresponding to the target pixel in the dot arrangement (step S44). The process of step S44 is called "temporary placement of dot". Accompanying the temporary placement of the dot, the low-pass dot arrangement image is temporarily corrected (step S46). Temporary correction in step S46 is processing of temporarily adding the second low-pass filter to the pixel corresponding to the target pixel in the low-pass dot arrangement image.

Here, for the dot arrangement and the low-pass dot arrangement, since the arrangement of the same size as the dither mask is repeatedly and adjacently arranged by the same arrangement method as the dither mask, adding the low-pass filter to the pixel corresponding to the target pixel means adding the low-pass filter to the pixel corresponding to the target pixel in all the adjacent arrangements. In the present embodiment, the processing of adding or removing the low-pass filter to/from the low-pass dot arrangement image and convoluting the low-pass filter to the dot arrangement indicates the processing on the assumption that the dot arrangement and low-pass dot arrangement images are repeatedly and adjacently arranged in the same size and by the same arrangement method as the dither mask, in this way.

Next, an error between the low-pass ejection rate reflecting input image and the low-pass dot arrangement image after the temporary correction is calculated (step S48).

As an evaluation index of the error between the low-pass ejection rate reflecting input image and the low-pass dot arrangement image, various indexes are possible. The index of the error may be, for example, a sum of squares or diffusion of a difference between the low-pass ejection rate reflecting input image and the low-pass dot arrangement image, or a square root of the sum of squares or a standard deviation.

As another evaluation index, the index of the error can be the sum of squares or diffusion of a value for which the individual pixel values of the low-pass dot arrangement image are divided by the individual pixel values of the low-pass ejection rate reflecting input image, or the square root of the sum of squares or the standard deviation. Also, on the contrary, it can be the sum of squares or diffusion of a value for which the individual pixel values of the low-pass ejection rate reflecting input image are divided by the individual pixel values of the low-pass dot arrangement image, or the square root of the sum of squares or the standard deviation. As the index of the error, in the case of including an operation of division by the individual pixel values of the low-pass ejection rate reflecting input image or the low-pass dot arrangement image, in order to prevent the division of the denominator "0", it is desirable to add a minute value (for example, "1") to an original image to be a divisor.

As a further example of the index of the error, the index that evaluates similarity of both images, such as a value for which the individual pixel values of the low-pass dot arrangement image and the individual pixel values of the low-pass ejection rate reflecting input image are multiplied and summed up or a cross-correlation value of the low-pass dot arrangement image and the low-pass ejection rate reflecting input image, may be the index of the error.

A combination of the process of step S48 of calculating the error which is the evaluation index reflecting the nozzle relative ejection rate and the process of steps S32 to S35 in FIG. 31 required for the processing of step S48 corresponds to one form of "nozzle relative ejection rate reflecting processing process".

Next, in step S50 in FIG. 33, for all the pixels of the threshold non-set and dot allowing pixels, whether or not the processing of step S42 to step S48 is completed is determined. When it is not completed in step S50, the target pixel is changed (step S52), and the process returns to step S42.

The target pixel is successively changed, the processing of step S42 to step S48 is repeatedly executed, and when it is Yes determination in step S50, the process advances to step S54. In step S54, the threshold is set to the pixel for which the error between the low-pass ejection rate reflecting input image and the low-pass dot arrangement image becomes minimum. In the case of using the sum of squares or diffusion of the difference or the divided value or the square root of the sum of squares or the standard deviation as the index of the error, it is determined that the error is minimum in the case that an evaluation value to be the index is minimum.

On the other hand, in the case of using the index that evaluates the similarity of both images, such as the value for which the individual pixel values of the low-pass dot arrangement image and the individual pixel values of the low-pass ejection rate reflecting input image are multiplied and summed up or the cross-correlation value of the low-pass dot arrangement image and the low-pass ejection rate reflecting input image, as the index of the error, it is determined that the error is minimum in the case that the evaluation value indicating the similarity is maximum, that is, in the case that the similarity is highest. The process of step S54 corresponds to one form of "threshold setting process".

Then, a dot is placed at a position corresponding to the pixel to which the threshold is set in step S54, and the dot arrangement and the low-pass dot arrangement image are updated (step S56).

In step S58, whether or not the setting of the predetermined number of the thresholds on an ascending order side is completed is determined. "Predetermined number" in step S58 can be the number of the dot allowing pixels. Or, as described in step S26 in FIG. 21, "predetermined number" may be a number smaller than the number of the dot allowing pixels, for example the number for which the number of the dot allowing pixels is multiplied by 0.8.

When the dot allowing pixels are generated based on a known dither mask such as a blue noise mask, the graininess of the arrangement of the dot allowing pixels themselves is excellent, however, the graininess is deteriorated after all as the number of the thresholds approaches the number of the dot allowing pixels due to discontinuity with the arrangement of the thresholds set by the flowchart in FIG. 33, it is desirable to set "predetermined number" to be the number smaller than the dot allowing pixels.

In the case of No determination in step S58, the process advances to step S60. In step S60, the uniform image of the next input value is set, and the ejection rate reflecting input image and the low-pass ejection rate reflecting input image are generated.

The initial input value set in step S31 and "next input value" in step S60 are determined as follows. That is, in step S48, the low-pass ejection rate reflecting input image and the low-pass dot arrangement image corresponding to it are compared to evaluate the error (similarity) between both, so that it is desirable that an average value of the pixel values in the low-pass ejection rate reflecting input image and an average value of the pixel values in the low-pass dot arrangement image corresponding to the low-pass ejection rate reflecting input image coincide or roughly coincide, when the error between both images is evaluated. "Rough coincidence" includes a range in which a difference between both is so small as not to be a problem practically for the evaluation of the error between the images and handling as the coincident ones is allowable. When the average values of both images are quite different from each other, since the error between both images cannot be appropriately evaluated, it is desirable that both are made to coincide or roughly coincide at a level of the average values.

Therefore, in step S60, according to increase of the dots accompanying the setting of the threshold in step S54, the input value of the low-pass ejection rate reflecting input image to be compared when the next threshold is determined is increased. For that, an increment of the input value corresponding to increase of one dot in step S56 is obtained beforehand, and in step S60, the input value is changed with the increment as a unit.

The increment of the input value corresponding to the increase of one dot is defined as $\Delta I$, the ejection rate reflecting input image converted to the value for which the gradation values ($\Delta I$) of the individual pixels in the uniform image of the gradation value $\Delta I$ are multiplied with the nozzle relative ejection rates of the nozzle numbers corresponding to the individual pixels is generated, and the low-pass ejection rate reflecting input image for which the first low-pass filter is convoluted to it is generated. Then, $\Delta I$ is determined such that the average value of the low-pass ejection rate reflecting input image coincides with the average value of the second low-pass filter corresponding to one dot.

Also, as another method, without generating the low-pass ejection rate reflecting input image from the uniform image of $\Delta I$, $\Delta I$ may be determined such that the value that is the total sum of the entire pixels of the values for which the gradation values of the individual pixels of the ejection rate reflecting input image are multiplied with the average value of the first low-pass filter corresponding to the gradation value 1 coincides with the average value of the second low-pass filter corresponding to one dot.

Figure 34:
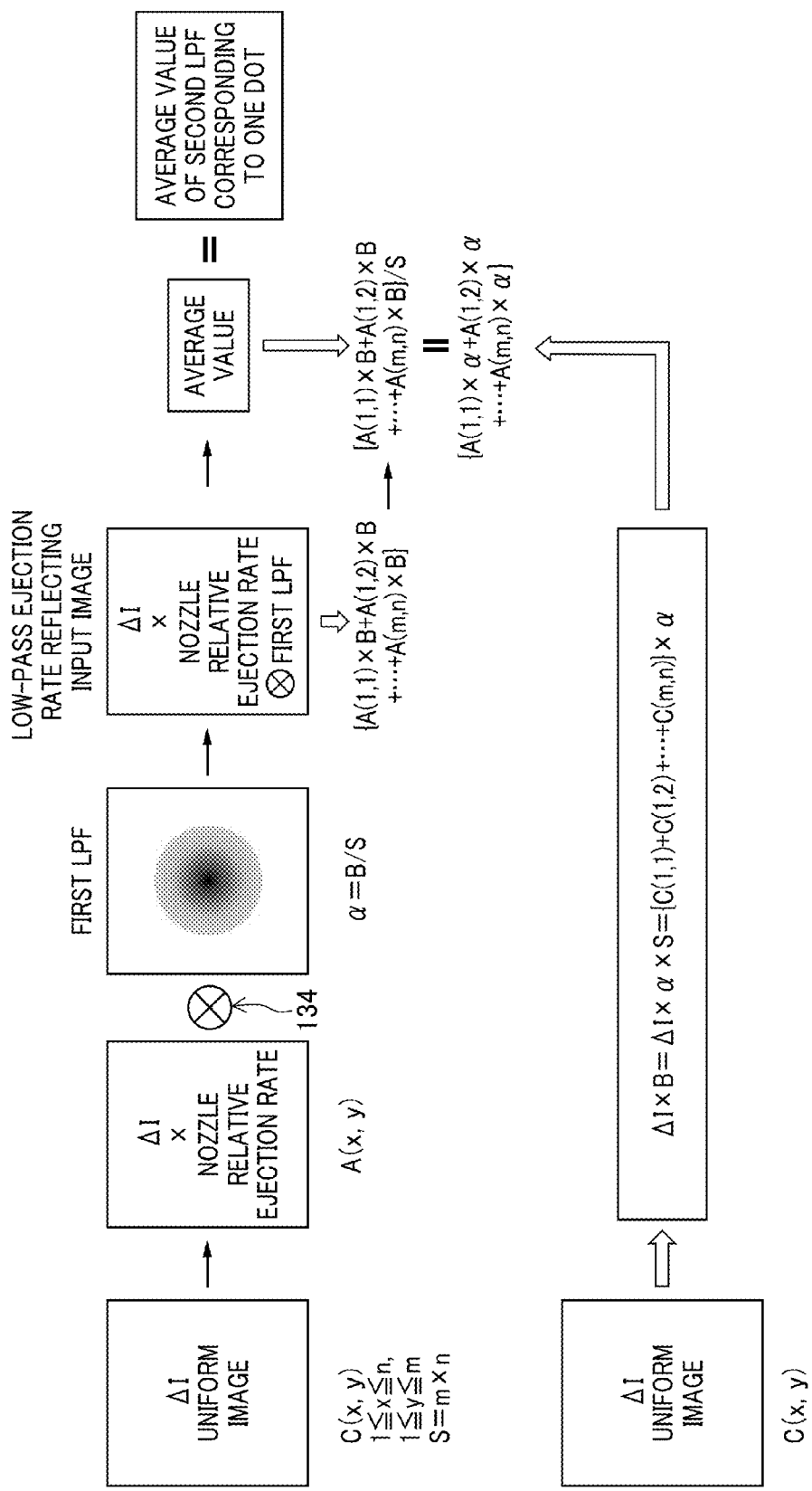
FIG. 34 is an explanatory diagram for explaining a method of obtaining an increment of an input value for one dot to be a unit of increase/decrease when changing the input value.

An outline of the method of obtaining $\Delta I$ is given using an explanatory diagram in FIG. 34. Here, the pixel value of the uniform image of the gradation value $\Delta I$ is indicated by C(x,y). Reference characters x and y designate the position of the pixel. The pixel value of the ejection rate reflecting input image for which the uniform image is multiplied with the nozzle relative ejection rates of the nozzle numbers corresponding to the individual pixels is indicated by A(x,y). The total sum of coefficients that are components of the individual cells of the first low-pass filter itself is indicated by B. In the drawings such as FIG. 34 and the like, for the simplification of the description, a simple notation of "LPF" is used as a substituting notation substituting the description of "low-pass filter". The LPF is an abbreviation notation of "low-pass filter". A symbol indicated by a sign 134 in FIG. 34 indicates that a convolution operation is to be performed.

Also, the mask size of the dither mask is indicated by S. Reference characters B and S respectively designate positive integers. The mask size in the case of assuming the dither mask of m rows×n columns is S=m×n. Reference characters m and n respectively designate positive integers. Further, the average value per pixel of the first low-pass filter itself corresponding to the gradation value 1 is defined as $\alpha=B/S$.

When the first low-pass filter is applied to a certain pixel (x,y) of the ejection rate reflecting input image A(x,y), since the total of the pixel values increases by A(x,y)×B as the entire image, the total sum of the entire low-pass ejection rate reflecting input image obtained by convoluting the first low-pass filter to all the pixels of the ejection rate reflecting input image A(x,y) is indicated by the following expression (1).

$$A(1,1) \times B + A(1,2) \times B + \ldots + A(m,n) \times B \quad \text{Expression (1)}$$

Therefore, the average value per pixel of the increment is indicated by the following expression (2) by dividing the value of the expression (1) by the mask size S.

$$\{A(1,1) \times B + A(1,2) \times B + \ldots + A(m,n) \times B\}/S \quad \text{Expression (2)}$$

On the other hand, since $\alpha=B/S$, the average value indicated by the expression (2) can be indicated as the following expression (3).

$$A(1,1) \times \alpha + A(1,2) \times \alpha + \ldots + A(m,n) \times \alpha \quad \text{Expression (3)}$$

In order to make the value indicated by the expression (3) coincide with the average value of the second low-pass filter corresponding to one dot, $\Delta I$ is determined.

When $\Delta I$ is determined in this way, for an arbitrary dither mask threshold, the value for which the number of the dots generated by the threshold is multiplied with $\Delta I$ is determined as the input value.

In step S56, when the dots are added and the dot arrangement is updated, accordingly, as the next input value, $\Delta I$ is added to the input value, the uniform image is changed (step S60 in FIG. 33), and the ejection rate reflecting input image and the low-pass ejection rate reflecting input image are generated. In such a manner, the low-pass ejection rate reflecting input image and the low-pass dot arrangement image to be compared can be made to roughly coincide at the level of the average values.

In step S32 in FIG. 31 and step S60 in FIG. 33, by multiplying the gradation values of the individual pixels with the nozzle relative ejection rate (see FIG. 10), the values become smaller than the gradation values in the case of not multiplying the nozzle relative ejection rate. The nozzle relative ejection rate may be corrected so that, with the repetition cycle in the main scanning direction and the sub scanning direction of the nozzle numbers as the unit area, the average gradation value in the unit area does not change before multiplying and after multiplying the nozzle relative ejection rate, that is, the average gradation value per unit area becomes invariable before and after reflecting the nozzle relative ejection rate.

By not changing the average gradation value in the unit area before and after multiplying the nozzle relative ejection rate, calculation of $\Delta I$ described above can be further simplified. Specifically, as illustrated in a lower column of FIG. 34, $\Delta I$ is determined so that the value for which the value for which $\Delta I$ is multiplied with the average value $\alpha$ of the first low-pass filter corresponding to the gradation value 1 is further multiplied with the mask size S, or the value for which $\Delta I$ is multiplied with the total sum B of the first low-pass filter corresponding to the gradation value 1 coincides with the average value of the second low-pass filter corresponding to one dot.

Even when the nozzle relative ejection rate is reflected on $\Delta I$, under the condition that the average value of $\Delta I$ per unit area does not change before and after that, the following expression (4) is satisfied.

$$\Delta I \times B = \Delta I \times \alpha \times S = A(1,1) \times \alpha + A(1,2) \times \alpha + \ldots + A(m,n) \times \alpha \quad \text{Expression (4)}$$

Therefore, in order to make this value coincide with the average value of the second low-pass filter corresponding to one dot, $\Delta I$ is determined.

The method of determining $\Delta I$ based on the average value per pixel of the coefficients that are the components of the individual cells of the first low-pass filter is described above; however, $\Delta I$ may be determined based on the total sum of the coefficients that are the components of the individual cells of the first low-pass filter. That is, $\Delta I$ may be determined so that the total sum of the entire low-pass ejection rate reflecting input image indicated by the expression (1) coincides with the total sum of the second low-pass filter corresponding to one dot, or, in the case of correcting the nozzle relative ejection rate so that the average gradation value in the unit area does not change before and after multiplying the nozzle relative ejection rate, $\Delta I$ may be determined so that the value indicated by the following expression (5) coincides with the total sum of the second low-pass filter corresponding to one dot.

$$\Delta I \times B \times S = A(1,1) \times B + A(1,2) \times B + \ldots + A(m,n) \times B \quad \text{Expression (5)}$$

The fact that the average gradation in the unit area does not change before and after multiplying the nozzle relative ejection rate means that there is the value of the nozzle relative ejection rate exceeding 1 by the correction of the nozzle relative ejection rate.

[About Correction of Nozzle Relative Ejection Rate]

The nozzle relative ejection rate is corrected specifically as follows.

With the repetition cycle in the main scanning direction and the sub scanning direction of the individual nozzles 62 as the unit area, the area ratio of the pixel corresponding to the nozzle number 0 in the unit area is indicated as r0, the area ratio of the pixel corresponding to the nozzle number 1 is indicated as r1, and the area ratio of the pixel corresponding to the nozzle number k in the unit area is indicated as rk in the same manner. Reference character k is a parameter indicating the nozzle number. When the number of the nozzles configuring the nozzle array is Q and the leading number of the nozzle number is 0, reference character k designates an integer of 0 to Q–1 (k=0, 1, 2, ... Q–1). Reference character Q designates an integer equal to or larger than 2.

In the case of the example illustrated in FIG. 11, the unit area to be a unit of the repetition cycle of the scanning pattern is configured by nine pixels that are one pixel in the main scanning direction×nine pixels in the sub scanning direction that are lined in the order of the nozzle numbers 0, 5, 1, 6, 2, 7, 3, 8 and 4. The unit area to be the unit of the repetition cycle of the scanning pattern is called "scanning pattern unit area", and the pixel corresponding to the nozzle number k in the scanning pattern unit area is called "nozzle number k corresponding pixel". In this case, a gradation sum of the nozzle number k corresponding pixel becomes rk×I (k=0, 1, 2, ... Q–1).

Then, when the nozzle relative ejection rate of the nozzle number k is defined as Lk, as a result, an average gradation in the scanning pattern unit area after multiplying the nozzle relative ejection rate becomes I×(r0×L0+r1×L1+ ... ).

In order to prevent the average gradation in the scanning pattern unit area from changing before and after multiplying nozzle relative ejection rate, the following expression (6) is satisfied, $$I = I \times (r0 \times L0 + r1 \times L1 + \ldots) \quad \text{Expression (6)}$$

that is, the nozzle relative ejection rates L0, L1 ... of the individual nozzles 62 are corrected so as to satisfy an expression (7).

$$r0 \times L0 + r1 \times L1 + \ldots = 1 \quad \text{Expression (7)}$$

The area ratio rk of the individual nozzles 62 normally satisfies the following expression (8).

$$r0 = r1 = r2 = \ldots = 1/Q \quad \text{Expression (8)}$$

In the expression (8), reference character Q designates the number of the nozzles configuring the nozzle array.

Therefore, the value of the nozzle relative ejection rate is corrected by multiplying the nozzle relative ejection rates Lk (k=0, 1, 2, ... Q–1) of the individual nozzles respectively with the correction value $\beta = Q/(L0+L1+L2+ \ldots)$ so as to satisfy the following expression (9), $$L0 + L1 + L2 + \ldots = Q \quad \text{Expression (9)}$$

without changing the rates of the nozzle relative ejection rates (L0, L1, L2 ... ) of the individual nozzles, based on the expression (7) and the expression (8).

Figure 35:
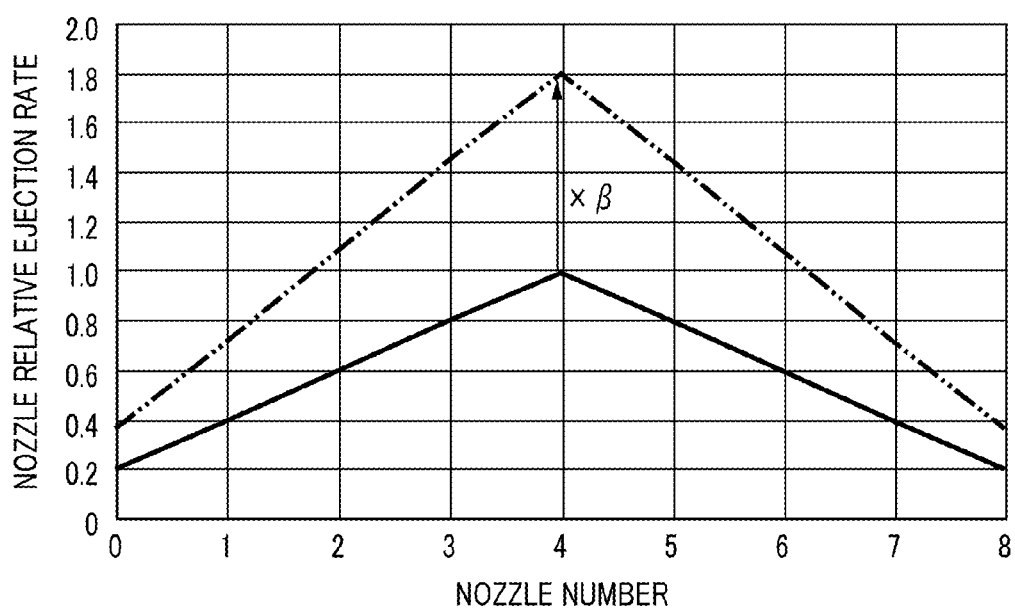
FIG. 35 is an explanatory diagram of the corrected nozzle relative ejection rate.

FIG. 35 is an explanatory diagram of the nozzle relative ejection rate corrected by multiplying the nozzle relative ejection rate described in FIG. 10 with the correction value $\beta$. Since the correction value $\beta$ becomes a value larger than 1, as illustrated in FIG. 35, there is a possibility that the nozzle relative ejection rate after the correction becomes greater than 1. In this case, in the case that the value for which the gradation values of the individual pixels of the image data are multiplied with the nozzle relative ejection rate after the correction becomes 100% of the largest gradation value or greater, the gradation value after the conversion may be turned to 100% of the largest gradation value.

The process of correcting the nozzle relative ejection rate using the correction value $\beta$ as illustrated in FIG. 35 corresponds to one form of "correction process". The process of correcting the nozzle relative ejection rate is executed before using the nozzle relative ejection rate in step S32 in FIG. 31.

After step S60 in FIG. 33, the process returns to step S42, and the above-described processing of step S42 to step S58 is repeated. In this way, the individual thresholds are determined in the ascending order, and when setting is ended for the predetermined number of the thresholds, Yes determination is attained in step S58, and a subroutine in FIG. 33 is ended.

Figure 36:
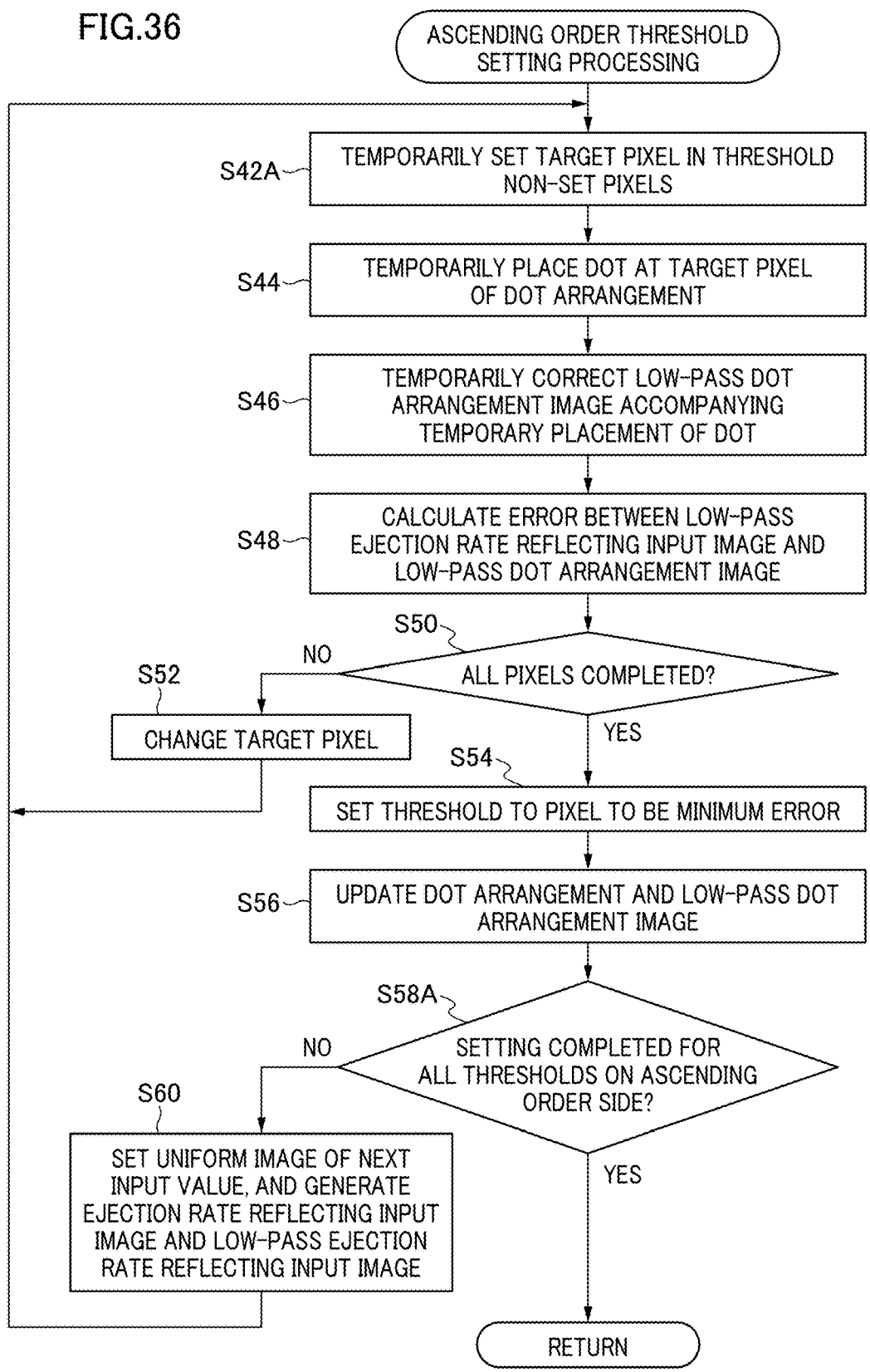
FIG. 36 is a flowchart of ascending order threshold setting processing executed following the flowchart in FIG. 33.

In the case of Yes determination in step S58 in FIG. 33, all the remaining thresholds in the ascending order are set according to a flowchart illustrated in FIG. 36.

In the flowchart in FIG. 36, the same step numbers are attached to the processes that are the same as or similar to that in the flowchart illustrated in FIG. 33, and the description is omitted.

In the flowchart in FIG. 36, a process of determining the dot allowing pixels (step S40) is omitted, and in step S42A replacing step S42 in FIG. 33, the restriction of the dot allowing pixels is removed, and the target pixel is temporarily set in the threshold non-set pixels. Also, the flowchart in FIG. 36 has a process of determining whether or not the entire threshold setting on the ascending order side is completed (step S58A in FIG. 36), replacing step S58 in FIG. 33.

In the case of Yes determination in step S58 in FIG. 33, the process advances to the flowchart in FIG. 36, and all the remaining thresholds on the ascending order side are set according to the flowchart in FIG. 36, without setting the dot allowing pixels. When the flowchart in FIG. 36 is ended, the process returns to the main flow in FIG. 31.

Figure 37:
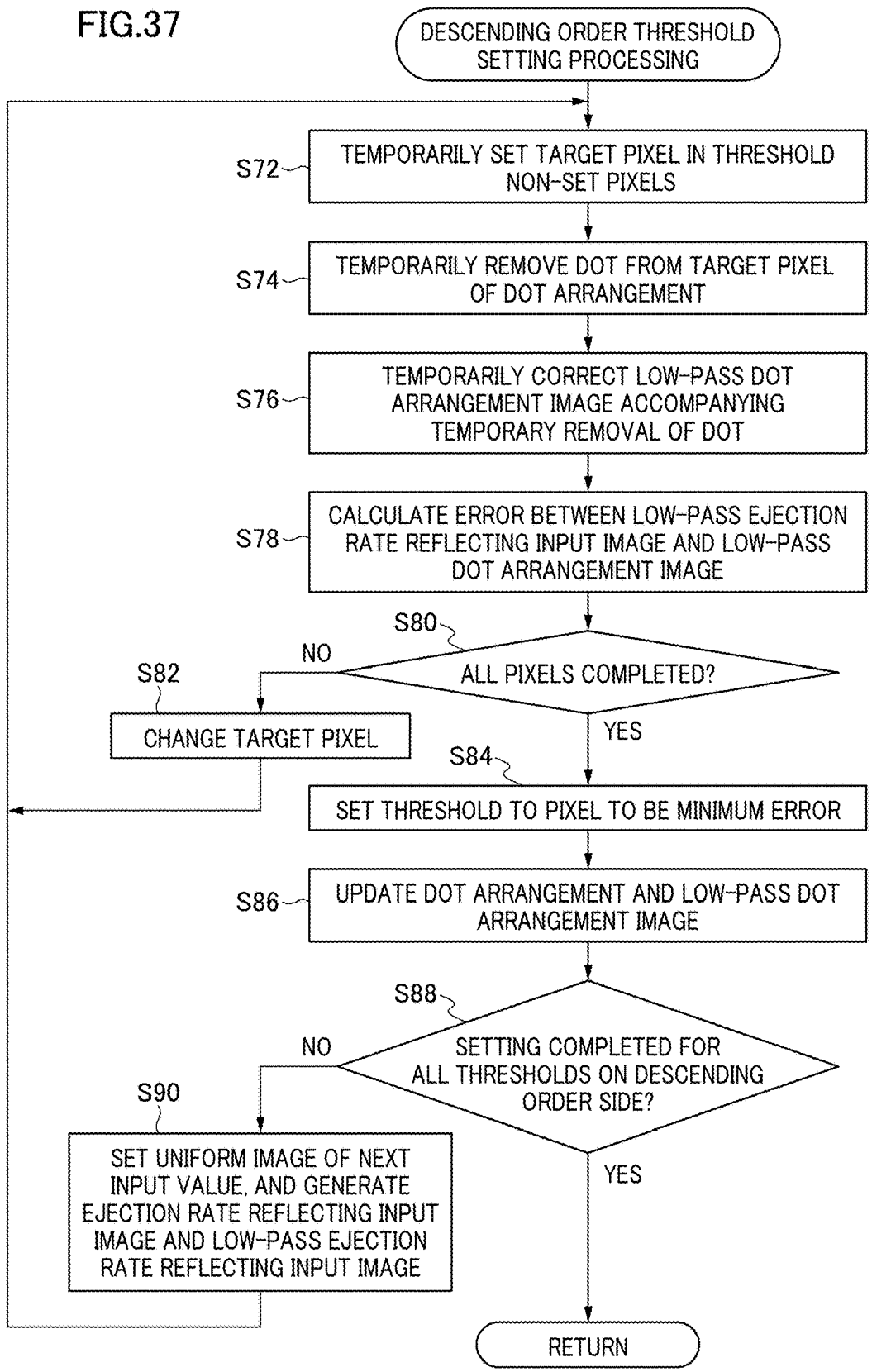
FIG. 37 is a flowchart of descending order threshold determination processing in the third embodiment.

FIG. 37 is a flowchart of descending order threshold setting processing. The flowchart in FIG. 37 is a flow of the processing similar to the flowchart in the ascending order illustrated in FIG. 36. Main difference is a process of steps S74 and S76 in FIG. 37.

In the descending order threshold setting processing illustrated in FIG. 37, the dot allowing pixels are not set. In the descending order threshold determination processing illustrated in FIG. 37, first, a target pixel is temporarily set in the threshold non-set pixels (step S72). The threshold non-set pixels of the dither mask are the pixels with dots in the case that a threshold setting order is the descending order. That is, the target pixel is temporarily set from the pixels with dots in the dot arrangement. Then, in the case that the threshold setting order is the descending order, processing of temporarily removing a dot from the pixel position corresponding to the target pixel in the dot arrangement is performed (step S74). The process of step S74 is called "temporary removal of dot".

Accompanying the temporary removal of the dot, the low-pass dot arrangement image is temporarily corrected (step S76). Temporary correction in step S76 is processing of temporarily removing the second low-pass filter at the pixel position corresponding to the target pixel from the low-pass dot arrangement image.

Then, an error between the low-pass ejection rate reflecting input image and the low-pass dot arrangement image after the temporary correction is calculated (step S78). An evaluation index of "error" calculated here can be, similarly to step S48 in FIG. 33, the sum of squares or diffusion of a difference, or the square root of the sum of squares of the difference or the standard deviation.

Since the individual processes of steps S80, S82, S84, S86, S88 and S90 in FIG. 37 correspond to the individual processes of steps S50, S52, S54, S56, S58 and S60 in FIG. 33, respectively, the description is omitted. However, in step S88 in FIG. 37 replacing step S58 in FIG. 33, whether or not the setting of all the thresholds on the descending order side is competed is determined.

After step S90, the process returns to step S72, and the above-described processing of step S72 to step S88 is repeated.

In this way, the individual thresholds are determined in the descending order, and when the setting is ended to the smallest threshold, Yes determination is attained in step S88, a subroutine in FIG. 37 is ended, and the process returns to the main flow in FIG. 31.

In this way, the thresholds of all the pixels in the dither mask are set, and the dither mask is completed.

Figure 38:
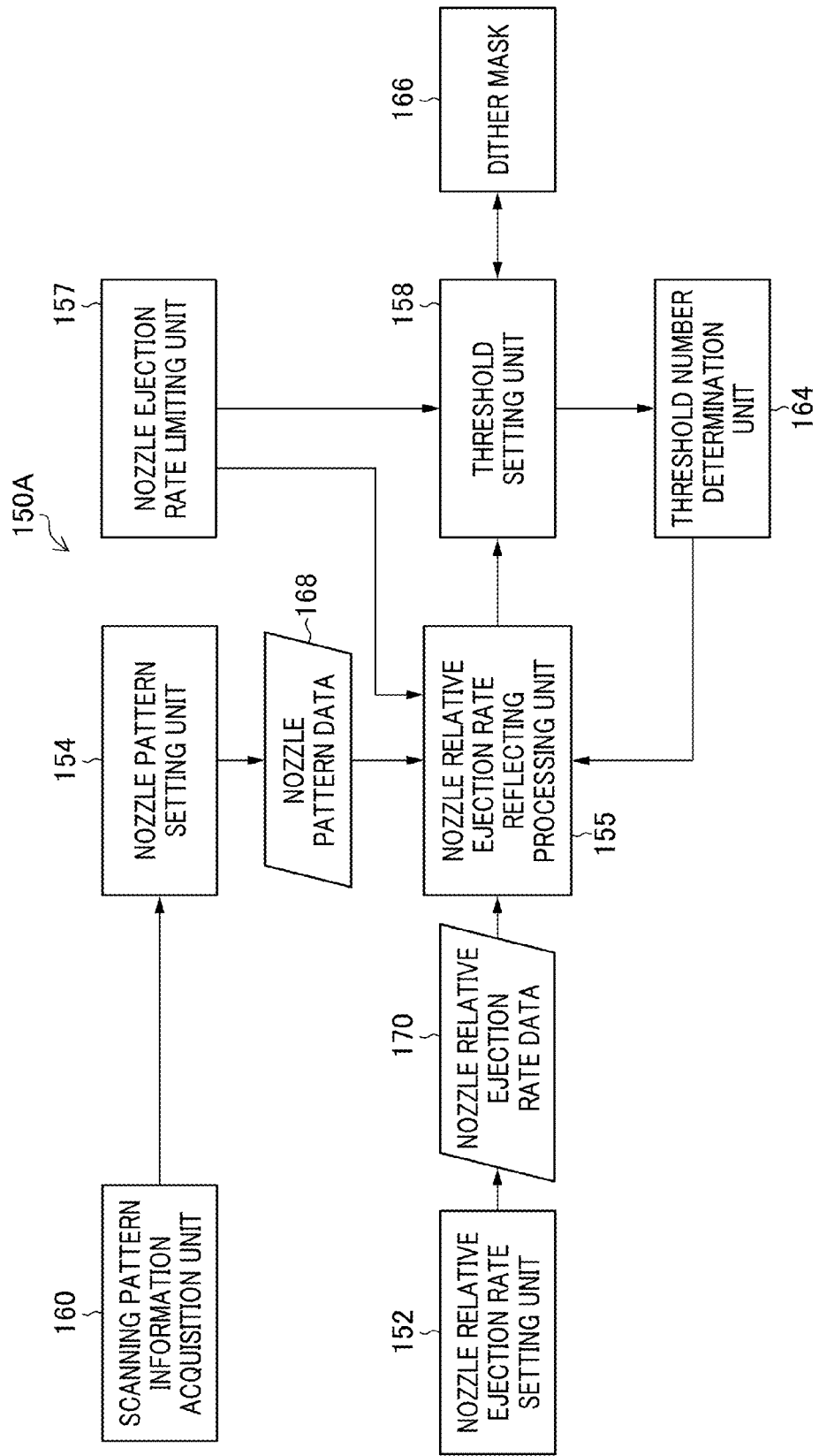
FIG. 38 is a block diagram illustrating a configuration of a dither mask generation device relating to the third embodiment.

FIG. 38 is a block diagram illustrating a configuration of a dither mask generation device relating to the third embodiment. In FIG. 38, the same signs are attached to the elements that are the same as or similar to the ones in the configuration described in FIG. 29, and the description is omitted.

A dither mask generation device 150A illustrated in FIG. 38 includes a nozzle relative ejection rate reflecting processing unit 155, instead of the dot priority pixel setting unit 156 described in FIG. 29. The nozzle relative ejection rate reflecting processing unit 155 performs processing of reflecting the nozzle relative ejection rate on the evaluation index when setting the individual thresholds of the dither mask 166.

Figure 39:
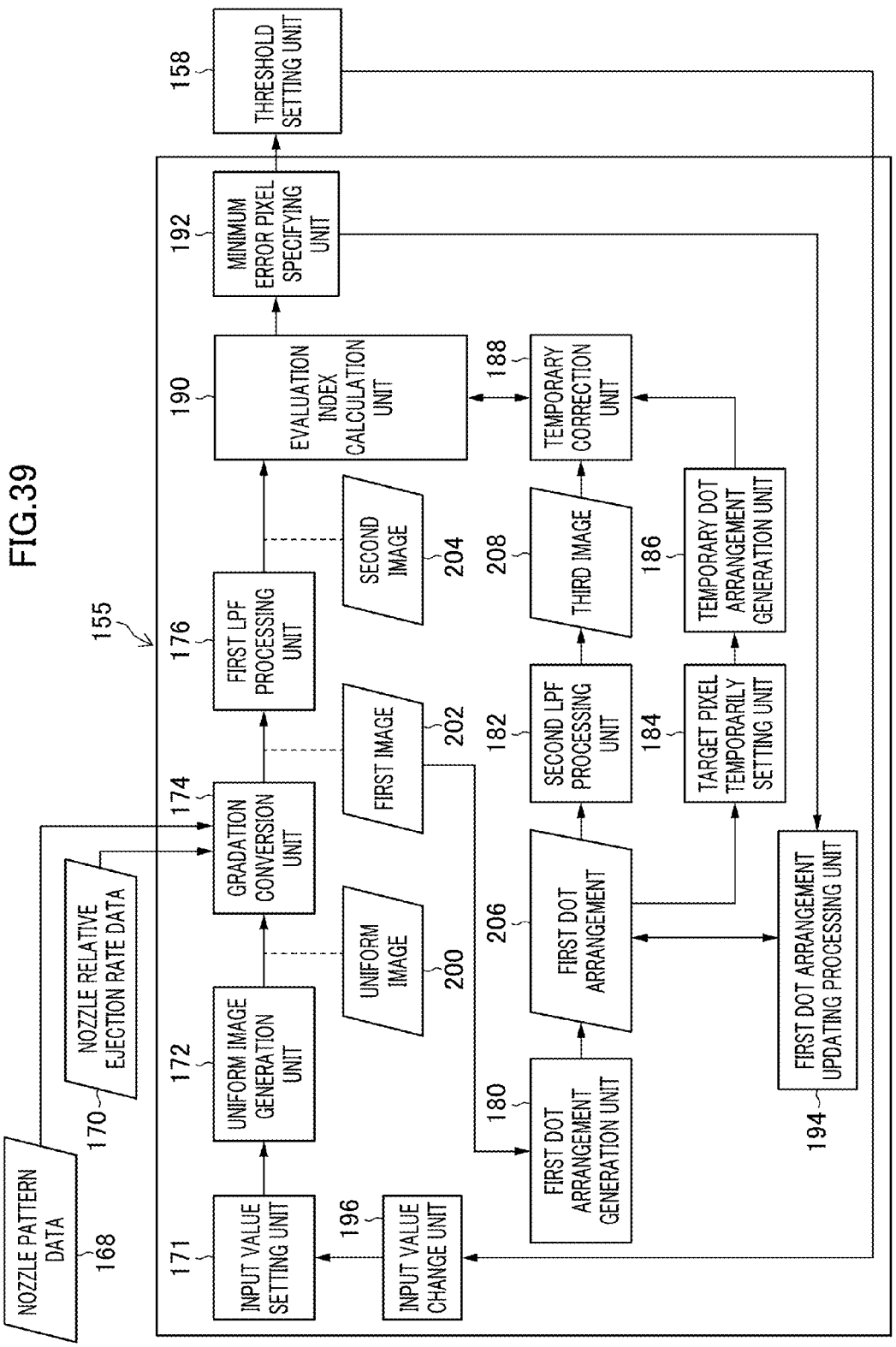
FIG. 39 is a block diagram illustrating a detailed configuration of a nozzle relative ejection rate reflecting processing unit.

FIG. 39 is a block diagram illustrating a detailed configuration of the nozzle relative ejection rate reflecting processing unit 155. In FIG. 39, the same signs are attached to the same elements as the ones in the configuration described in FIG. 38 and the description is omitted.

The nozzle relative ejection rate reflecting processing unit 155 includes an input value setting unit 171, a uniform image generation unit 172, a gradation conversion unit 174, a first low-pass filter processing unit 176, a first dot arrangement generation unit 180, a second low-pass filter processing unit 182, a target pixel temporarily setting unit 184, a temporary dot arrangement generation unit 186, a temporary correction unit 188, an evaluation index calculation unit 190, a minimum error pixel specifying unit 192, a first dot arrangement updating processing unit 194, and an input value change unit 196.

The input value setting unit 171 sets an input value I indicating the gradation value of the input image. The input value setting unit 171 sets an initial input value $I_0$ indicating the gradation value of the initial input image first.

The uniform image generation unit 172 generates a uniform image 200 of the input value set in the input value setting unit 171. The initial uniform image 200 corresponding to the initial input value $I_0$ corresponds to the input image 146 (see FIG. 32).

The gradation conversion unit 174 performs processing of gradation conversion of reflecting the corresponding nozzle relative ejection rates on the individual pixel values of the uniform image 200 based on the nozzle relative ejection rate data 170 and the nozzle pattern data 168. A first image 202 generated by the gradation conversion unit 174 corresponds to the ejection rate reflecting input image described in step S32 in FIG. 31. The first image 202 corresponds to the ejection rate reflecting input image 148 described in FIG. 32. The gradation conversion unit 174 can be called a first image generation unit, and the conversion processing by the gradation conversion unit 174 can be recognized as first image generation processing.

The first low-pass filter processing unit 176 illustrated in FIG. 39 generates a second image 204 by performing an operation of convoluting the first low-pass filter to the first image 202. The second image 204 corresponds to the low-pass ejection rate reflecting input image described in step S33 in FIG. 31. The first low-pass filter processing unit 176 can be called a second image generation unit, and filter processing by the first low-pass filter processing unit 176 can be recognized as second image generation processing.

The first dot arrangement generation unit 180 illustrated in FIG. 39 generates a first dot arrangement 206 which is the dot arrangement corresponding to the first image 202.

The second low-pass filter processing unit 182 generates a third image 208 by performing an operation of convoluting the second low-pass filter to the first dot arrangement. The third image 208 corresponds to the low-pass dot arrangement image described in step S35 in FIG. 31. The second low-pass filter processing unit 182 can be called a third image generation unit, and filter processing by the second low-pass filter processing unit 182 can be recognized as third image generation processing.

The target pixel temporarily setting unit 184 temporarily sets the target pixel to the threshold non-set pixels of the dither mask based on the first dot arrangement 206. The target pixel temporarily setting unit 184 performs the process indicated in step S42 in FIG. 33 and step S72 in FIG. 37. The target pixel temporarily setting unit 184 temporarily sets the target pixel to the threshold non-set pixels belonging to the dot allowing pixels set by the nozzle ejection rate limiting unit 157 (see FIG. 38) when performing the processing of the process illustrated in step S42 in FIG. 33.

The temporary dot arrangement generation unit 186 temporarily places the dot to the target pixel, or temporarily removes the dot from the target pixel, and generates a temporary dot arrangement. The temporary dot arrangement generation unit 186 performs the process indicated in step S44 in FIG. 33 and step S74 in FIG. 37.

The temporary correction unit 188 performs processing of temporarily correcting the third image 208 accompanying the temporary placement or temporary removal of the dot by the temporary dot arrangement generation unit 186. The temporary correction unit 188 performs the process indicated in step S46 in FIG. 33 and step S76 in FIG. 37.

The evaluation index calculation unit 190 calculates the evaluation index that evaluates the error between the second image 204 and the third image 208 after the temporary correction. The evaluation index calculation unit 190 performs the process indicated in step S48 in FIG. 33 and step S78 in FIG. 37.

The minimum error pixel specifying unit 192 changes the position of the temporarily set target pixel, and specifies the position of the pixel for which the error becomes minimum from the evaluation index calculated by the evaluation index calculation unit 190. The information of the minimum error pixel which is the pixel for which the error becomes minimum is provided to the threshold setting unit 158.

The threshold setting unit 158 sets the threshold to the pixel for which the error becomes minimum from the evaluation index obtained by the evaluation index calculation unit 190 among the threshold non-set pixels of the dither mask 166. By the minimum error pixel specifying unit 192 and the threshold setting unit 158, the process indicated in step S54 in FIG. 33 and step S84 in FIG. 37 is performed.

The first dot arrangement updating processing unit 194 performs processing of placing the dot to the minimum error pixel or removing the dot from the minimum error pixel based on the information of the minimum error pixel, and updating the first dot arrangement 206. Then, the second low-pass filter processing unit 182 updates the third image 208 by performing the operation of convoluting the second low-pass filter to the updated first dot arrangement 206. Or, the second low-pass filter processing unit 182 updates the third image 208 by adding the second low-pass filter to the pixel position corresponding to the minimum error pixel or removing the second low-pass filter from the pixel position corresponding to the minimum error pixel for the initial third image 208. By the first dot arrangement updating processing unit 194 and the second low-pass filter processing unit 182, the process indicated in step S56 in FIG. 33 and step S86 in FIG. 37 is performed.

The initial first dot arrangement may be rewritten and updated by the latest dot arrangement generated by the first dot arrangement updating processing unit 194, or the initial first dot arrangement may be held and also the updated dot arrangement may be held.

The input value change unit 196 changes the input value accompanying the setting of the threshold by the threshold setting unit 158. Specifically, using ΔI that is the increment of the input value for one dot, the input value is changed corresponding to the increase and decrease of the dot. Then, the uniform image generation unit 172 generates the uniform image 200 of the changed input value, the gradation conversion unit 174 generates the first image 202 by performing the processing of the gradation conversion of reflecting the corresponding nozzle relative ejection rates on the individual pixel values of the uniform image 200, and the first low-pass filter processing unit 176 generates the second image 204 by performing the operation of convoluting the first low-pass filter to the first image 202.

By the input value change unit 196, the uniform image generation unit 172, the gradation conversion unit 174 and the first low-pass filter processing unit 176, the process indicated in step S60 in FIG. 33 and step S90 in FIG. 37 is performed.

Fourth Embodiment

In the dither mask generation method described in the third embodiment, a huge operation amount is required since it is needed, as described in FIG. 33, FIG. 36 and FIG. 37, to repeatedly execute the processing of temporarily setting the target pixel to the threshold non-set pixel to be a candidate every time of setting the individual thresholds, temporarily placing the dot to the first dot arrangement and adding the second low-pass filter to the low-pass dot arrangement image in the case of an ascending threshold setting order, temporarily removing the dot from the first dot arrangement and removing the second low-pass filter from the low-pass dot arrangement image in the case of a descending threshold setting order, and calculating the error between the low-pass ejection rate reflecting input image and the low-pass dot arrangement image.

Therefore, in the fourth embodiment, a device capable of generating the dither mask with an operation amount smaller than that in the third embodiment is provided.

Figure 40:
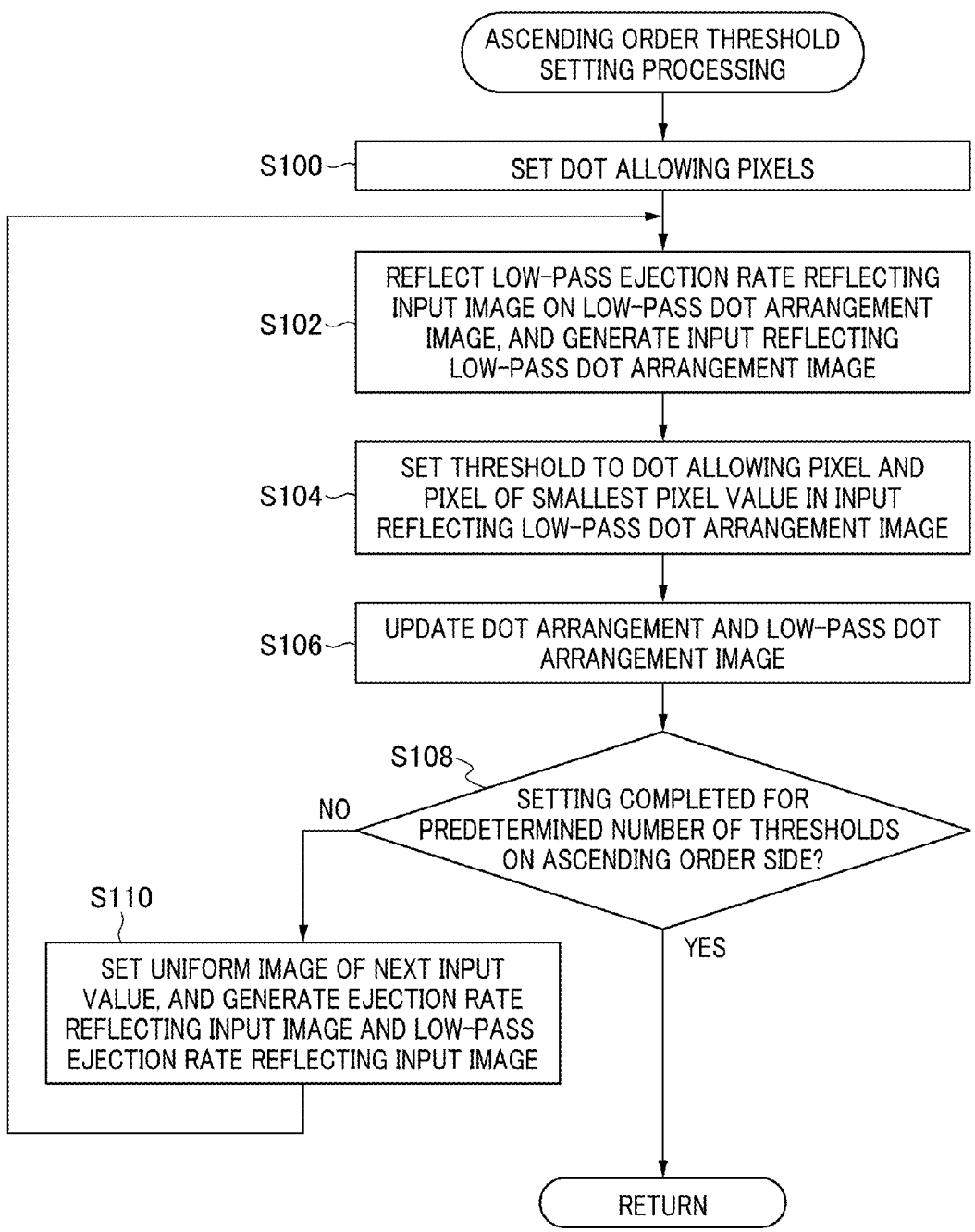
FIG. 40 is a flowchart of the dither mask generation method relating to a fourth embodiment.

FIG. 40 is a flowchart of the dither mask generation method by the fourth embodiment. Instead of the flowchart described in FIG. 33, the flowchart in FIG. 40 can be adopted.

Here, in order to simplify the description, only the case that the threshold setting order is the ascending order is described. As in the flowchart illustrated in FIG. 40, in threshold setting processing in FIG. 40, first, the dot allowing pixels are determined (step S100). The setting method of the dot allowing pixels is as described in the first embodiment. The process of step S100 is the process of performing processing similar to the process described in step S10 in FIG. 21.

Then, the low-pass ejection rate reflecting input image is reflected on the low-pass dot arrangement image, and an input reflecting low-pass dot arrangement image is generated (step S102). The process of step S102 corresponds to one form of "fourth image generation process". The input reflecting low-pass dot arrangement image corresponds to one form of "fourth image".

As a reflecting method, in the case of taking a difference between the low-pass dot arrangement image and the low-pass ejection rate reflecting input image, the input reflecting low-pass dot arrangement image is generated by the following expression (10).

$$RIN\_F\_HT(x,y)=F\_HT(x,y)-F\_IN(x,y) \quad \text{Expression (10)}$$

Here, reference characters x and y designate the position of the pixel. Reference character RIN_F_HT(x,y) designates the input reflecting low-pass dot arrangement image at x,y. Reference character F_HT(x,y) means the low-pass dot arrangement image at x,y. Reference character F_IN(x,y) means the low-pass ejection rate reflecting input image at x,y.

Also, as the reflecting method, in the case of taking the ratio (that is, the quotient) of the low-pass dot arrangement image and low-pass ejection rate reflecting input image, the input reflecting low-pass dot arrangement image is generated by the following expression (11).

$$RIN\_F\_HT(x,y)=F\_HT(x,y)/F\_IN(x,y) \quad \text{Expression (11)}$$

In the case of taking the quotient, in order to prevent division by a denominator "0", it is desirable to add a minute value (for example, 1 or the like) to F_IN(x,y).

In order to help understanding, the description is given with a specific conceptual diagram.

Figure 41:
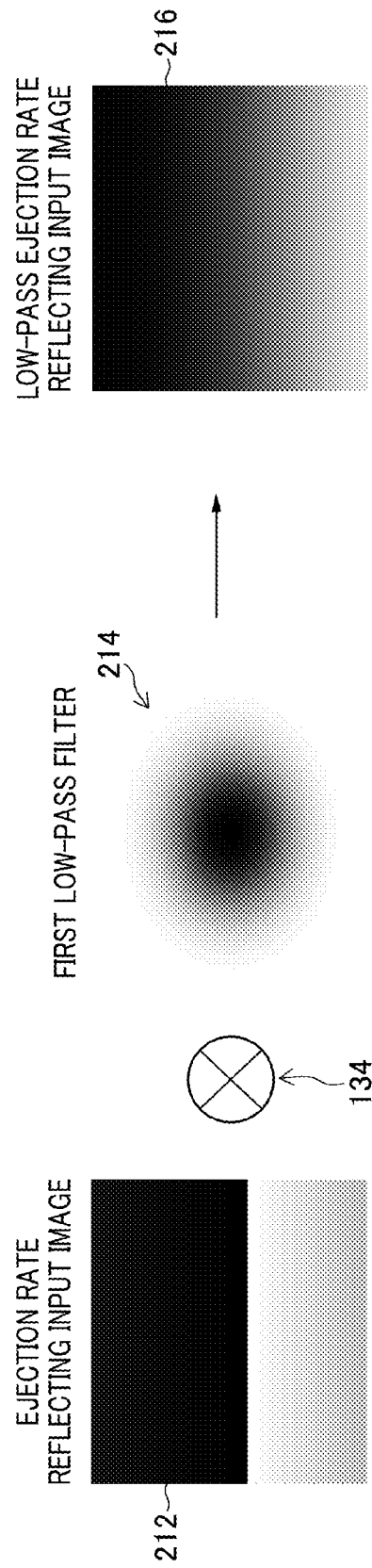
FIG. 41 is an explanatory diagram illustrating a process of generating a low-pass ejection rate reflecting input image, using a specific image.

FIG. 41 is an explanatory diagram illustrating a process of generating the low-pass ejection rate reflecting input image using a specific image. In FIG. 41, for the convenience of the illustration, as an example of an ejection rate reflecting input image 212, as illustrated, a separately painted pattern for which an upper side of an image is dark and a lower side is light is indicated. In FIG. 41, a first low-pass filter 214 indicates a size of a filter coefficient by shades. A tendency that the filter coefficient gradually becomes small from a filter center part to an outer side periphery is indicated.

By convoluting the first low-pass filter 214 to the ejection rate reflecting input image 212, a low-pass ejection rate reflecting input image 216 is generated. The low-pass ejection rate reflecting input image 216 corresponds to the second image 204 (see FIG. 39).

Figure 42:
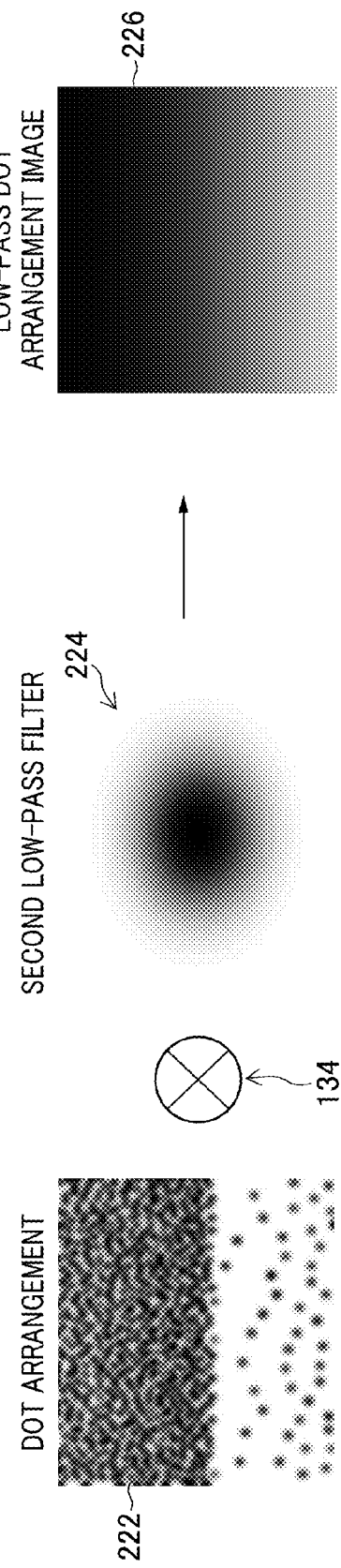
FIG. 42 is an explanatory diagram illustrating a process of generating a low-pass dot arrangement image, using a specific image.

FIG. 42 is an explanatory diagram illustrating a process of generating the low-pass dot arrangement image using a specific image. A dot arrangement 222 illustrated in FIG. 42 is the dot arrangement corresponding to the ejection rate reflecting input image 212 illustrated in FIG. 41. In FIG. 42, a second low-pass filter 224 indicates the size of the filter coefficient by shades. A tendency that the filter coefficient gradually becomes small from the filter center part to the outer side periphery is indicated.

By convoluting the second low-pass filter 224 to the dot arrangement 222, a low-pass dot arrangement image 226 is generated. The low-pass dot arrangement image 226 corresponds to the third image 208 (see FIG. 39).

Figure 43:
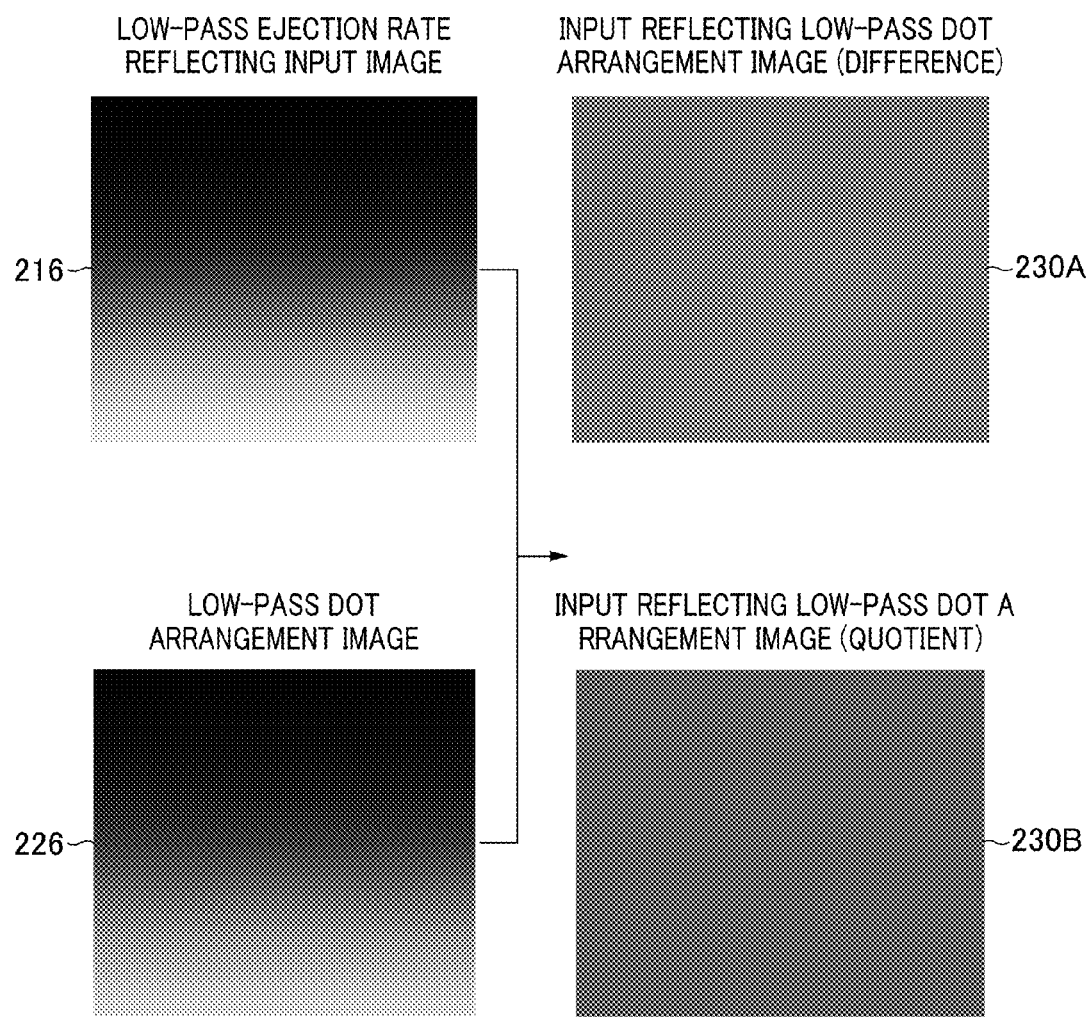
FIG. 43 is an explanatory diagram illustrating a process of generating an input reflecting low-pass dot arrangement image, using a specific image.

FIG. 43 is an explanatory diagram illustrating a process of generating the input reflecting low-pass dot arrangement image using a specific image.

The low-pass ejection rate reflecting input image 216 illustrated in FIG. 43 is an image obtained by convoluting the first low-pass filter 214 to the ejection rate reflecting input image 212 described in FIG. 41. The low-pass dot arrangement image 226 illustrated in FIG. 43 is an image obtained by convoluting the second low-pass filter 224 to the dot arrangement 222 described in FIG. 42. However, in FIG. 43, in order to easily understandably illustrate the drawing, a scale (change field) of the shades of the individual images in FIG. 43 is appropriately adjusted and drawn, and the scale is not unified among the images.

An input reflecting low-pass dot arrangement image 230A illustrated in FIG. 43 is an image obtained by subtracting the pixel values of the corresponding pixels of the low-pass ejection rate reflecting input image 216 and the low-pass dot arrangement image 226, indicating a difference between both.

Also, an input reflecting low-pass dot arrangement image 230B illustrated in FIG. 43 is an image obtained by dividing the pixel values of the corresponding pixels of the low-pass ejection rate reflecting input image 216 and the low-pass dot arrangement image 226, indicating the quotient of both.

Though there is a difference between indicating a distinction between the low-pass ejection rate reflecting input image 216 and the low-pass dot arrangement image 226 by the difference and indicating it by the quotient, in both cases, the input reflecting low-pass dot arrangement images 230A and 230B are the images reflecting the individual pixel values of the low-pass ejection rate reflecting input image 216 on the individual corresponding pixel values of the low-pass dot arrangement image 226.

As the error between the low-pass ejection rate reflecting input image 216 and the low-pass dot arrangement image 226 is smaller, uniformity of a gradation distribution of the input reflecting low-pass dot arrangement image 230A or 230B increases. That is, as the error between the low-pass ejection rate reflecting input image 216 and the low-pass dot arrangement image 226 is smaller, the input reflecting low-pass dot arrangement image 230A or 230B becomes closer to a more uniform image.

Therefore, by determining the position of the pixel to be a dot additionally installing position or a dot removing position so as to improve the uniformity of the gradation distribution of the input reflecting low-pass dot arrangement image 230A or 230B, the dot arrangement suitable for reproduction of the ejection rate reflecting input image 212 can be obtained.

"Improving uniformity of gradation distribution" means that the input reflecting low-pass dot arrangement images 230A and 230B become closer to the uniform image. The fact that the input reflecting low-pass dot arrangement image 230A or 230B becomes closer to the uniform image means that the difference (that is, the error) between the low-pass ejection rate reflecting input image 216 and the low-pass dot arrangement image 226 becomes small.

The fact that the low-pass dot arrangement image 226 with a small difference from the low-pass ejection rate reflecting input image 216 is obtained means, namely, that the dot arrangement (that is, the halftone image) that excellently reproduces image content of the ejection rate reflecting input image 212 can be obtained. "Improving uniformity of gradation distribution" is sometimes expressed as "uniformization". Improvement of the uniformity of the gradation distribution means that the uniformity of the gradation distribution becomes excellent, and has the same meaning as enhancement of the uniformity of the gradation distribution.

When the input reflecting low-pass dot arrangement image is generated in step S102 in FIG. 40, subsequently, the threshold is set to the pixel of the smallest pixel value inside the dot allowing pixels and the generated input reflecting low-pass dot arrangement image (step S104). In step S104, under the restriction of the dot allowing pixels, the pixel values of the individual pixels inside the image of the input reflecting low-pass dot arrangement image are compared with each other, and the pixel whose pixel value is the smallest is determined as a threshold setting pixel. Then, to the determined threshold setting pixel, the threshold is set.

The pixel whose pixel value is the smallest in the input reflecting low-pass dot arrangement image is one form of "the pixel that enhances the uniformity of the gradation distribution of the fourth image in the case of correcting the third image and the fourth image accompanying execution of dot installation, among the individual pixels in the first dot arrangement".

Accompanying the setting of the threshold by step S104, the dot arrangement and the low-pass dot arrangement image are updated (step S106). That is, the dot arrangement is updated by placing the dot at the position of the pixel to which the threshold is set by step S104, and the low-pass dot arrangement image is updated by generating the low-pass dot arrangement image corresponding to the updated dot arrangement.

In step S108, whether or not the setting of the predetermined number of the thresholds on the ascending order side is completed is determined. In the case of No determination in step S108, the process advances to step S110. In step S110, the uniform image of the next input value is set, and the ejection rate reflecting input image and the low-pass ejection rate reflecting input image are generated. The process of step S108 and step S110 is similar to the process of step S58 and step S60 in FIG. 33.

However, in the case that the input reflecting low-pass dot arrangement image is defined by the quotient as indicated by the expression (11), the process of step S110 in FIG. 40 is not needed.

After step S110 in FIG. 40, the process returns to step S102, and the above-described processing of step S102 to step S108 is repeated. In this way, the individual thresholds are determined in the ascending order, and when the setting is ended for the predetermined number of the thresholds, Yes determination is attained in step S108, and a subroutine in FIG. 40 is ended.

Figure 44:
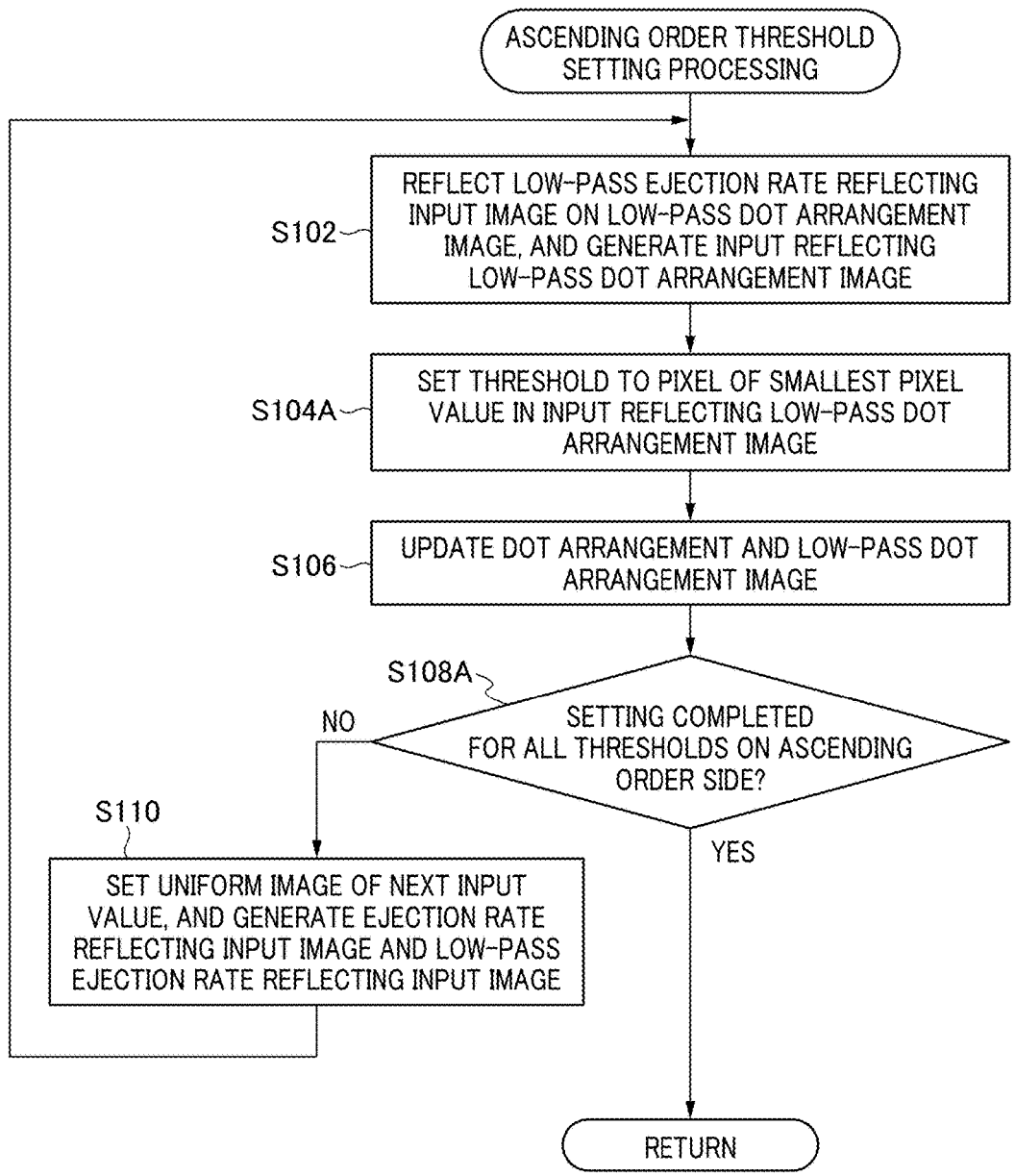
FIG. 44 is a flowchart of ascending order threshold setting processing executed following the flowchart in FIG. 40.

In the case of Yes determination in step S108, all the remaining thresholds in the ascending order are set according to a flowchart illustrated in FIG. 44.

In the flowchart in FIG. 44, the same step numbers are attached to the processes that are the same as or similar to that in the flowchart illustrated in FIG. 40, and the description is omitted.

In the flowchart in FIG. 44, a process of determining the dot allowing pixels (step S100) is omitted, and in step S104A replacing step S104 in FIG. 40, the restriction of the dot allowing pixels is removed, and the threshold is set to the pixel of the smallest pixel value in the input reflecting low-pass dot arrangement image.

Also, the flowchart in FIG. 44 has a process of determining whether or not the entire threshold setting on the ascending order side is completed (step S108A in FIG. 44), replacing step S108 in FIG. 40.

In the case of Yes determination in step S108 in FIG. 40, the process advances to the flowchart in FIG. 44, and all the remaining thresholds on the ascending order side are set according to the flowchart in FIG. 44, without setting the dot allowing pixels. When the flowchart in FIG. 44 is ended, the process returns to the main flow in FIG. 31.

Though the flowchart of the descending order threshold determination processing is not shown in the figure, the descending order threshold determination processing is similar to the flowchart in FIG. 44. In the case of the descending order, the threshold is set to the pixel of the largest pixel value in the input reflecting low-pass dot arrangement image instead of the process of setting the threshold to the pixel of the smallest pixel value in step S104A, the dot is removed (eliminated) from the position of the pixel to which the threshold is set and the dot arrangement and the low-pass dot arrangement image are updated.

According to the dither mask generation method of the fourth embodiment, an operation method of reducing the error between the low-pass ejection rate reflecting input image and the low-pass dot arrangement image as a result by introducing the input reflecting low-pass dot arrangement image and determining the position to place the dot or the position to remove the dot so as to uniformize the input reflecting low-pass dot arrangement image is adopted. That is, in the fourth embodiment, the position of the pixel to set the threshold is specified and the threshold is set, based on the comparison of the pixel values within the input reflecting low-pass dot arrangement image, so as to uniformize the input reflecting low-pass dot arrangement image.

According to the present embodiment, the pixel value of the input reflecting low-pass dot arrangement image can be utilized as it is as the evaluation index, and the pixel to set the threshold can be easily specified based on the comparison of size relation among the pixel values with each other within the image of the input reflecting low-pass dot arrangement image, without calculating a separate evaluation value such as a square error.

Therefore, compared to the method in the third embodiment, the appropriate dither mask can be obtained with a small operation amount.

Figure 45:
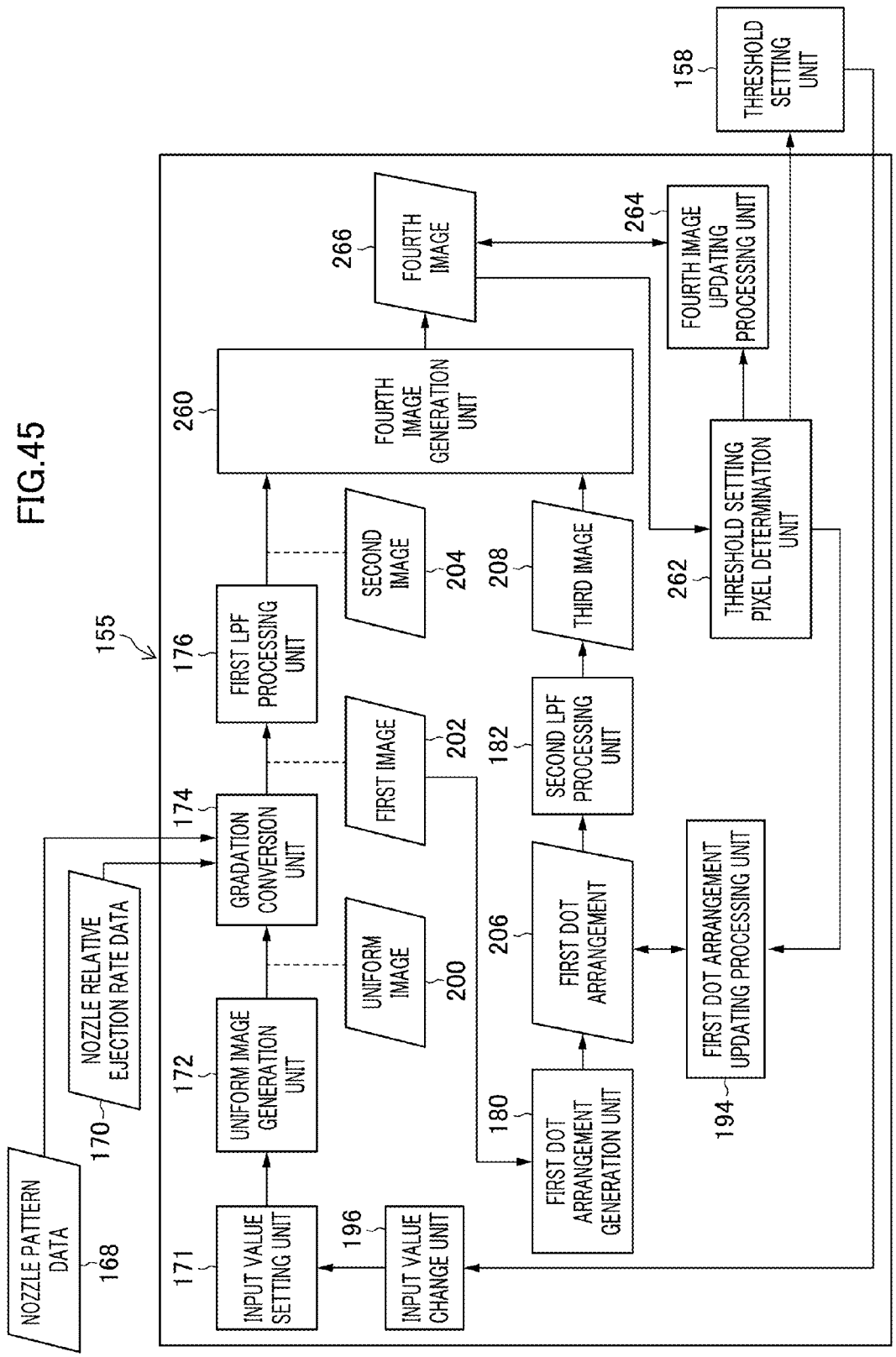
FIG. 45 is a block diagram illustrating a main part configuration of the dither mask generation device relating to the fourth embodiment.

FIG. 45 is a block diagram illustrating a main part configuration of the dither mask generation device relating to the fourth embodiment. In FIG. 45, the same signs are attached to the elements same as or similar to the ones in the configuration described in FIG. 39, and the description is omitted. A basic configuration of the dither mask generation device of the fourth embodiment is similar to the third embodiment illustrated in FIG. 38, however, instead of the nozzle relative ejection rate reflecting processing unit 155 described in FIG. 39, the configuration of a nozzle relative ejection rate reflecting processing unit 256 illustrated in FIG. 45 is provided.

The nozzle relative ejection rate reflecting processing unit 256 in the fourth embodiment includes a fourth image generation unit 260, a threshold setting pixel determination unit 262, and a fourth image updating processing unit 264. The fourth image generation unit 260 performs processing of generating, from the second image 204 and the third image 208, a fourth image 266 indicating a difference between both. The fourth image 266 corresponds to the input reflecting low-pass dot arrangement image described in step S102 in FIG. 40. The fourth image 266 is an image reflecting the individual pixel values of the second image 204 on the individual pixel values of the third image 208.

As the reflecting method of reflecting the individual pixel values of the second image on the individual pixel values of the third image 208 so as to indicate a difference between the second image 204 and the third image 208, there are the case of taking the difference and the case of taking the ratio. "Difference" is obtained by subtraction of the pixel values with each other. "Ratio" is obtained by division of the pixel values with each other. "Ratio" has the same meaning as "quotient".

The fourth image generation unit 260 can be the configuration of calculating the difference in the pixel value between the respectively corresponding pixel positions of the second image 204 and the third image 208 (that is, the subtraction), and generating the fourth image 266 for which the value indicating the difference is the pixel value.

Also, without being limited to the form of calculating the difference, the fourth image 266 indicating the difference between the second image 204 and the third image 208 may be generated by the ratio of the pixel values of the corresponding pixel positions with each other, that is, the quotient by the division. That is, the fourth image generation unit 260 can be the configuration of calculating the ratio (the quotient by the division) of the pixel values of the respectively corresponding pixel positions with each other of the second image 204 and the third image 208 and generating the fourth image 266 for which the value indicating the quotient is the pixel value.

The threshold setting pixel determination unit 262 performs processing of determining the threshold setting pixel which is a location of the pixel to set the threshold based on the fourth image 266. Specifically, the pixel values within the image of the fourth image 266 are compared, and the pixel which is the dot allowing pixel and whose pixel value becomes the smallest or the pixel whose pixel value becomes the largest is determined from the fourth image 266.

The information of the threshold setting pixel determined in the threshold setting pixel determination unit 262 is sent to the threshold setting unit 158. The threshold setting unit 158 sets the threshold to the threshold setting pixel.

Also, the information of the threshold setting pixel determined in the threshold setting pixel determination unit 262 is sent to the first dot arrangement updating processing unit 194. The first dot arrangement updating processing unit 194 performs processing of updating the first dot arrangement 206 by adding the dot to the threshold setting pixel or removing the dot from the threshold setting pixel. The initial first dot arrangement may be rewritten and updated by the latest dot arrangement generated by the first dot arrangement updating processing unit 194, or the initial first dot arrangement may be held and also the updated dot arrangement may be held.

Further, the information of the threshold setting pixel determined in the threshold setting pixel determination unit 262 is sent to the fourth image updating processing unit 264.

The fourth image updating processing unit 264 performs processing of correcting and updating the fourth image 266 accompanying the updating processing of the first dot arrangement 206 by the first dot arrangement updating processing unit 194. The fourth image updating processing unit 264 corrects the fourth image 266 by performing processing of adding a contributory component of the second low-pass filter corresponding to the dot to be added to the threshold setting pixel to the fourth image 266 or processing of removing the contributory component of the second low-pass filter corresponding to the dot to be removed from the threshold setting pixel from the fourth image 266.

As a result of correction processing by the fourth image updating processing unit 264, the fourth image 266 for which the value of the pixel is updated is obtained. The initial fourth image 266 may be rewritten and updated by the latest fourth image 266 generated by the fourth image updating processing unit 264, or the initial fourth image may be held and also the updated fourth image generated by the fourth image updating processing unit 264 may be held.

The individual pieces of data of the first image 202, the second image 204, the first dot arrangement 206, the third image 208 and the fourth image 266 generated inside the dither mask generation device 150A (see FIG. 38) are held in a storage unit such as a memory (not shown in the figure) provided inside the dither mask generation device 150A or the like.

<Modification 1 of Fourth Embodiment>

In the fourth embodiment described above, the example of holding the input reflecting low-pass dot arrangement image which is the fourth image 266 generated by the fourth image generation unit 260 in the memory or the like, updating the fourth image 266 accompanying the setting of the threshold, and holding the updated fourth image 266 is described.

However, when the invention is implemented, it is not always needed to hold the generated fourth image 266. For example, only the second image 204 and the third image 208 may be held and a value corresponding to the fourth image may be calculated as required when the pixel value is evaluated upon determining the threshold setting pixel.

<Modification 2 of Fourth Embodiment>

In the fourth embodiment described above, the threshold is set to the pixel corresponding to the smallest value (in the case of the ascending threshold setting order) of the fourth image 266, however, the threshold setting pixel is not always needed to be the pixel of the smallest value in the fourth image 266. For example, the pixels smaller than the average value of the pixel values in the fourth image 266 by a specified value or less may be all defined as candidates, one threshold setting pixel may be selected from the candidates randomly or by considering a separate index or arrangement restrictions further, and the threshold may be set to the selected threshold setting pixel.

"Specified value" to be a reference of determining the candidates may be a fixed value set beforehand, or may be changed every time of setting the threshold. Also, in the case of changing the specified value, a negative value may be also included. Using the negative value as the specified value means, namely, including the pixels of the pixel value larger than the average value in the candidates. A reason for allowing the negative value as the specified value is to avoid falling into a partial and local optimum solution and reach an optimum solution, similarly to a simulated annealing method. In a range that such an object can be achieved, the specified value is changed.

For the separate index, for example, an index that evaluates image quality such as graininess, stripe-like image defects, density irregularity or banding, an index of a dot covering rate or the like, or an appropriate combination of these indexes can be adopted.

As the arrangement restrictions, for example, other than the restrictions of setting a limit to the pixel with an adjacent dot, or setting the limit to the pixel without the adjacent dot, the restrictions of setting the limit to the pixel corresponding to a specific nozzle or a specific scanning path or setting the limit to the pixel not corresponding to the specific nozzle or the specific scanning path or the like can be adopted, and these restrictions may be appropriately combined for the arrangement restriction.

While all the threshold non-set pixels and the dot allowing pixels are turned to the candidates and a trial operation is repeated in the method described in the third embodiment, according to the fourth embodiment, since the pixels to be the candidates are narrowed based on the pixel value of the input reflecting low-pass dot arrangement image, it is easy to determine the threshold setting pixel. In particular, by the fourth embodiment, one threshold setting pixel can be specified according to a simple rule, based on the comparison of the pixel values in the input reflecting low-pass dot arrangement image. The simple rule is the already described rule to be the pixel of the smallest value, or the rule for which narrowing of the candidates by the specified value and selection by a random number or the like are combined or the like. According to the fourth embodiment, an optimum dither mask can be obtained with a small operation amount. Also, when the pixel values in the input reflecting low-pass dot arrangement image is compared, without being limited to the case of comparing the pixel values in a pixel-to-pixel manner by a pixel unit, the plurality of pixels may be turned into a group and the pixel values may be compared by a group unit.

<Modification 3 of Fourth Embodiment>

Regarding the generation of the input reflecting low-pass dot arrangement image described in step S102 in FIG. 40, an expression (12) for which a first term and a second term on a right side of the already described expression (10) are replaced can be used. That is, as the method of reflecting the low-pass ejection rate reflecting input image on the low-pass dot arrangement image, in the case of taking "difference" between both, instead of the expression (10), the following expression (12) can be used.

$$RIN\_F\_HT(x,y)=F\_IN(x,y)-F\_HT(x,y) \quad \text{Expression (12)}$$

In this case, for the processing of step S104, the threshold is set to the pixel of the largest value in the input reflecting low-pass dot arrangement image, or the threshold is set to the pixel larger than the average value by the specified value or more.

<Modification 4 of Fourth Embodiment>

Regarding the generation of the input reflecting low-pass dot arrangement image described in step S102 in FIG. 40, an expression (13) for which a denominator and a numerator on a right side of the already described expression (11) are replaced can be used.

That is, as the method of reflecting the low-pass ejection rate reflecting input image on the low-pass dot arrangement image, in the case of taking "quotient" of both, instead of the expression (11), the following expression (13) can be used.

$$RIN\_F\_HT(x,y)=F\_IN(x,y)/F\_HT(x,y) \quad \text{Expression (13)}$$

In order to prevent the division by the denominator "0", it is desirable to add a minute value (for example, "1") to F_HT(x,y).

In this case, for the processing of step S104, the threshold is set to the pixel of the largest value in the input reflecting low-pass dot arrangement image, or the threshold is set to the pixel larger than the average value by the specified value or more.

<Modification 5 of Fourth Embodiment>

For a definition of the input reflecting low-pass dot arrangement image, the case of defining it by "difference" by the subtraction like the expression (10) and the expression (12) and the case of defining it by "quotient" by the division like the expression (11) and the expression (13) are described, however, the subtraction can be also handled as addition of a negative value and the division can be handled as multiplication of a fraction. Therefore, under such equivalent handling, the difference by the subtraction can be noted as "sum" by the addition, and the quotient by the division can be noted as "product" by the multiplication.

Fifth Embodiment

From the first embodiment to the fourth embodiment, the upper limit is set to the nozzle ejection rates at which the individual nozzles record the individual main scanning positions of the individual rasters, the dot allowing pixels to allow threshold setting are set based on the upper limit (limitation), and the nozzle ejection rates of the individual nozzles in the individual rasters are limited based on the dot allowing pixels. However, the method of limiting the nozzle ejection rates of the individual nozzles can be not only the form of setting the dot allowing pixels but also the form of directly limiting the number of the thresholds to be set for the individual main scanning positions of the individual rasters.

Figure 46:
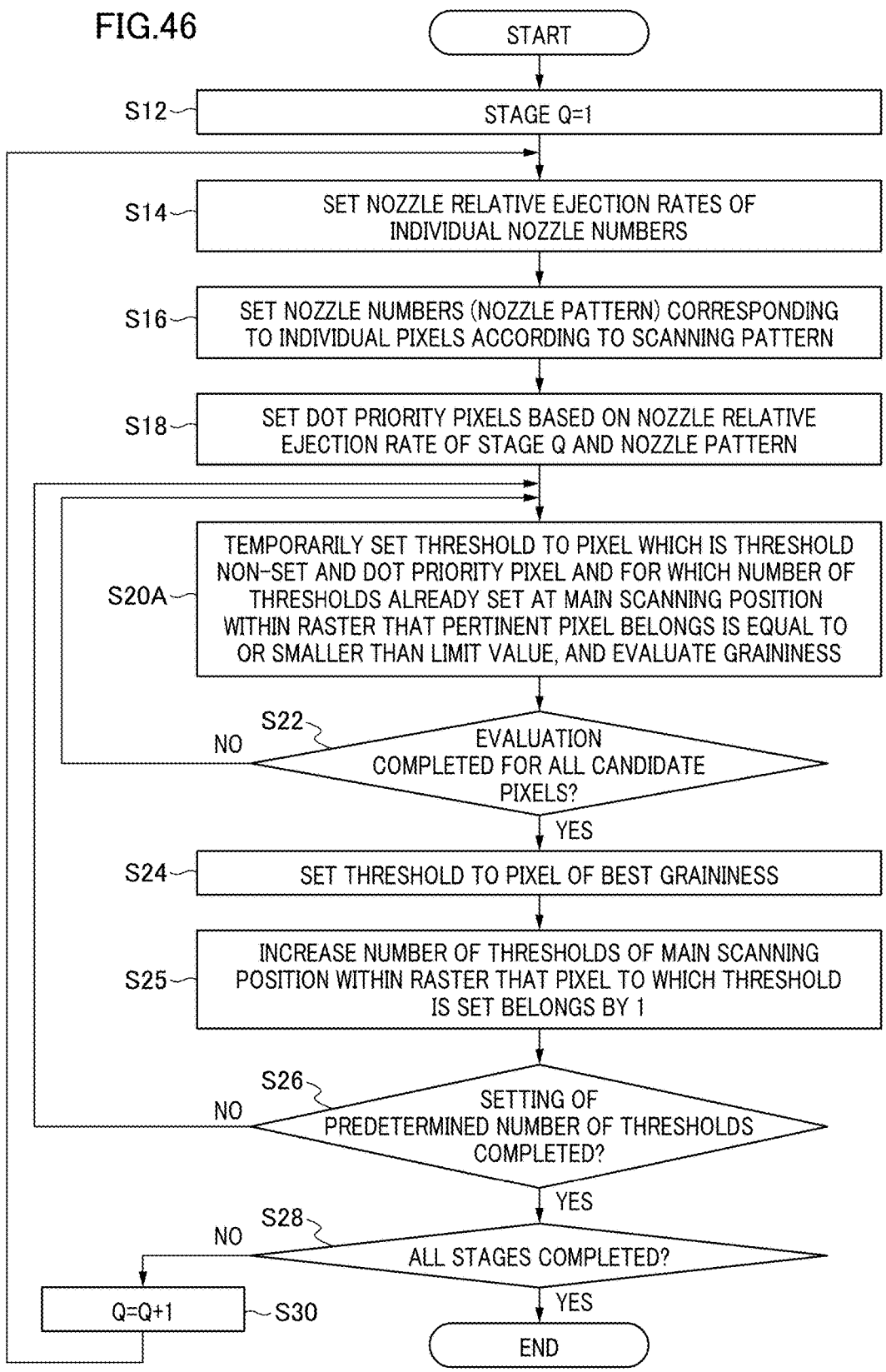
FIG. 46 is a flowchart of a dither mask generation method relating to a fifth embodiment.

FIG. 46 is a flowchart of a dither mask generation method relating to the fifth embodiment. In the flowchart illustrated in FIG. 46, the same step numbers are attached to the processes that are the same as or similar to that in the flowchart illustrated in FIG. 21, and the description is omitted. Instead of the flowchart described in FIG. 21, the flowchart illustrated in FIG. 46 can be applied.

The flowchart illustrated in FIG. 46 does not have the process (the process of determining the dot allowing pixels) of step S10 in FIG. 21, and has the process of step S20A instead of step S20 in FIG. 21. In step S20A in FIG. 46, the threshold is temporarily set to the pixel which is the threshold non-set and dot priority pixel and for which the number of the thresholds already set at the main scanning position within the raster that the pixel belongs is equal to or smaller than a limit value, and the graininess is evaluated.

The main scanning position within the raster indicates a path group in the raster under consideration. All the pixels of the raster in the case that the number of paths in the main scanning direction is one path belong to the same one kind of the path group (main scanning position 1). Therefore, the main scanning position within the raster in the case that the number of paths in the main scanning direction is one path is only one kind of the path group of "main scanning position 1", and the number of the pixels belonging to the main scanning position 1 coincides with the main scanning pixel number of the raster. In this case, for each raster, a limit value that stipulates the upper limit of the number of the thresholds that can be set to the pixels belonging to the main scanning position 1 is determined. The number of the thresholds refers to the number of setting thresholds.

On the other hand, the individual pixels of the raster in the case that the number of paths in the main scanning direction is two paths are divided into two kinds of path groups (the group of the main scanning position 1 and the group of the main scanning position 2). In this case, for each raster, the number of the thresholds that can be set to the pixels belonging to the main scanning position within the raster classified into the main scanning position 1 and the number of the thresholds that can be set to the pixels belonging to the main scanning position within the raster classified into the main scanning position 2 are limited by the limit value respectively.

Here, "limit value" is "upper limit value of nozzle ejection rate×number of pixels belonging to individual main scanning positions within raster". The limit value is set at the value equal to the number of the dot allowing pixels set to the individual main scanning positions of the individual rasters described in the first embodiment. For example, when the upper limit value of the nozzle ejection rate is "0.8", in the example of one path (see FIG. 11), the limit value is 14 pieces or 15 pieces by rounding into an integer value from 0.8×18=14.4. In the example of two paths (see FIG. 17), the limit value is 0.8×20/2=8 pieces for the individual main scanning positions of the individual rasters.

Also, in FIG. 46, the process of step S25 is provided between step S24 and step S26. That is, after setting the threshold to the pixel with the minimum error in step S24, the process advances to step S25, and processing of increasing the number of the thresholds of the main scanning position within the raster that the pixel to which the threshold is set belongs by 1 is performed. The processing of step S25 is the processing of counting up the number of the set thresholds for each main scanning position of the individual rasters and managing the number of the thresholds set at the individual main scanning positions of the individual rasters.

"Predetermined number" in step S26 in FIG. 46 is the number for which the numbers of the dot priority pixels belonging to the individual main scanning positions of the individual rasters are calculated respectively, and after changing the calculated number of the dot priority pixels for each main scanning position within the raster to the limit value when it is larger than the limit value, and for the calculated number when it is equal to or smaller than the limit value, the total sum of the individual numbers is calculated. Or, the number smaller than the number for which the total sum is calculated may be "predetermined number".

According to the flowchart in FIG. 46, for the individual main scanning positions of the individual rasters, the upper limit is provided for the number of setting thresholds, and when the number of the set thresholds reaches the upper limit (limit value), the threshold is not set to the individual main scanning positions of the raster anymore. Thus, the actual nozzle ejection rate is controlled to be equal to or lower than the limit value by the raster unit.

In the flowchart in FIG. 46, a combination of step S20A and step S25 corresponds to one form of "nozzle ejection rate limiting process".

Sixth Embodiment

Figure 47:
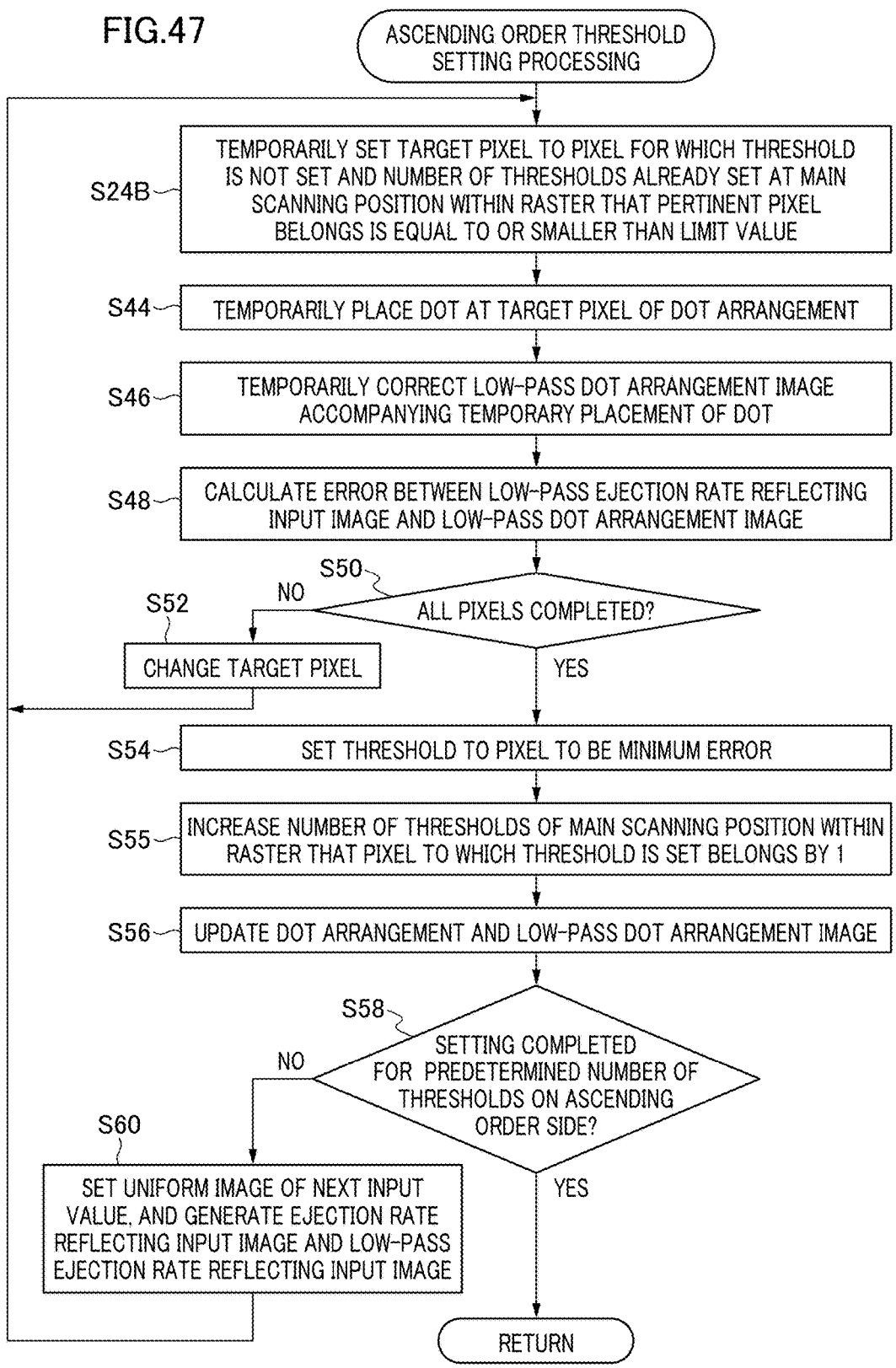
FIG. 47 is a flowchart of a dither mask generation method relating to a sixth embodiment.

FIG. 47 is a flowchart of a dither mask generation method relating to the sixth embodiment. In the flowchart illustrated in FIG. 47, the same step numbers are attached to the processes that are the same as or similar to that in the flowchart illustrated in FIG. 33, and the description is omitted. Instead of the flowchart described in FIG. 33, the flowchart illustrated in FIG. 47 can be applied.

The flowchart illustrated in FIG. 47 does not have the process (the process of determining the dot allowing pixels) of step S40 in FIG. 33, and has the process of step S42B instead of step S42 in FIG. 33. In step S42B in FIG. 47, the target pixel is temporarily set to the pixel for which the threshold is not set and the number of the thresholds already set at the main scanning position within the raster that the pixel belongs is equal to or smaller than the limit value.

Also, in FIG. 47, the process of step S55 is provided between step S54 and step S56. That is, after setting the threshold to the pixel with the minimum error in step S54, the process advances to step S55, and processing of increasing the number of the thresholds of the main scanning position within the raster that the pixel to which the threshold is set belongs by 1 is performed. The processing of step S55 is the processing of counting up the number of the set thresholds for each main scanning position of the individual rasters and managing the number of the thresholds set at the individual main scanning positions of the individual rasters. Step S55 is the process similar to step S25 in FIG. 46.

"Predetermined number" in step S58 in FIG. 47 is the total sum of the limit value of the individual main scanning positions of the individual rasters, or the number smaller than the total sum.

In the flowchart in FIG. 47, a combination of step S42B and step S55 corresponds to one form of "nozzle ejection rate limiting process".

Seventh Embodiment

Figure 48:
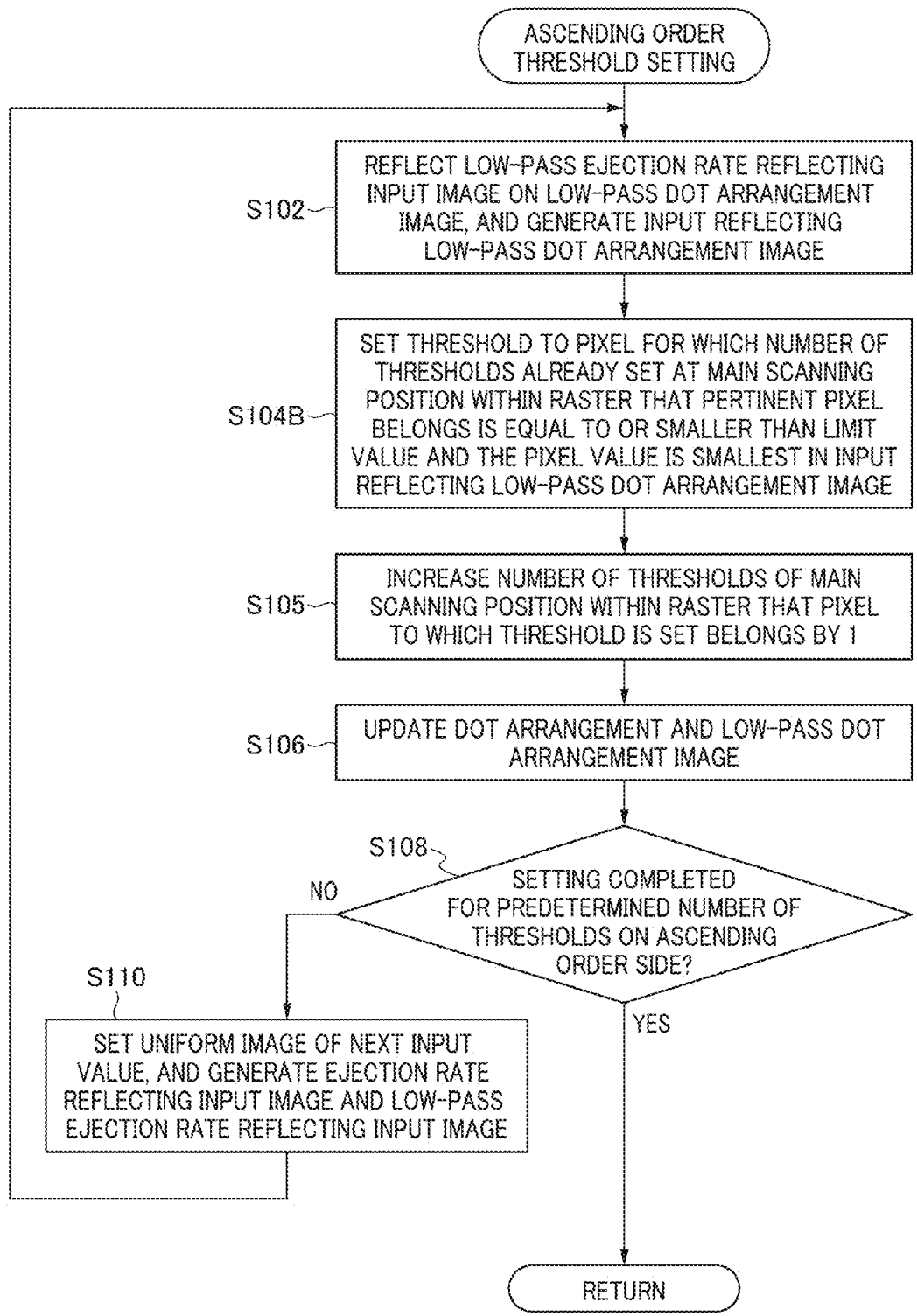
FIG. 48 is a flowchart of a dither mask generation method relating to a seventh embodiment.

FIG. 48 is a flowchart of a dither mask generation method relating to the seventh embodiment. In the flowchart illustrated in FIG. 48, the same step numbers are attached to the processes that are the same as or similar to that in the flowchart illustrated in FIG. 40, and the description is omitted. Instead of the flowchart described in FIG. 40, the flowchart illustrated in FIG. 48 can be applied.

The flowchart illustrated in FIG. 48 does not have the process (the process of determining the dot allowing pixels) of step S100 in FIG. 40, and has the process of step S104B instead of step S104 in FIG. 40. In step S104B in FIG. 48, the threshold is set to the pixel for which the number of the thresholds already set at the main scanning position within the raster that the pixel belongs is equal to or smaller than the limit value and the pixel value is the smallest in the input reflecting low-pass dot arrangement image.

Also, in FIG. 48, the process of step S105 is provided between step S104B and step S106. That is, after setting the threshold in step S104B, the process advances to step S105, and processing of increasing the number of the thresholds of the main scanning position within the raster that the pixel to which the threshold is set belongs by 1 is performed. The processing of step S105 is the processing of counting up the number of the set thresholds for each main scanning position of the individual rasters and managing the number of the thresholds set at the individual main scanning positions of the individual rasters. Step S105 is the process similar to step S25 in FIG. 46.

"Predetermined number" in step S108 in FIG. 48 is the total sum of the limit value of the individual main scanning positions of the individual rasters, or the number smaller than the total sum.

In the flowchart in FIG. 48, a combination of step S104B and step S105 corresponds to one form of "nozzle ejection rate limiting process".

[Other Modifications]

In the first embodiment to the seventh embodiment, as the inkjet recording device, the example of the wide format printer that uses the ultraviolet curing type ink is described, however, the present invention can be applied not only to the one that uses the ultraviolet curing type ink but also to various kinds of inkjet recording devices that record images on the recording medium using various kinds of ink.

Also, in the first embodiment to the seventh embodiment, the nozzle relative ejection rates of the nozzles at both ends of the nozzle array are set lower than the nozzle relative ejection rate of the nozzle at the center part of the nozzle array, however, the nozzle relative ejection rates of the individual nozzles may be appropriately changed according to the kind or recording system of the recording head.

<About Program that Makes Computer Function as Dither Mask Generation Device>

It is possible to record a program for making a computer function as a device that generates a dither mask by the dither mask generation method described in the embodiments described above in a computer readable medium (a non-temporary information storage medium that is a tangible object) such as a CD-ROM (Compact Disc read-only memory) or a magnetic disk, and provide the program through the information storage medium. Instead of such a form of storing and providing the program in the information storage medium, it is also possible to provide a program signal as a downloading service by utilizing a communication network like the Internet.

Also, it is also possible to provide the function of the dither mask generation device as an application server and perform a service of providing the processing function through the communication network.

Further, by incorporating the program in a computer, the computer can be made to achieve the individual functions of the dither mask generation device, and the dither mask generation function described in the above-described embodiments can be achieved.

Also, a form of incorporating some or all of the program for achieving printing control including the dither mask generation function described in the present embodiments in a high-order controller such as a host computer, and application as an operation program of a central processing unit (CPU) on an inkjet recording device side are also possible.

[Advantages of Embodiments]

According to the individual embodiments of the present invention, it is possible to generate the dither mask that does not easily generate stripes since the upper limit lower than the highest nozzle ejection rate is set to the nozzle ejection rates of the individual nozzles for each raster for the individual rasters when generating the dither mask for which the nozzle ejection rates of the individual nozzles are biased.

By performing halftone processing using the dither mask obtained by each of the embodiments, and controlling the ejection of the ink based on the obtained halftone images, excellent images for which banding is suppressed can be formed.

[Others]

While an object is to suppress banding, stripes or irregularity due to density change in the above embodiment, banding, stripes or irregularity due to gloss change is similarly generated in the inkjet recording device, and the present invention is effective also for this problem. Also, the present invention is similarly effective for banding, stripes or irregularity by the change of a dot pattern.

For the embodiment of the present invention described above, without departing from the scope of the invention, components can be appropriately changed, added or deleted. The present invention is not limited to the embodiment described above, and many modifications are possible by persons skilled in the art within the technical idea of the present invention.

What is claimed is:

1. A dither mask generation method that generates a dither mask used in halftone processing for recording an image by a recording head having a plurality of nozzles that eject ink, the dither mask comprising:
    a plurality of pixels comprising:
        recording pixels, which are pixels for which each nozzle ejects ink to record a dot, and
        attending pixels, which are pixels allocated to each nozzle as pixels for which each of the plurality of nozzles in the recording head having the plurality of nozzles that eject ink is in charge of recording; and
    a plurality of rasters in a main scanning direction,
    the dither mask generation method comprising:
    a nozzle relative ejection rate setting process of setting a nozzle relative ejection rate, which is a control target of a nozzle ejection rate of each of the plurality of nozzles indicating a ratio of the recording pixels, in recording the attending pixels, and the nozzle relative ejection rate stipulates a relative using rate of each of the plurality of nozzles;
    a nozzle pattern setting process of setting a nozzle pattern indicating a correspondence relation between each of the plurality of pixels of the dither mask and each of the plurality of nozzles in charge of recording at a position for each of the plurality of pixels;
    a nozzle ejection rate limiting process of setting an upper limit of the nozzle ejection rate, wherein the upper limit is lower than a highest nozzle ejection rate of each nozzle ejection rate of each of the plurality of nozzles for each of the plurality of rasters in the main scanning direction;
    a threshold setting process of setting each of a plurality of thresholds for each of the plurality of pixels of the dither mask based on the nozzle relative ejection rate, the nozzle pattern and the upper limit;
    a dither mask generating process of generating the dither mask based on the nozzle relative ejection rate, the nozzle pattern, the upper limit, and the threshold; and
    an image recording process of recording the image by the recording head having the plurality of nozzles that eject ink using the generated dither mask.

2. The dither mask generation method according to claim 1,
    wherein the nozzle ejection rate limiting process includes a process of setting dot allowing pixels that allow setting of the threshold for each of the plurality of pixels of the dither mask, and
    wherein the upper limit is set by setting the dot allowing pixels.

3. The dither mask generation method according to claim 2,
    wherein, in the process of setting the dot allowing pixels, a pixel array of a number of the dot allowing pixels is set, and the number is calculated by multiplying the nozzle ejection rate indicating the upper limit by the number of pixels of the dither mask.

4. The dither mask generation method according to claim 2,
    wherein the pixel array of the dot allowing pixels has a blue noise characteristic.

5. The dither mask generation method according to claim 2, comprising:
    a dot priority pixel setting process of setting dot priority pixels to be candidates of pixels to set the threshold among the plurality of pixels of the dither mask, based on the nozzle relative ejection rate and the nozzle pattern,
    wherein, in the threshold setting process, the threshold is set to the pixel, which is the dot priority pixel and is also the dot allowing pixel.

6. The dither mask generation method according to claim 5,
    wherein information of a pixel array obtained by a logical AND operation of the dot allowing pixels and the dot priority pixels is held.

7. The dither mask generation method according to claim 5,
    wherein, in the dot priority pixel setting process, the dot priority pixels are set using a random number, based on the nozzle relative ejection rate.

8. The dither mask generation method according to claim 1,
    wherein, in the nozzle ejection rate limiting process, a number of setting thresholds is managed for each raster of the dither mask and the number of the setting thresholds set to each of the plurality of rasters is limited.

9. The dither mask generation method according to claim 8,
wherein the number of setting thresholds is managed for each path group in the main scanning direction in each of the plurality of rasters of the dither mask, and the number of the setting thresholds is limited for each path group.

10. The dither mask generation method according to claim 1, comprising:
a nozzle relative ejection rate reflecting processing process of performing processing of reflecting the nozzle relative ejection rate on an evaluation index when setting each of the plurality of thresholds of the dither mask,
wherein the threshold setting process includes a process of setting the thresholds of the dither mask based on the evaluation index.

11. The dither mask generation method according to claim 1,
wherein the recording head has a nozzle array formed by arraying the nozzles in a sub scanning direction that is parallel to a conveying direction of a recording medium, and is a serial type recording head that records an image on the recording medium while moving in the main scanning direction that is a width direction of the recording medium, which intersects with the sub scanning direction.

12. The dither mask generation method according to claim 11,
wherein the nozzle relative ejection rate of the nozzle arranged at an end of the nozzle array is set to a value smaller than the nozzle relative ejection rate of the nozzle arranged at a center part of the nozzle array.

13. A dither mask generation device that generates a dither mask used in halftone processing for recording an image by a recording head having a plurality of nozzles that eject ink, the dither mask comprising:
a plurality of pixels comprising:
recording pixels, which are pixels for which each nozzle ejects ink to record a dot, and
attending pixels, which are pixels allocated to each nozzle as pixels for which each of the plurality of nozzles in the recording head having the plurality of nozzles that eject ink is in charge of recording; and
a plurality of rasters in a main scanning direction,
the dither mask generation device comprising at least one processor having:
a nozzle relative ejection rate setting unit that sets a nozzle relative ejection rate, which is a control target of a nozzle ejection rate of each of the plurality of nozzles indicating a ratio of the recording pixels, in recording the attending pixels, and the nozzle relative ejection rate stipulates a relative using ratio of each of the plurality of nozzles;
a nozzle pattern setting unit that sets a nozzle pattern indicating a correspondence relation between each of the plurality of pixels of the dither mask and each of the plurality of nozzles in charge of recording at a position for each of the plurality of pixels;
a nozzle ejection rate limiting unit that sets an upper limit of the nozzle ejection rate, wherein the upper limit is lower than the highest nozzle ejection rate of each nozzle ejection rate of each of the plurality of nozzles for each of the plurality of rasters in the main scanning direction; and
a threshold setting unit that sets each of a plurality of thresholds for each of the plurality of pixels of the dither mask based on the nozzle relative ejection rate, the nozzle pattern and the upper limit;
a dither mask generating unit that generates the dither mask based on the nozzle relative ejection rate, the nozzle pattern, the upper limit, and the threshold; and
an image recording unit that records the image by the recording head having the plurality of nozzles that eject ink using the generated dither mask.

14. A non-transitory and tangible computer-readable recording medium, which stores a program for making a computer achieve a function of generating a dither mask used in halftone processing for recording an image by a recording head having a plurality of nozzles that eject ink, the dither mask comprising:
a plurality of pixels comprising:
recording pixels, which are pixels for which each nozzle ejects ink to record a dot, and
attending pixels, which are pixels allocated to each nozzle as pixels for which each of the plurality of nozzles in the recording head having the plurality of nozzles that eject ink is in charge of recording; and
a plurality of rasters in a main scanning direction,
such that when the program is read and executed by the computer, the computer is configured to perform:
a nozzle relative ejection rate setting function of setting a nozzle relative ejection rate, which is a control target of a nozzle ejection rate of each of the plurality of nozzles indicating a ratio of the recording pixels, in recording the attending pixels, and the nozzle relative ejection rate stipulates a relative using ratio of each of the plurality of nozzles;
a nozzle pattern setting function of setting a nozzle pattern indicating a correspondence relation between each of the plurality of pixels of the dither mask and each of the plurality of nozzles in charge of recording at a position for each of the plurality of pixels;
a nozzle ejection rate limiting function of setting an upper limit of the nozzle ejection rate, wherein the upper limit is lower than the highest nozzle ejection rate of each nozzle ejection rate of each of the plurality of nozzles for each of the plurality of rasters in the main scanning direction;
a threshold setting function of setting each of a plurality of thresholds for each of the plurality of pixels of the dither mask based on the nozzle relative ejection rate, the nozzle pattern and the upper limit;
a dither mask generating function of generating the dither mask based on the nozzle relative ejection rate, the nozzle pattern, the upper limit, and the threshold; and
an image recording function of recording the image by the recording head having the plurality of nozzles that eject ink using the generated dither mask.

* * * * *